US012500920B2

(12) United States Patent
Crabtree et al.

(10) Patent No.: US 12,500,920 B2
(45) Date of Patent: *Dec. 16, 2025

(54) COMPUTER-IMPLEMENTED SYSTEM AND METHOD FOR CYBERSECURITY THREAT ANALYSIS USING FEDERATED MACHINE LEARNING AND HIERARCHICAL TASK NETWORKS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

(*) Notice: Subject to any disclaimer, the term of this patent is extended or adjusted under 35 U.S.C. 154(b) by 198 days.

This patent is subject to a terminal disclaimer.

(21) Appl. No.: 18/358,005

(22) Filed: Jul. 24, 2023

(65) Prior Publication Data

US 2023/0370491 A1 Nov. 16, 2023

Related U.S. Application Data

(63) Continuation-in-part of application No. 18/354,651, filed on Jul. 19, 2023, which is a continuation-in-part
(Continued)

(51) Int. Cl.
*H04L 9/40* (2022.01)

(52) U.S. Cl.
CPC ........ *H04L 63/1433* (2013.01); *H04L 63/102* (2013.01); *H04L 63/1416* (2013.01); *H04L 63/1425* (2013.01); *H04L 63/20* (2013.01)

(58) Field of Classification Search
CPC ............... H04L 63/1433; H04L 63/102; H04L 63/1416; H04L 63/1425; H04L 63/20;
(Continued)

(56) References Cited

U.S. PATENT DOCUMENTS 5,669,000 A    9/1997   Jessen et al.
6,256,544 B1   7/2001   Weissinger
(Continued)

FOREIGN PATENT DOCUMENTS

EP    3655878 A1   5/2020
EP    3985576       4/2022
(Continued)

OTHER PUBLICATIONS

Rodriguez, Eva et al., "A Survey of Deep Learning Techniques for Cybersecurity in Mobile Networks", Third Quarter 2021, IEEE Communications Surveys & Tutorials; vol. 23, Issue 3, pp. 1920-1955, ISSN: 1553-877X CD: 2373-745X, DOI: 10.1109/COMST.2021.3086396.

(Continued)

*Primary Examiner* — Bryan F Wright
(74) *Attorney, Agent, or Firm* — Galvin Patent Law LLC; Brian R Galvin

(57) ABSTRACT

A system and method for cyber exploitation path analysis and response using federated networks to minimize network exposure and maximize network resilience, with the ability to simulate complex and large scale network traffic through the use of federated training networks, by gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Lastly, network attack path analysis and automated task planning for minimizing network exposure and maximizing resiliency is performed
(Continued)

with machine learning, generative adversarial networks, hierarchical task networks, and Monte Carlo search trees.

10 Claims, 51 Drawing Sheets

Related U.S. Application Data of application No. 18/186,117, filed on Mar. 17, 2023, now Pat. No. 12,225,042, which is a continuation of application No. 17/363,222, filed on Jun. 30, 2021, now Pat. No. 11,647,039, which is a continuation of application No. 16/807,007, filed on Mar. 2, 2020, now Pat. No. 11,089,045, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(58) Field of Classification Search
CPC ...... G06N 3/084; G06N 3/0475; G06N 3/094; G06N 3/098; G06N 5/01; G06N 20/00
USPC .......................................................... 726/22
See application file for complete search history.

(56) References Cited

U.S. PATENT DOCUMENTS

| | | |
|---|---|---|
| 6,477,572 B1 | 11/2002 | Elderton et al. |
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,881,288 B1 | 11/2014 | Levy et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,231,962 B1 | 1/2016 | Yen et al. |
| 9,294,497 B1 | 3/2016 | Ben-Or et al. |
| 9,306,965 B1 | 4/2016 | Grossman et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,762,443 B2 | 9/2017 | Dickey |
| 9,887,933 B2 | 2/2018 | Lawrence, III |
| 9,946,517 B2 | 4/2018 | Talby et al. |
| 10,061,635 B2 | 8/2018 | Ellwein |
| 10,102,480 B2 | 10/2018 | Dirac et al. |
| 10,210,246 B2 | 2/2019 | Stojanovic et al. |
| 10,210,255 B2 | 2/2019 | Crabtree et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,367,829 B2 | 7/2019 | Huang et al. |
| 10,511,498 B1 | 12/2019 | Narayan et al. |
| 11,228,616 B2 | 1/2022 | Khan et al. |
| 2003/0041254 A1 | 2/2003 | Challener et al. |
| 2003/0145225 A1 | 7/2003 | Bruton et al. |
| 2004/0098610 A1 | 5/2004 | Hrastar |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2009/0012760 A1 | 1/2009 | Schunemann |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0293128 A1 | 11/2009 | Lippmann et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0266244 A1 | 10/2012 | Green et al. |
| 2013/0073062 A1 | 3/2013 | Smith et al. |
| 2013/0132149 A1 | 5/2013 | Wei et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0156806 A1 | 6/2014 | Karpistsenko et al. |
| 2014/0244612 A1 | 8/2014 | Bhasin et al. |
| 2014/0279762 A1 | 9/2014 | Xaypanya et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0379424 A1 | 12/2015 | Dirac et al. |
| 2016/0004858 A1 | 1/2016 | Chen et al. |
| 2016/0028758 A1 | 1/2016 | Ellis et al. |
| 2016/0044054 A1* | 2/2016 | Stiansen ............ H04L 63/1416 726/24 |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0140519 A1 | 5/2016 | Trepca et al. |
| 2016/0171415 A1 | 6/2016 | Yampolskiy et al. |
| 2016/0212171 A1 | 7/2016 | Senanayake et al. |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0322959 A1 | 11/2017 | Tidwell et al. |
| 2017/0323089 A1 | 11/2017 | Duggal et al. |

(56) References Cited

U.S. PATENT DOCUMENTS

| | | |
|---|---|---|
| 2018/0197128 A1 | 7/2018 | Carstens et al. |
| 2018/0300930 A1 | 10/2018 | Kennedy et al. |
| 2019/0082305 A1 | 3/2019 | Proctor |
| 2019/0095533 A1 | 3/2019 | Levine et al. |
| 2021/0256115 A1 | 8/2021 | Shashanka et al. |
| 2022/0374515 A1 | 11/2022 | Bridges et al. |

FOREIGN PATENT DOCUMENTS

| | | | |
|---|---|---|---|
| WO | 2014159150 A1 | 10/2014 | |
| WO | 2017075543 A1 | 5/2017 | |
| WO | 2022047415 A1 | 3/2022 | |
| WO | WO-2022165143 A1 * | 8/2022 | ............. G06N 20/20 |
| WO | 2023091753 A1 | 5/2023 | |
| WO | WO-2024092323 A1 * | 5/2024 | ........... G06F 21/577 |

OTHER PUBLICATIONS

Shaukat, Kamran et al., "A Survey on Machine Learning Techniques for Cyber Security in the Last Decade", Dec. 2, 2020, IEEE Access vol. 8, pp. 222310-222354.

* cited by examiner

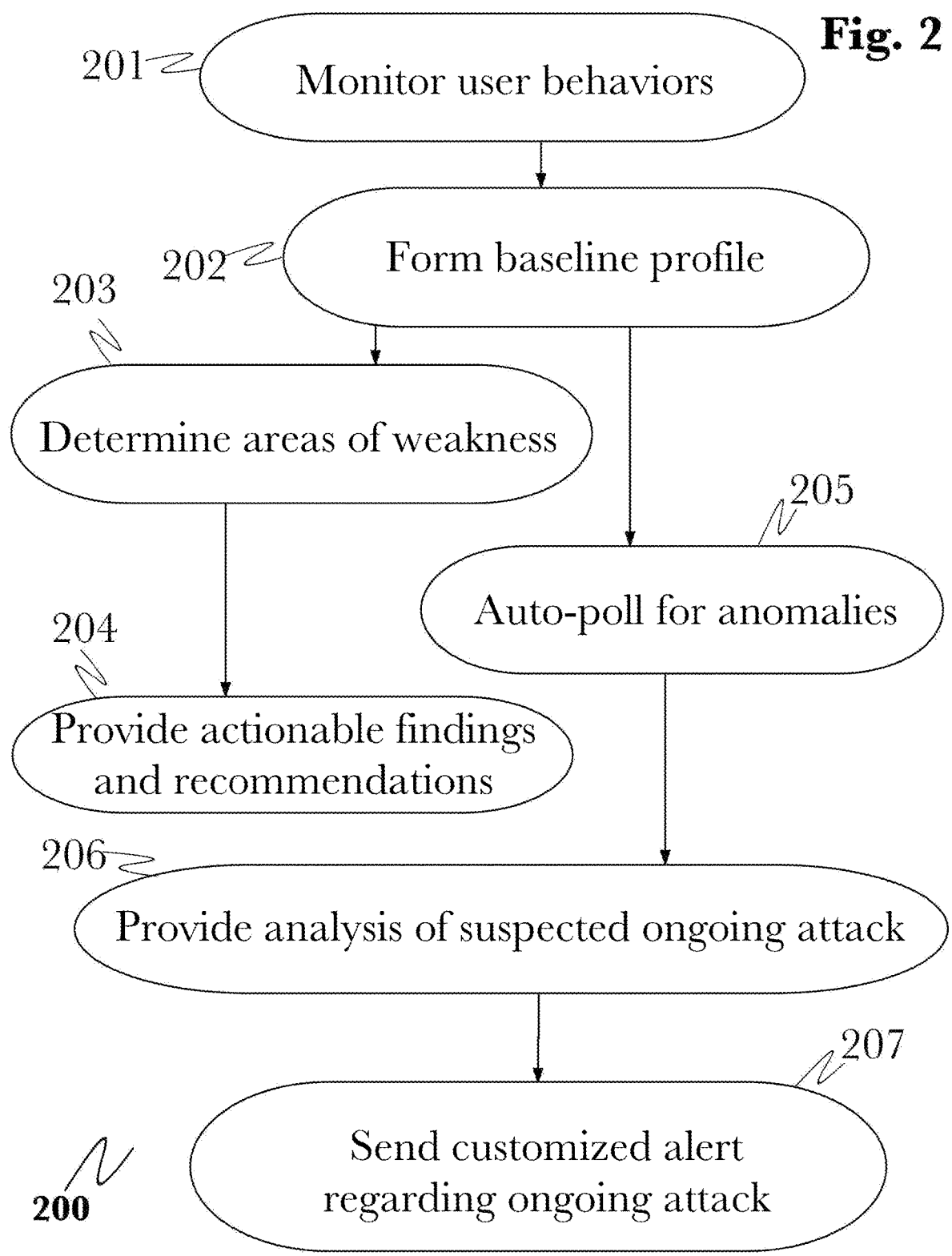

Fig. 15    1500

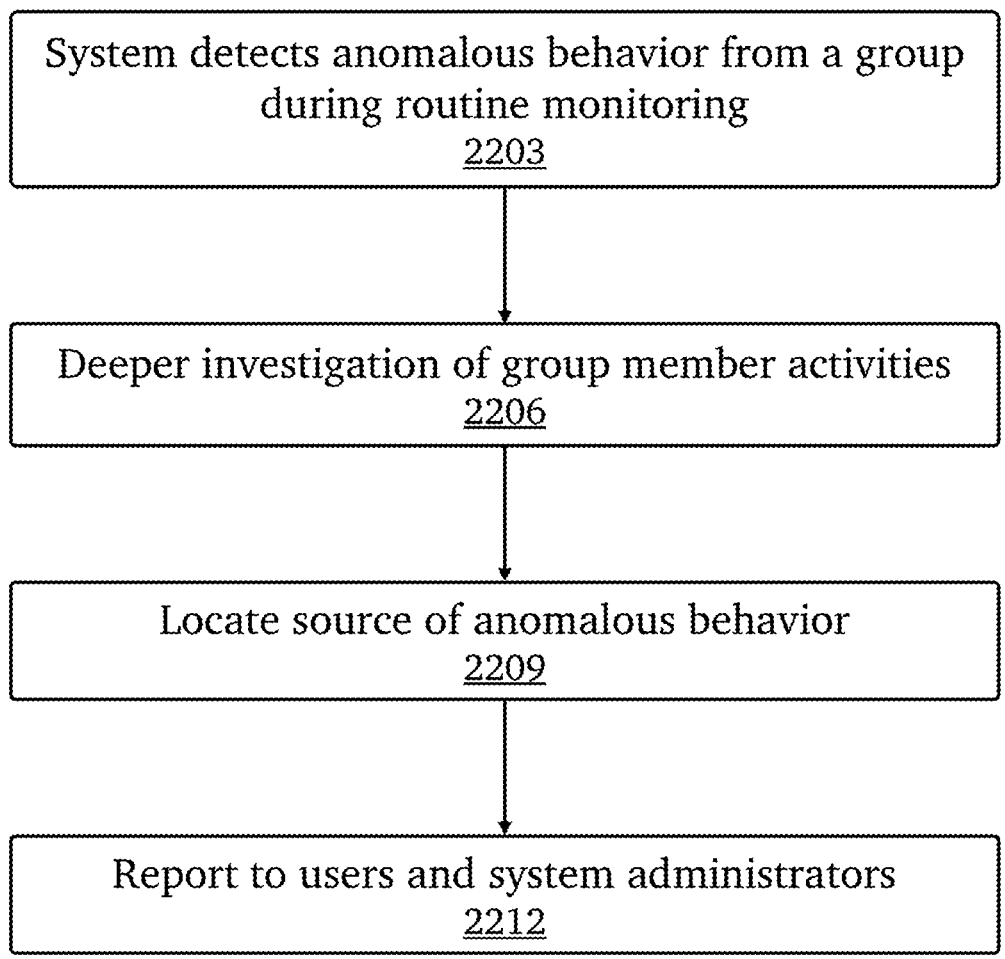
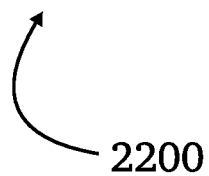
Fig. 22

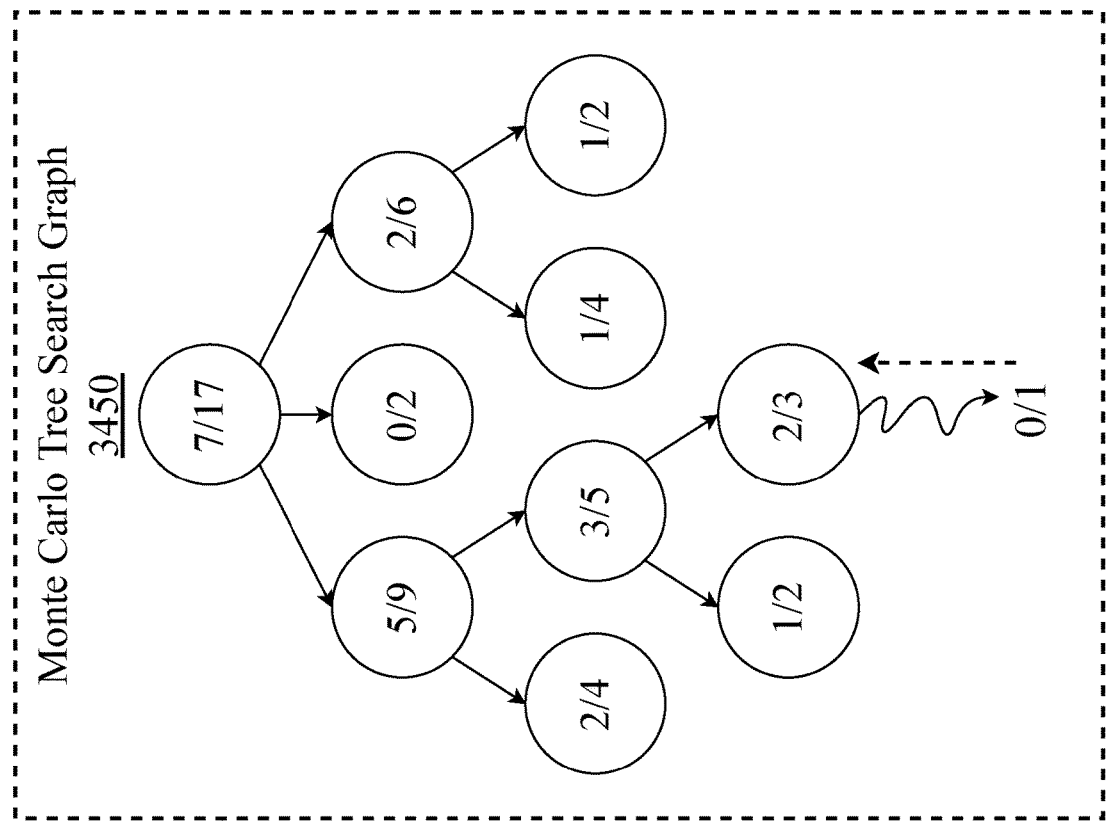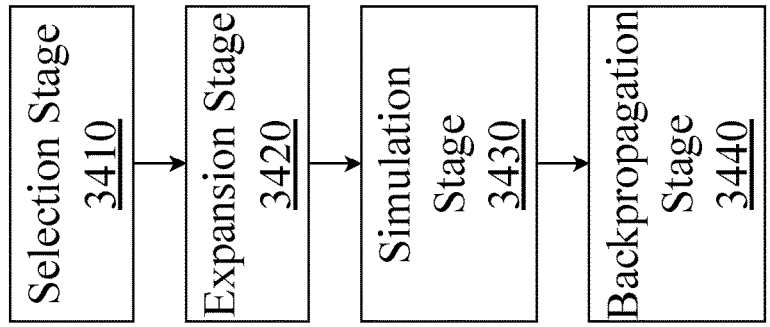
Fig. 34

Calculate the tested system's Blast Score - count the number of penetrated or compromised interconnected networks, devices, endpoints, services, or datasets that are/would be affected by cyber game
3710

Calculate the tested system's Resilience Score - determine the likely, demonstrated, or possible (depending on available data) ability of a system of network to continue operating, functioning, or recovering from a cyber security incident
3720

Apply possible mathematical transformations or normalizations to scores, such as weighting
3730

Record results of cyber game testing on system, for the specified network model or topology
3740

Depending on different network and system topologies, and different cyber games and the relationships between the network/system setups and their scores post-cyber-game, future decisions on best cyber games to run on given networks or systems may be made
3750

Provide scores to system administrators to allow them to understand network or system vulnerabilities and resiliency
3760

Fig. 37

Financial impact of given services going out for a given timeframe, and financial value of different devices in network, are uploaded to system
3810

HTN and GAN may be trained to consider value and therefore importance of specific services/devices
3820

Resilience scoring may be weighted towards higher financial impact services, i.e. more financially impactful losses translate to lower resilience scoring
3830

Plans of action to address and minimize future cyber game or real-world incidents are produced and deployed with goal of minimizing not just network vulnerabilities, but financial impact
3840

Fig. 38

```
┌─────────────────────────────────────────────────────────────────┐
│  Geographic distribution of networked systems being simulated and tested │
│                  is uploaded to analysis system                 │
│                              4010                               │
└─────────────────────────────────────────────────────────────────┘
                                  ↓
┌─────────────────────────────────────────────────────────────────┐
│  Effects of natural weather disturbances such as hurricanes or earthquakes │
│    are simulated; geographically connected ore co-located devices and    │
│   services may be simulated to suddenly be offline in such a cyber game  │
│                              4020                               │
└─────────────────────────────────────────────────────────────────┘
                                  ↓
┌─────────────────────────────────────────────────────────────────┐
│  Third-party API's, cloud services, or other supply-chain-like disruptions │
│    for networked services and devices may be simulated in similar manner,  │
│     such as CDNs or DDoS protection services and cloud computing going     │
│              offline based on the provider or location of services         │
│                              4030                               │
└─────────────────────────────────────────────────────────────────┘
                                  ↓
┌─────────────────────────────────────────────────────────────────┐
│   Resilience scoring implicitly reflects geographic and weather-related    │
│  vulnerabilities, and third-party vulnerabilities (such as using one provider │
│        for too many services, or using one physical location for too many     │
│              services and hosting too many devices there)                  │
│                              4040                               │
└─────────────────────────────────────────────────────────────────┘
```

Fig. 40

COMPUTER-IMPLEMENTED SYSTEM AND METHOD FOR CYBERSECURITY THREAT ANALYSIS USING FEDERATED MACHINE LEARNING AND HIERARCHICAL TASK NETWORKS

CROSS-REFERENCE TO RELATED APPLICATIONS

Priority is claimed in the application data sheet to the following patents or patent applications, each of which is expressly incorporated herein by reference in its entirety:
Ser. No. 18/354,651
Ser. No. 18/186,117
Ser. No. 17/363,222
Ser. No. 16/807,007
Ser. No. 15/825,350
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536

BACKGROUND OF THE INVENTION

Field of the Invention

The disclosure relates to the field of network security, particularly to the mitigation of threats by simulating network traffic using federated simulations and learning techniques, and optimizing response plans using machine learning and advanced tree graph searching techniques.

Discussion of the State of the Art

Cyberattacks are an ever-evolving threat that many companies today must face and deal with and ignoring the problem may be costly to not only the companies, but also their customers. With the ever-evolving nature, it may be difficult to predict when and what types of threats that a security expert must anticipate. One method that is being used today is detecting threats by monitoring a network and its connected users and devices to monitor for anomalous behavior. However, traditional methods may be limited in scope in the information analyzed, as well as having a limit to their data processing capabilities. Such limitations may overlook information that is only discernable when multiple sources of information are inspected together.

What is needed is a system and method that can gather information related to user and device behaviors, analyze that information for risks related to cybersecurity purposes, and incorporate network topology and simulated network traffic to improve cybersecurity recommendations.

SUMMARY OF THE INVENTION

Accordingly, the inventor has conceived, and reduced to practice, a system and method for cyber exploitation path analysis and task plan optimization to minimize network exposure and maximize network resilience. The system and method involve gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Lastly, network attack path analysis and automated task planning for minimizing network exposure and maximizing resiliency is performed with machine learning, generative adversarial networks, hierarchical task networks, and Monte Carlo search trees.

According to a preferred embodiment, a system for cyber exploitation path analysis and response using federated networks, comprising: a computing device comprising a memory and a processor; a directed graph stored in the memory of the computing device, the directed graph comprising a representation of a computer network wherein: nodes of the directed graph represent entities comprising the computer network; and edges of the directed graph represent relationships between the entities of the computer network; a machine learning engine comprising a plurality of programming instructions stored in the memory of, and operating on the processor of, the computing device, wherein the plurality of programming instructions, when operating on the processor, cause the computing device to: receive information about the topology and setup of a network of entities, from a directed graph; simulate fake computer network traffic; use machine learning techniques including neural networks to attempt to classify the computer network traffic either as legitimate or as simulated fake computer network traffic; and a hierarchical task network engine comprising a plurality of programming instructions stored in the memory of, and operating on the processor of, the computing device, wherein the plurality of programming instructions, when operating on the processor, cause the computing device to: receive information about the topology and setup of a network of entities, from a directed graph; receive information about simulated fake computer network traffic from a machine learning engine; and create an automated task plan for minimizing network exposure and maximizing network resilience against simulated fake network traffic.

According to another preferred embodiment, a method for cyber exploitation path analysis and response using federated networks, comprising the steps of: storing a directed graph in the memory of a computing device, the directed graph comprising a representation of a computer network wherein: nodes of the directed graph represent entities comprising the computer network; and edges of the directed graph represent relationships between the entities of the computer network; receiving information about the topology and setup of a network of entities, from a directed graph, using a machine learning engine; simulating fake computer network traffic, using a machine learning engine; using machine learning techniques including neural networks to attempt to classify the computer network traffic either as legitimate or as simulated fake computer network traffic, using a machine learning engine; receiving information about the topology and setup of a network of entities, from a directed graph, using a hierarchical task network engine; receiving information about simulated fake computer network traffic from a machine learning engine, using a hierarchical task network engine; and creating an automated task plan for minimizing network exposure and maximizing network resilience against simulated fake network traffic, using a hierarchical task network engine.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 2 is a flow diagram of an exemplary function of the business operating system in the detection and mitigation of predetermining factors leading to and steps to mitigate ongoing cyberattacks.

FIG. 22 is a flow diagram for an exemplary method for handing a detection of anomalous behavior, according to one aspect.

FIG. 34 is a system diagram illustrating an exemplary implementation and architecture of a Monte Carlo Tree Search algorithm.

FIG. 37 is a diagram illustrating a method for calculating blast radius scores and resilience scores for a network, according to an embodiment.

FIG. 38 is a diagram illustrating a method for calculating possible insurance or financial risks and impacts for a network based on exploitation path simulations, according to an embodiment.

FIG. 40 is a diagram illustrating a method for analyzing a network's vulnerability to natural disaster or weather impacts, and third party service disruption, according to an embodiment.

DETAILED DESCRIPTION OF THE INVENTION

Figure 1:
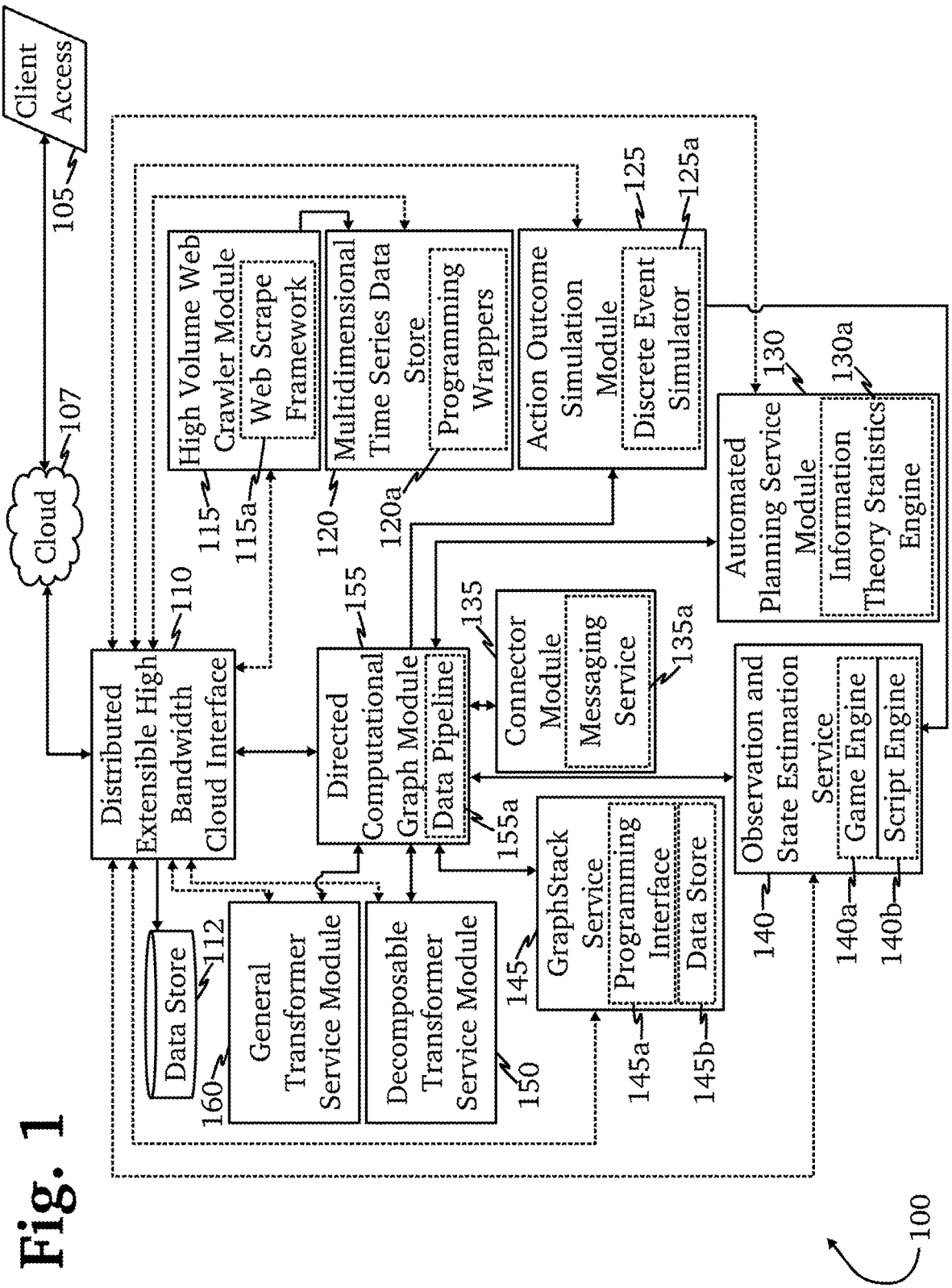
FIG. 1 is a diagram of an exemplary architecture of an advanced cyber decision platform according to one aspect.

The inventor has conceived, and reduced to practice, a system and method for cyber exploitation path analysis and response using federated networks to minimize network exposure and maximize network resilience, with the ability to simulate complex and large scale network traffic through the use of federated training networks, by gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Lastly, network attack path analysis and automated task planning for minimizing network exposure and maximizing resiliency is performed with machine learning, generative adversarial networks, hierarchical task networks, and Monte Carlo search trees.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English." Similar to the use of properties to further describe the information in a node, a relationship between two nodes that forms an edge can be qualified using a "label." Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on one or more streams of input data which results in a single stream of output which may or may not then be used as input for another transformation. Transformations may comprise any combination of machine, human or machine-human interactions. Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines may consist of two or more transformations with the number of transformations limited only by the resources of the system. Historically, transformation pipelines have been linear, with each transformation in the pipeline receiving input from one antecedent and providing output to one subsequent with no branching or iteration. Other pipeline configurations are possible. The invention is designed to permit several of these configurations including, but not limited to linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events may flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral).

Conceptual Architecture

FIG. 1 is a diagram of an exemplary architecture of an advanced cyber decision platform (ACDP) 100 according to one aspect. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never passed to it to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130a of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125a which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140b.

According to one aspect, the advanced cyber decision platform, a specifically programmed usage of the business operating system, continuously monitors a client enterprise's normal network activity for behaviors such as but not limited to normal users on the network, resources accessed by each user, access permissions of each user, machine to machine traffic on the network, sanctioned external access to the core network and administrative access to the network's identity and access management servers in conjunction with real-time analytics informing knowledge of cyberattack methodology. The system then uses this information for two purposes: First, the advanced computational analytics and simulation capabilities of the system are used to provide immediate disclosure of probable digital access points both at the network periphery and within the enterprise's information transfer and trust structure and recommendations are given on network changes that should be made to harden it prior to or during an attack. Second, the advanced cyber decision platform continuously monitors the network in real-time both for types of traffic and through techniques such as deep packet inspection for pre-decided analytically significant deviation in user traffic for indications of known cyberattack vectors such as, but not limited to, ACTIVE DIRECTORY™/Kerberos pass-the-ticket attack, ACTIVE DIRECTORY™/Kerberos pass-the-hash attack and the related ACTIVE DIRECTORY™/Kerberos overpass-the-hash attack, ACTIVE DIRECTORY™/Kerberos Skeleton Key, ACTIVE DIRECTORY™/Kerberos golden and silver ticket attack, privilege escalation attack, compromised user credentials, and ransomware disk attacks. When suspicious activity at a level signifying an attack (for example, including but not limited to skeleton key attacks, pass-the-hash attacks, or attacks via compromised user credentials) is determined, the system issues action-focused alert information to all predesignated parties specifically tailored to their roles in attack mitigation or remediation and formatted to provide predictive attack modeling based upon historic, current, and contextual attack progression analysis such that human decision makers can rapidly formulate the most effective courses of action at their levels of responsibility in command of the most actionable information with as little distractive data as possible. The system then issues defensive measures in the most actionable form to end the attack with the least possible damage and exposure. All attack data are persistently stored for later forensic analysis.

Figure 1A:
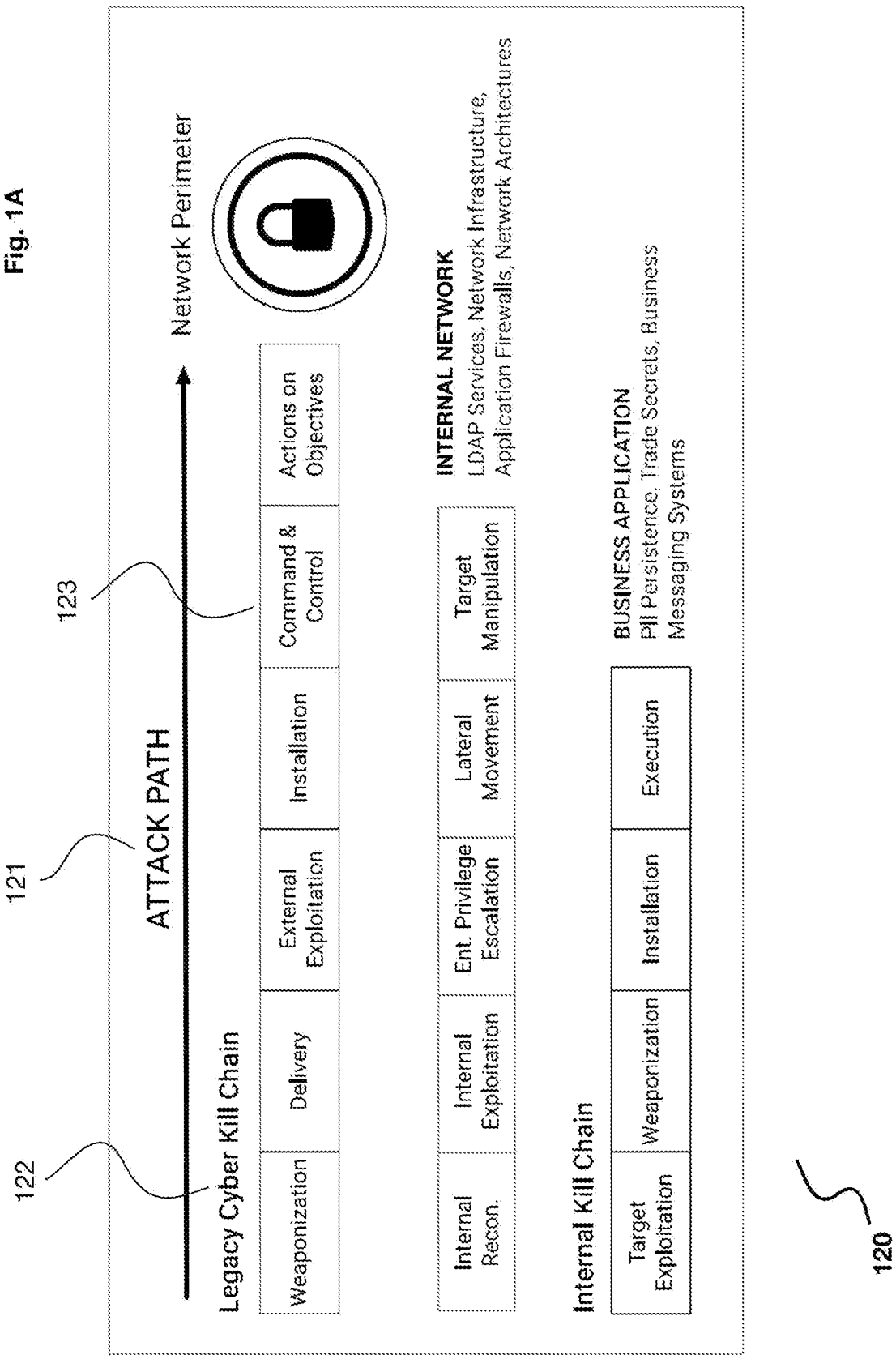
FIG. 1A is a diagram showing a typical method of cyberattack on a networked system.

FIG. 1A is a diagram showing the typical method of cyberattack on a networked system 120. The general attack path 121 flows from left to right. A kill chain 122 shows the general steps 123 required to complete a cyberattack from furthest away from completion of the attack (toward the left) to closest to completion of the attack (toward the right). The further to the left of the diagram that a cyber-attack is stopped, the fewer components of the system are compromised.

Figure 1B:
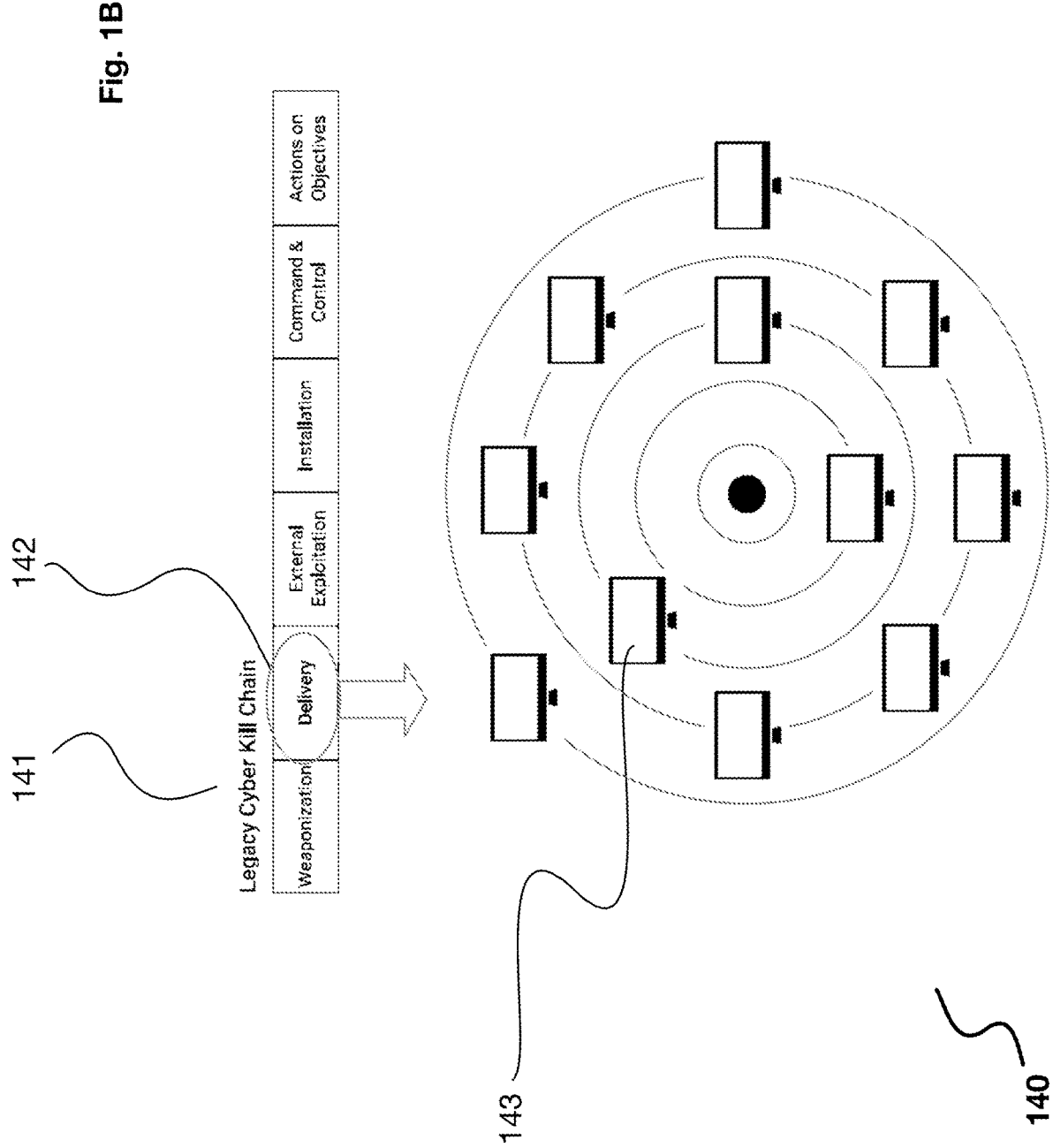
FIG. 1B is a diagram showing a method of cyberattack used when "rogue" devices are attached to a network.

FIG. 1B is a diagram showing a method of cyberattack used when "rogue" devices are attached to the network 140. Rogue devices are devices attached to the network, usually without the network administrator's knowledge, that create vulnerabilities in the network. Examples of rogue devices are: wireless credit card skimmers or keyloggers, un-configured or mis-configured wireless printers, "hot spots" enabled by non-malicious employees for their convenience, a Wi-Fi USB card used by attackers to lure unsuspecting users to log onto a fake wireless network. The often transient nature of these exploits makes them particularly difficult to detect and mitigate using state of the art technology. In one example of this method of cyberattack, called the "legacy cyber kill chain" 141, the attacker attempts to access the system by finding and exploiting legacy devices whose hardware and/or software are no longer capable of preventing modern, sophisticated cyberattacks. In this particular use, the advanced cyber decision platform identifies such legacy devices 143, and blocks access to the network from those devices, thus terminating the cyberattack at the delivery stage 142 of the kill chain.

Figure 1C:
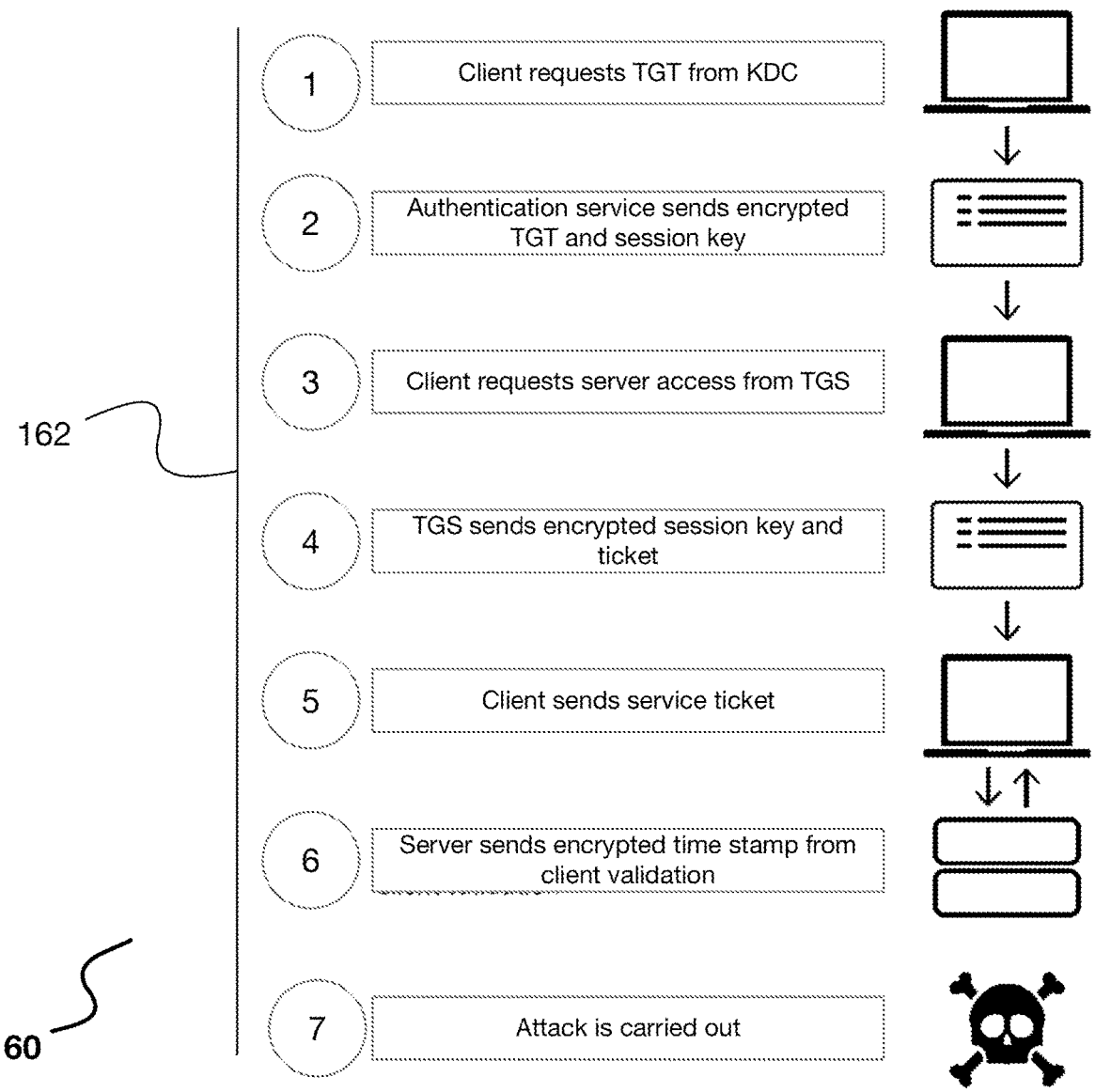
FIG. 1C is a diagram showing a method of cyberattack used when the network perimeter has been breached.

FIG. 1C is a diagram showing a method of cyberattack used when the network perimeter has been breached 160. This kill chain 161 for this method, also called a "golden ticket" attack, involves escalating the administrative privileges of the attacker, giving the attacker full control over files, servers, and services 162. The current state of the art for preventing privilege escalation attacks is to use a network authentication protocol such as Kerberos to generate and verify encrypted digital signatures. However, if an attacker is able to compromise the Kerberos system, the attacker can use Kerberos to forge surreptitious but protocol-valid digital signatures giving the attacker full administrative control over the network (the "Golden Ticket") without detection. Such attacks represent a high level of threat, and the advanced cyber decision platform can identify and prevent them by analyzing a broad range of data and sensors beyond just the digital signature. In this particular use, the advanced cyber decision platform continuously monitors the entire network to identify erroneously issued tickets, stops the issuance of the ticket, and notifies the network administrators of an attempted attack, thus terminating the cyberattack at the privilege escalation stage 163 of the kill chain.

Figure 1D:
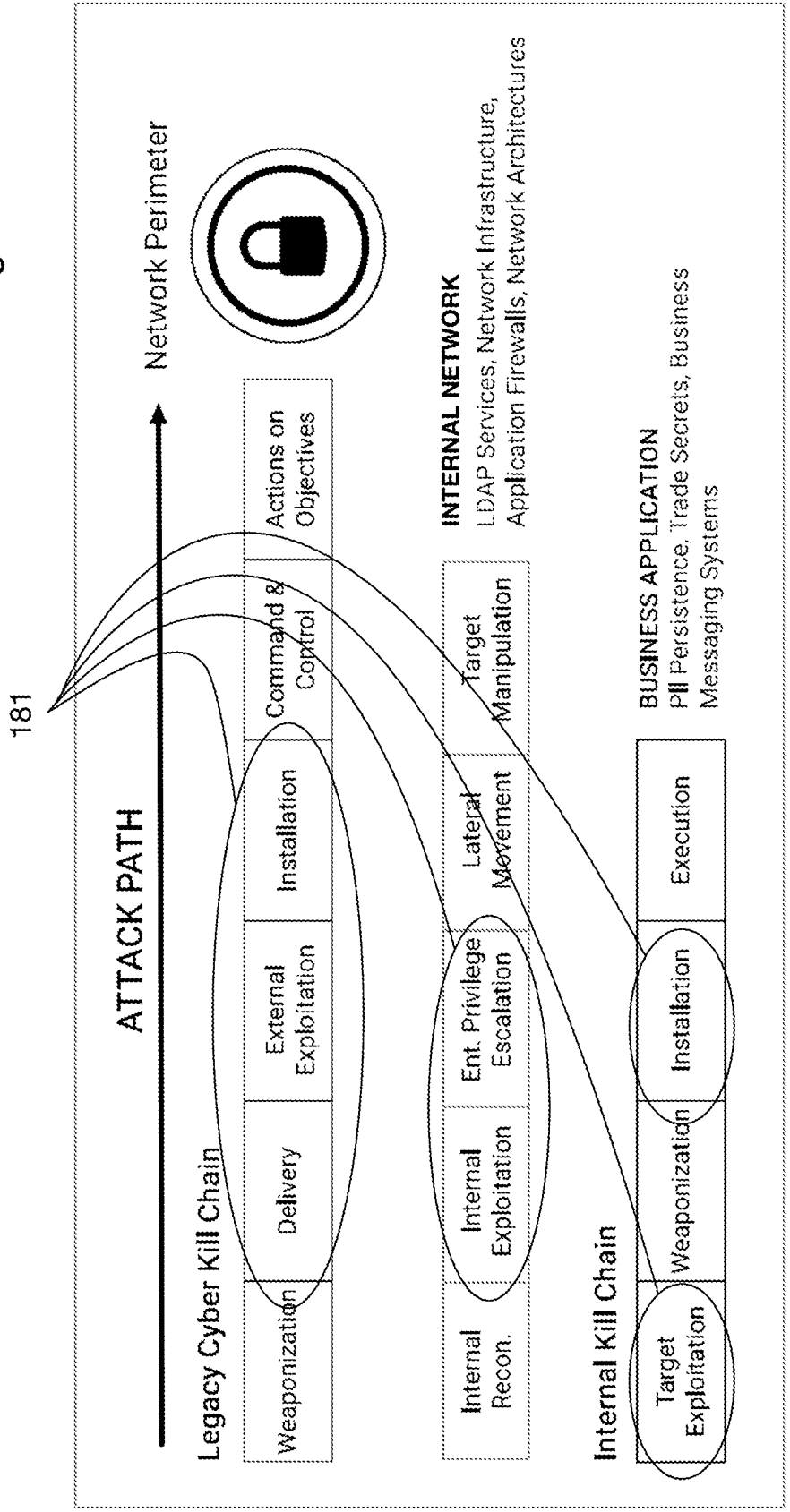
FIG. 1D is a diagram showing the typical method of cyberattack used when software has not been patched in a timely manner.

FIG. 1D is a diagram showing the typical method of cyberattack used when software has not been patched in a timely manner 180. In this method, there can be vulnerabilities at many points in the network, depending on the nature of the patches that have not yet been applied. The state of the art in this area is to apply patches on a compliance basis, which means that vulnerabilities are given a high, moderate, or low criticality rating, and patches are required to be installed in a pre-determined amount of time depending on the rating. This leads to inefficiencies, vulnerabilities, and increased cost, as compliance-based patching does not account for factors such as: resources allocated to patching vulnerabilities that are not present on a particular network, high-criticality patches may be deployed on systems with no valuable business data before low-criticality patches are deployed on systems with highly valuable data, interconnectivity of systems with the rest of the network, and the like. Further, vulnerabilities can be exploited before patches are distributed to the National Vulnerability Database and/or to third party scanning software. In this particular use, the advanced cyber decision platform leverages superior data extraction capabilities to collect information about new vulnerabilities and exploits before they make it to NVD and third party scanners, increasing network protection above the current state of the art. Further, the advanced cyber decision platform continuously monitors the entire network to identify and prioritize available patches, thus protecting the network from attack at multiple stages 181 of the kill chain.

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 2A:
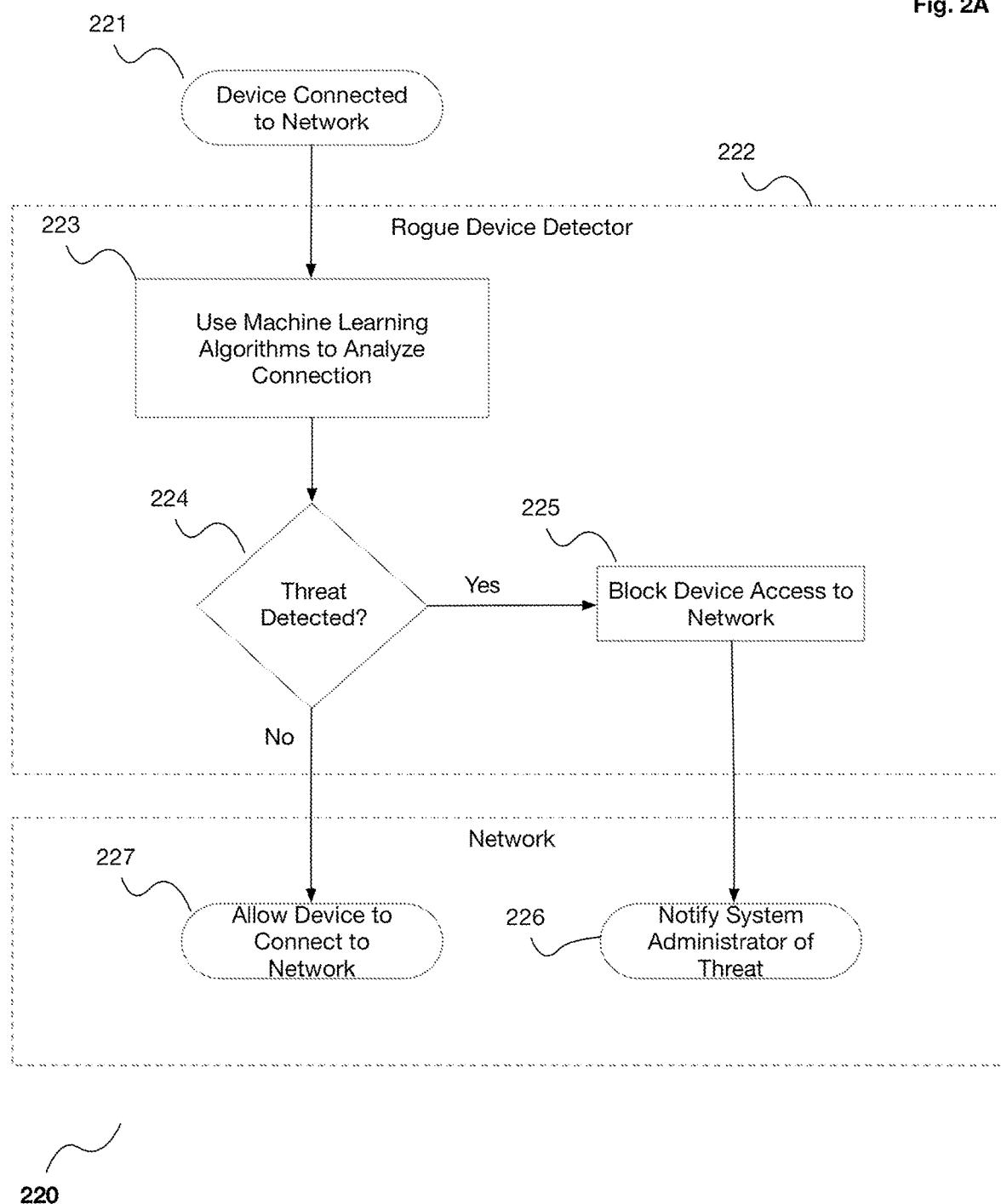
FIG. 2A is a process diagram showing a general flow of the process used to detect rogue devices and analyze them for threats.

FIG. 2A is a process diagram showing a general flow of the process used to detect rogue devices and analyze them for threats 220. Whenever a device is connected to the network 221, the connection is immediately sent to the rogue device detector 222 for analysis. As disclosed below at 300, the advanced cyber decision platform uses machine learning algorithms to analyze system-wide data to detect threats. The connected device is analyzed 223 to assess its device type, settings, and capabilities, the sensitivity of the data stored on the server to which the device wishes to connect, network activity, server logs, remote queries, and a multitude of other data to determine the level of threat associated with the device. If the threat reaches a certain level 224, the device is automatically prevented from accessing the network 225, and the system administrator is notified of the potential threat, along with contextually-based, tactical recommendations for optimal response based on potential impact 226. Otherwise, the device is allowed to connect to the network 227.

Figure 2B:
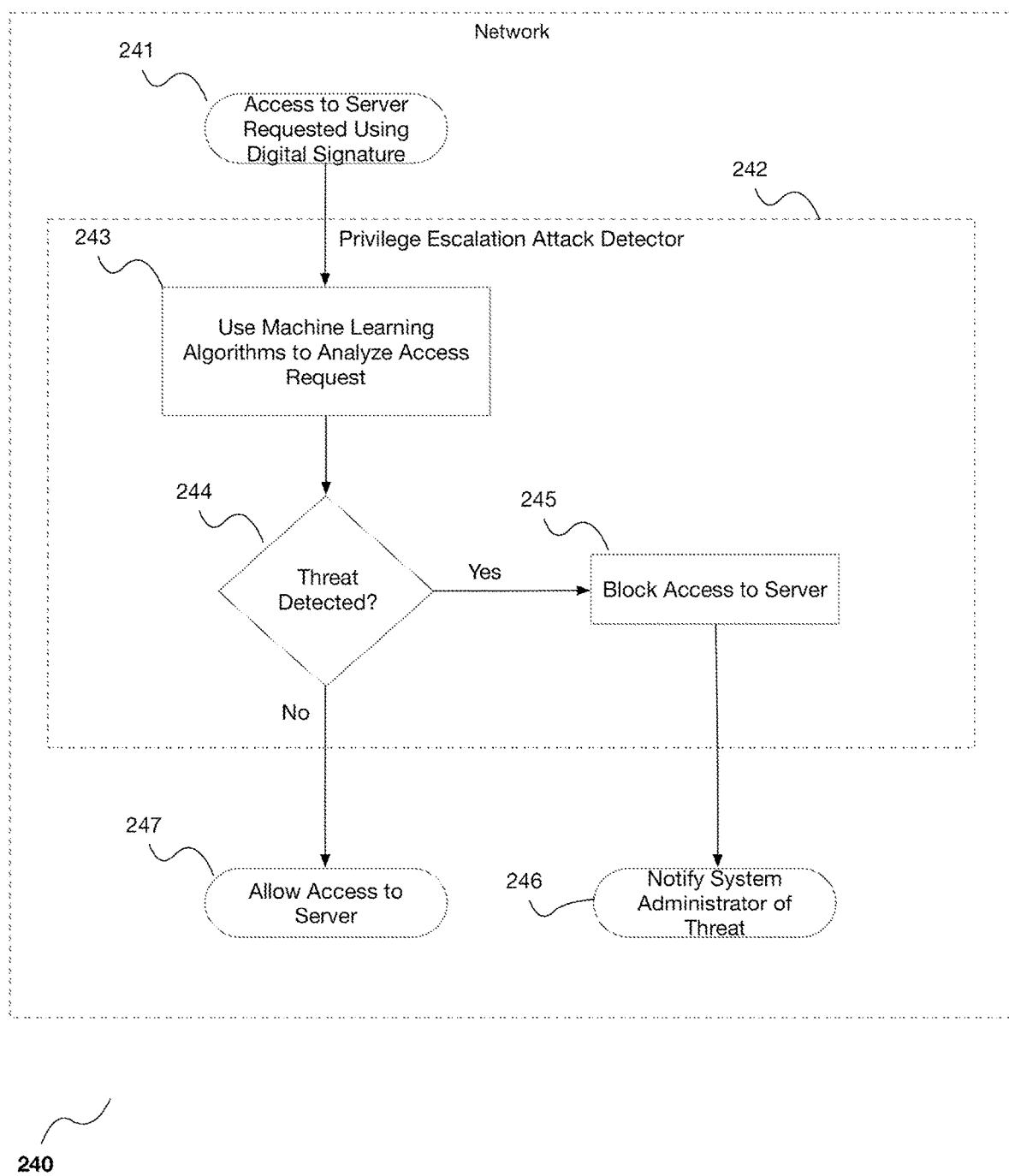
FIG. 2B is a process diagram showing a general flow of the process used to detect and prevent privilege escalation attacks on a network.

FIG. 2B is a process diagram showing a general flow of the process used to detect and prevent privilege escalation attacks on a network (otherwise known as "Golden Ticket" attacks) 240. When access to a server within the network is requested using a digital signature 241, the connection is immediately sent to the privilege escalation attack detector 242 for analysis. As disclosed below at 300, the advanced cyber decision platform uses machine learning algorithms to analyze system-wide data to detect threats. The access request is analyzed 243 to assess the validity of the access request using the digital signature validation, plus other system-wide information such as the sensitivity of the server being accessed, the newness of the digital signature, the digital signature's prior usage, and other measures of the digital signature's validity. If the assessment determines that the access request represents a significant threat 244, even despite the Kerberos validation of the digital signature, the access request is automatically denied 245, and the system administrator is notified of the potential threat, along with contextually-based, tactical recommendations for optimal response based on potential impact 246. Otherwise, the access request is granted 247.

Figure 2C:
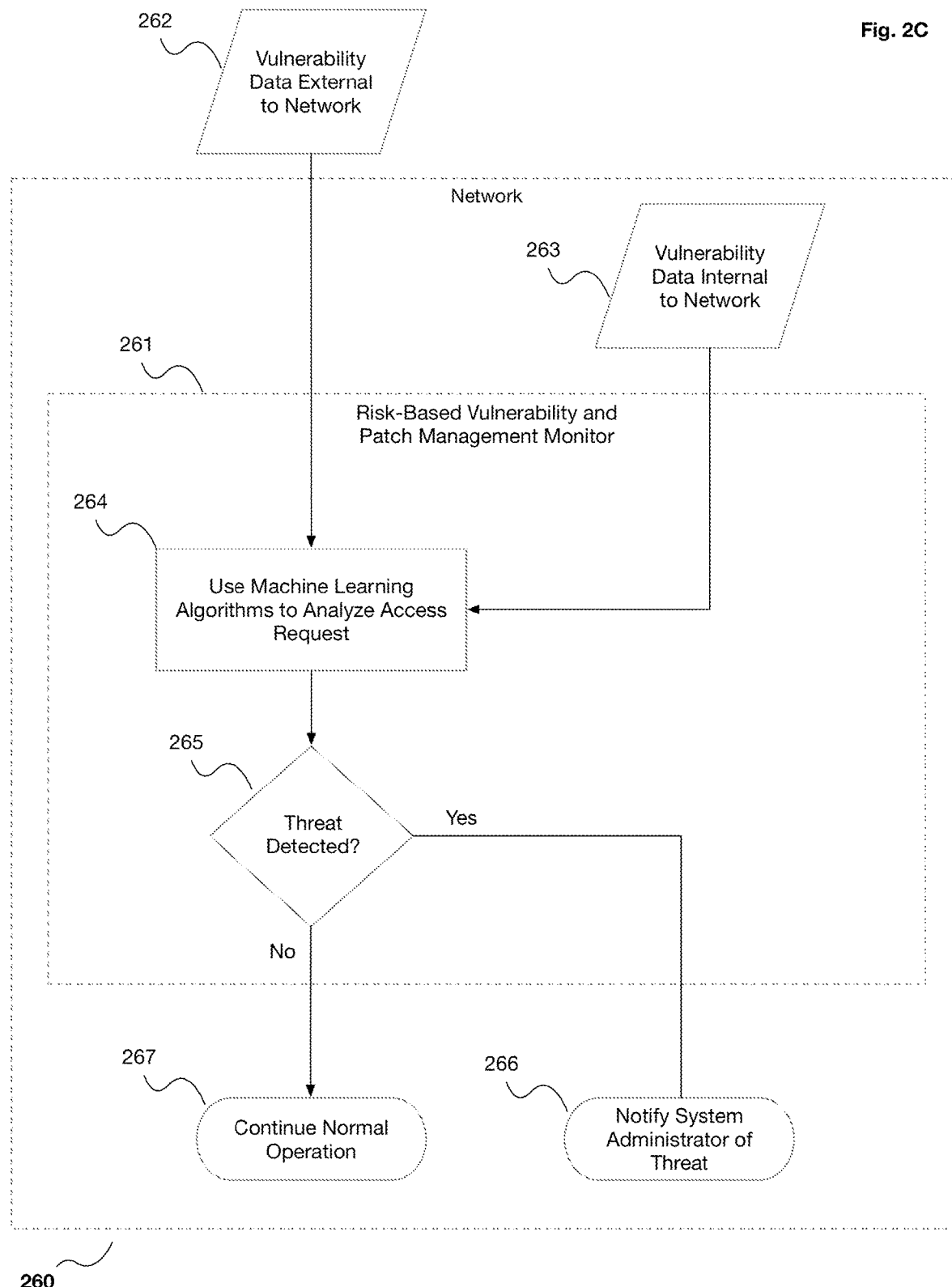
FIG. 2C is a process diagram showing a general flow of the process used to manage vulnerabilities associated with patches to network software.

FIG. 2C is a process diagram showing a general flow of the process used to manage vulnerabilities associated with patches to network software 260. As part of a continuously-operating risk-based vulnerability and patch management monitor 261, data is gathered from both sources external to the network 262 and internal to the network 263. As disclosed below at 300, the advanced cyber decision platform uses machine learning algorithms to analyze system-wide data to detect threats. The data is analyzed 264 to determine whether network vulnerabilities exist for which a patch has not yet been created and/or applied. If the assessment determines that such a vulnerability exists 265, whether or not all software has been patched according to manufacturer recommendations, the system administrator is notified of the potential vulnerability, along with contextually-based, tactical recommendations for optimal response based on potential impact 266. Otherwise, network activity is allowed to continue normally 267.

Figure 3:
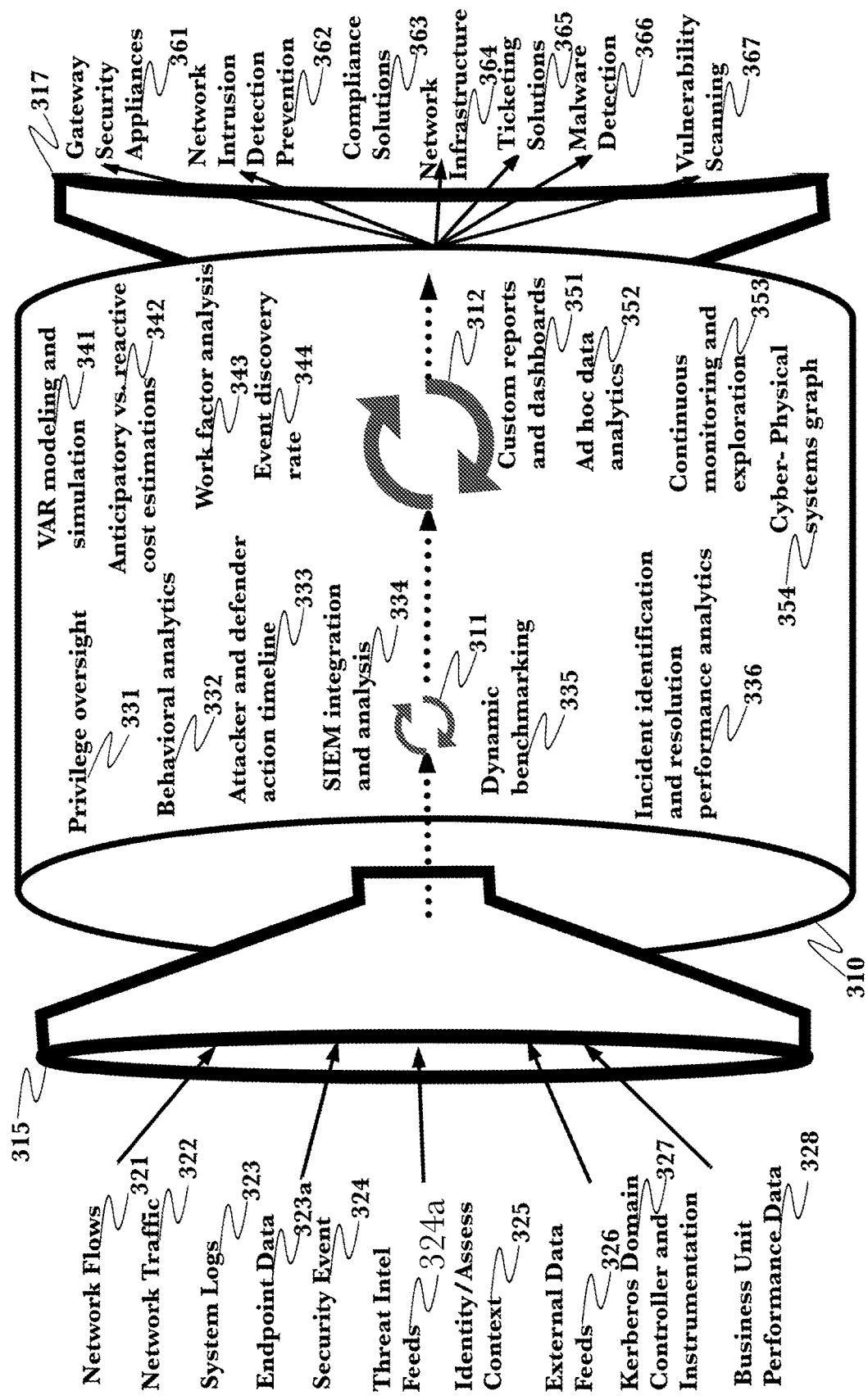
FIG. 3 is a process diagram showing business operating system functions in use to mitigate cyberattacks.

FIG. 3 is a process diagram showing a general flow 300 of business operating system functions in use to mitigate cyberattacks. Input network data which may include network flow patterns 321, the origin and destination of each piece of measurable network traffic 322, system logs from servers and workstations on the network 323, endpoint data 323a, any security event log data from servers or available security information and event (STEM) systems 324, external threat intelligence feeds 324a, identity or assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
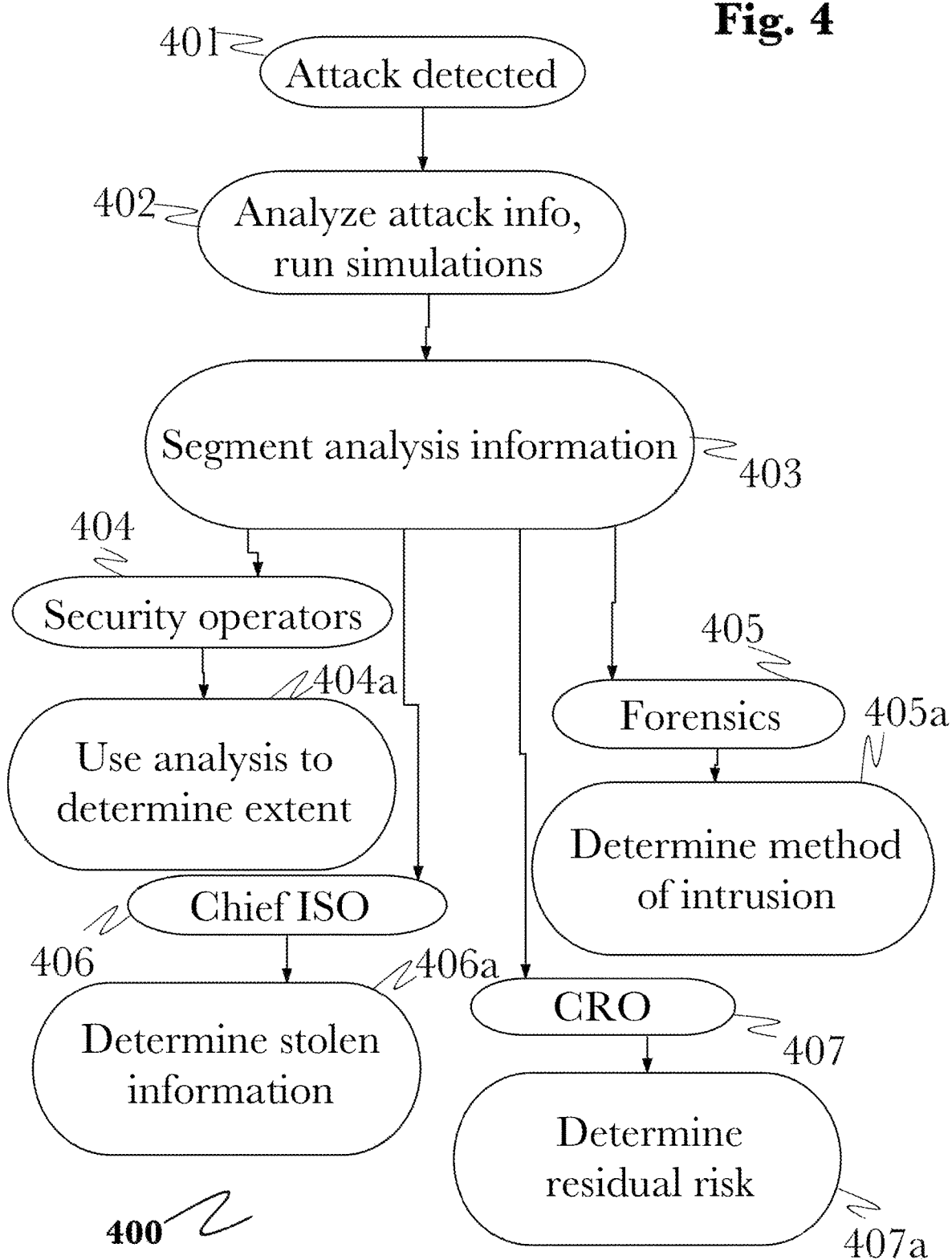
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407a was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

Figure 5:
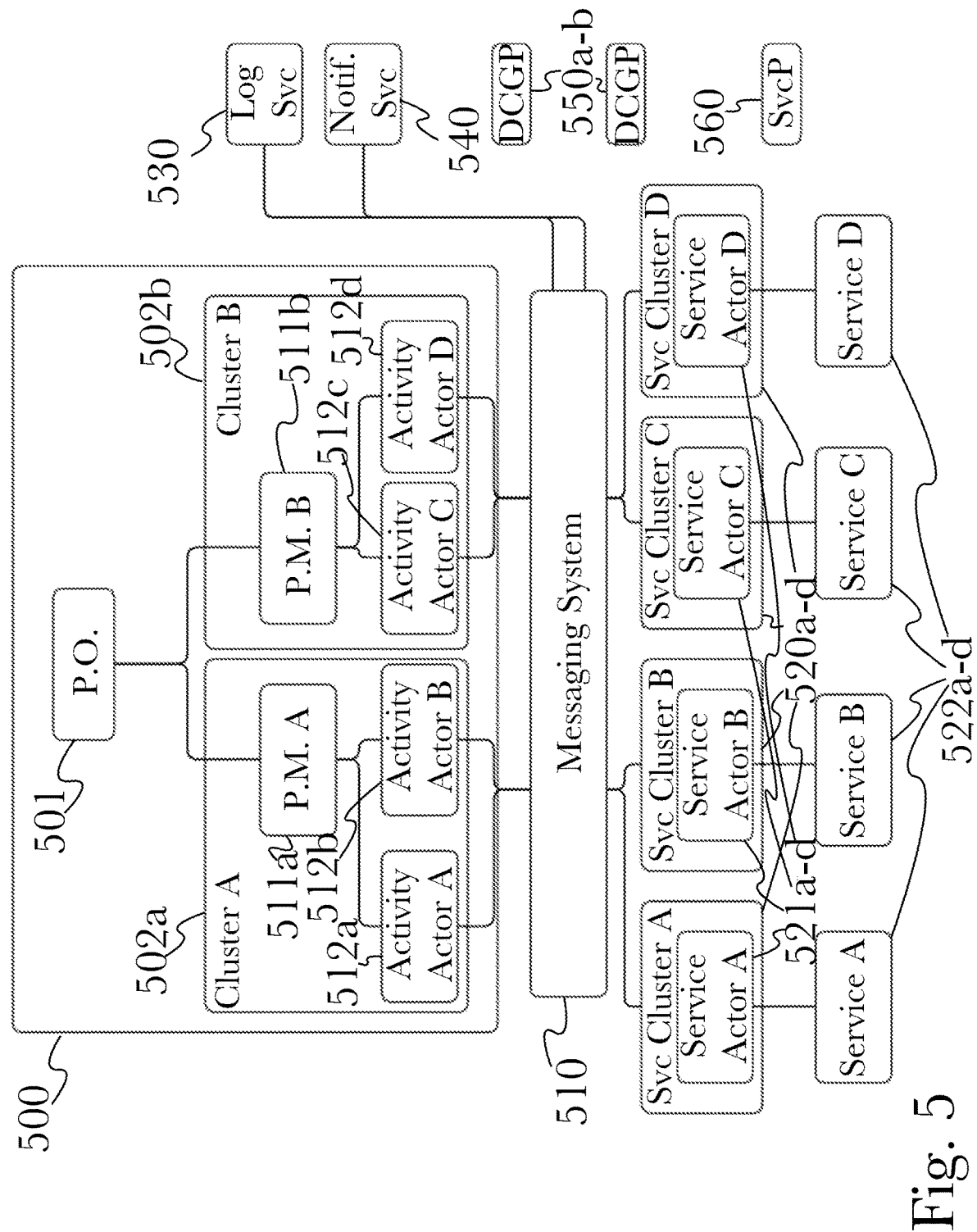
FIG. 5 is a diagram of an exemplary architecture for a system for rapid predictive analysis of very large data sets using an actor-driven distributed computational graph, according to one aspect.

FIG. 5 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502a-b, which may be used as dedicated workers for streamlining parallel processing. In some arrangements, an entire data processing pipeline may be passed to a child cluster 502a for handling, rather than individual processing tasks, enabling each child cluster 502a-b to handle an entire data pipeline in a dedicated fashion to maintain isolated processing of different pipelines using different cluster nodes 502a-b. Pipeline orchestrator 501 may provide a software API for starting, stopping, submitting, or saving pipelines. When a pipeline is started, pipeline orchestrator 501 may send the pipeline information to an available worker node 502a-b, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512a-d within a pipeline 502a-b to pass data contexts to one another, with any necessary parameter configurations.

A pipeline manager 511a-b may be spawned for every new running pipeline, and may be used to send activity, status, lifecycle, and event count information to the pipeline orchestrator 501. Within a particular pipeline, a plurality of activity actors 512a-d may be created by a pipeline manager 511a-b to handle individual tasks, and provide output to data services 522a-d. Data models used in a given pipeline may be determined by the specific pipeline and activities, as directed by a pipeline manager 511a-b. Each pipeline manager 511a-b controls and directs the operation of any activity actors 512a-d spawned by it. A pipeline process may need to coordinate streaming data between tasks. For this, a pipeline manager 511a-b may spawn service connectors to dynamically create TCP connections between activity instances 512a-d. Data contexts may be maintained for each individual activity 512a-d, and may be cached for provision to other activities 512a-d as needed. A data context defines how an activity accesses information, and an activity 512a-d may process data or simply forward it to a next step. Forwarding data between pipeline steps may route data through a streaming context or batch context.

A client service cluster 530 may operate a plurality of service actors 521a-d to serve the requests of activity actors 512a-d, ideally maintaining enough service actors 521a-d to support each activity per the service type. These may also be arranged within service clusters 520a-d, in a manner similar to the logical organization of activity actors 512a-d within clusters 502a-b in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550a-b may be used to provide structured messaging between a DCG 500 and messaging system 510, or to enable messaging system 510 to distribute DCG messages across service clusters 520a-d as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
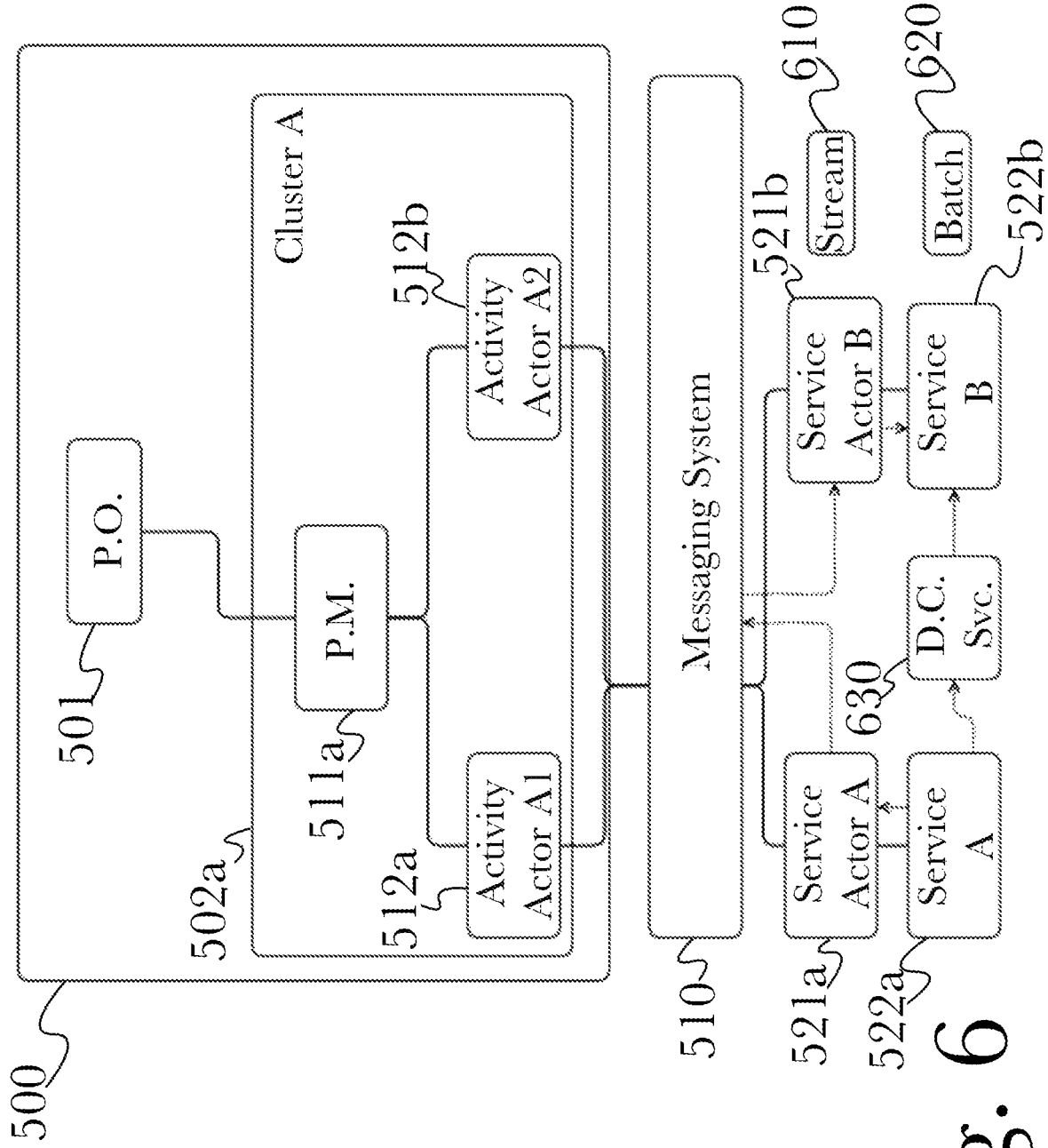
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521a-b as needed. Alternately, individual services 522a-b may communicate directly in a batch context 620, using a data context service 630 as a broker to batch-process and relay messages between services 522a-b.

Figure 7:
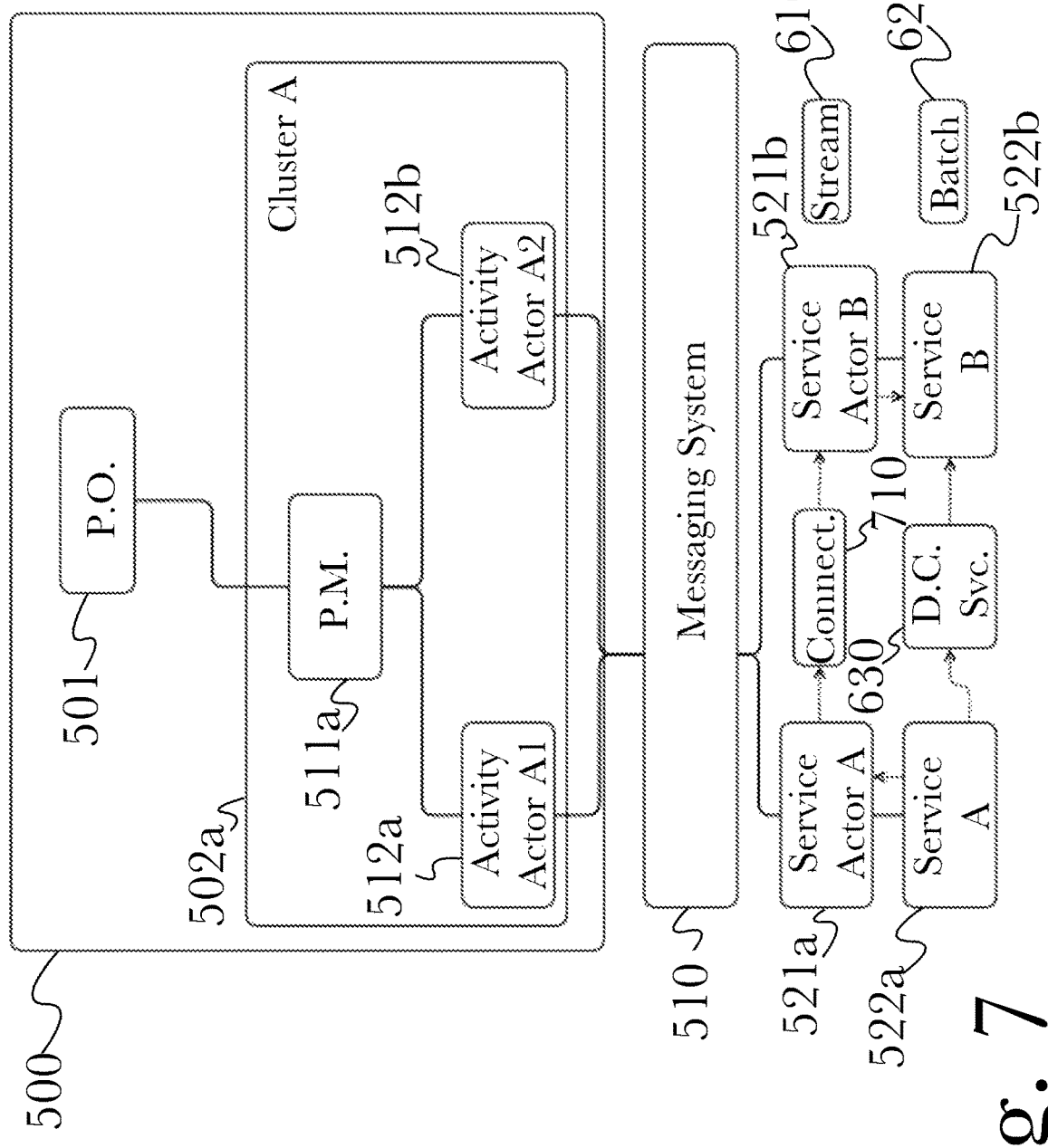
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521a-b, bridging messages in a streaming context 610 while a data context service 630 continues to provide direct peer-to-peer messaging between individual services 522a-b in a batch context 620.

It should be appreciated that various combinations and arrangements of the system variants described above (referring to FIGS. 1-7) may be possible, for example using one particular messaging arrangement for one data pipeline directed by a pipeline manager 511a-b, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Figure 8:
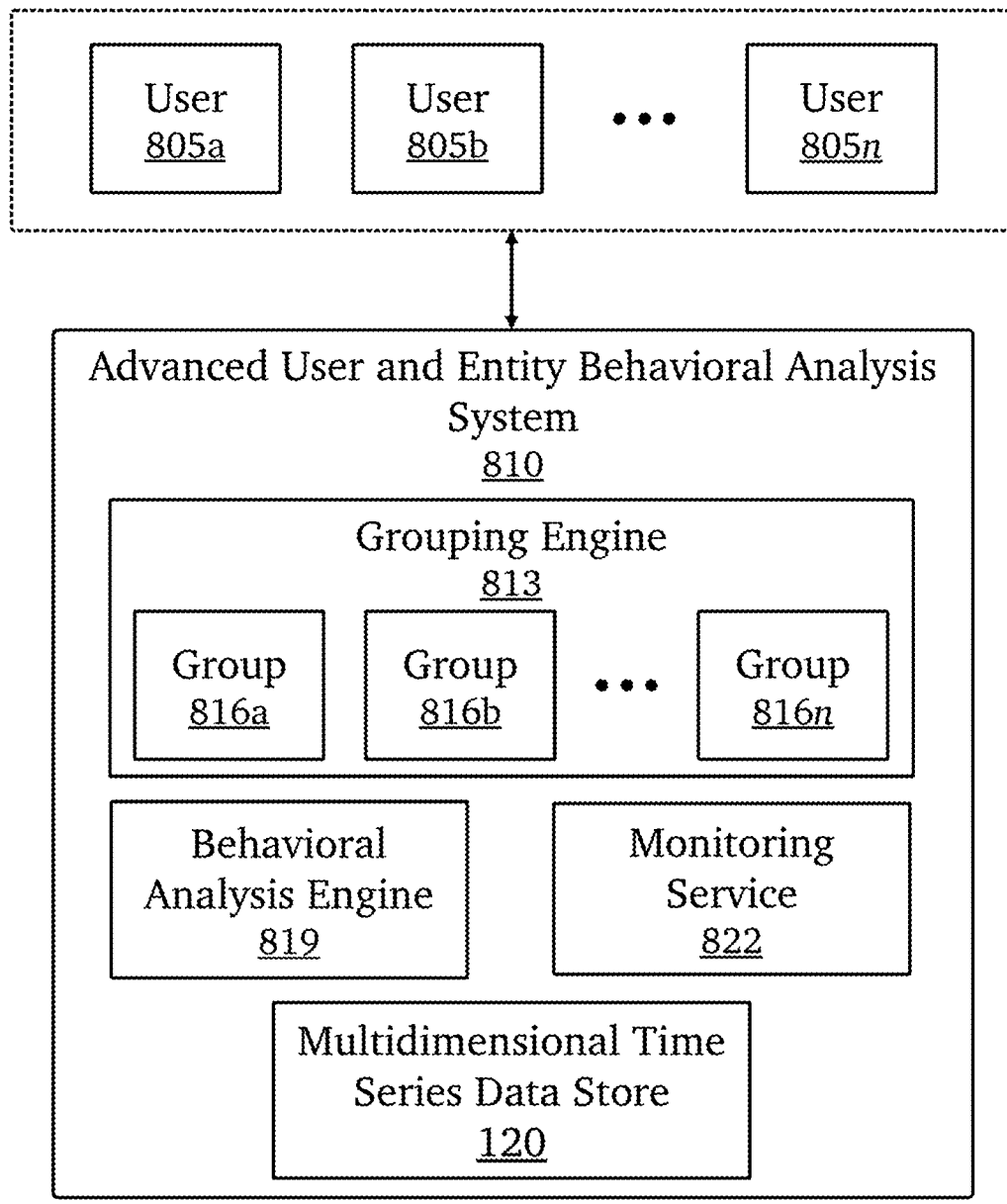
FIG. 8 is a diagram of an exemplary architecture for a user and entity behavioral analysis system, according to one aspect.

Another way to detect cyberthreats may be through the continuous monitoring and analysis of user and device behavioral patterns. This method may be particularly useful when there is little info available on an exploit, for example, a newly developed malware. FIG. 8 is a diagram of an exemplary architecture 800 for a user and entity behavioral analysis (UEBA) system, according to one aspect. Architecture 800 may comprise a plurality of users 805a-n, which may be individuals or connected devices, connecting to a user and entity behavioral analysis system 810. System 810 may comprise a grouping engine 813, a behavioral analysis engine 819, a monitoring service 822, and a multidimensional time series data store 120 for storing gathered and processed data. Grouping engine 813 may be configured to gather and identify user interactions and related metrics, which may include volume of interaction, frequency of interaction, and the like. Grouping engine 813 may use graph stack service 145 and DCG module 155 to convert and analyze the data in graph format. The interaction data may then be used to split users 805a-n into a plurality of groups 816a-n. Groupings may be based on department, project teams, interaction frequency, and other metrics which may be user-defined. Groupings may not be permanent, and may be adjusted and changed in real-time as group dynamics change. This may be automated by system 810, or an administrative user may manually change the groupings.

Behavioral analysis engine 819 may batch process and aggregate overall usage logs, access logs, Kerberos session data, or data collected through the use of other network monitoring tools commonly used in the art such as BRO or SURICATA. The aggregated data may then be used to generate a behavioral baseline for each group established by grouping engine 813. Behavioral analysis engine 819 may use graph stack service 145 and DCG module 155 to convert and analyze the data in graph format using various machine learning models and may also process the data using parallel computing to quickly process large amounts of data. Models may be easily added to the system. Behavioral analysis engine 819 may also be configured to process internal communications, such as email, using natural language processing. This may provide additional insight into current group dynamics so that a more accurate baseline may be established or may provide an insight into health and mood of users.

Monitoring service 822 may actively monitor groups for anomalous behavior, as based the established baseline. For example, monitoring service 822 may use the data pipelines of ACDP system 100 or multidimensional time series data store 120 to conduct real-time monitoring of various network resource sensors. Aspects that may be monitored may include, but is not limited to, anomalous web browsing, for example, the number of distinct domains visited exceeding a predefined threshold; anomalous data exfiltration, for example, the amount of outgoing data exceeding a predefined threshold; unusual domain access, for example, a subgroup consisting a few members within an established group demonstrating unusual browsing behavior by accessing an unusual domain a predetermined number of times within a certain timeframe; anomalous login times, for example, a user logging into a workstation during off-hours; unlikely login locations, for example, a user logging in using an account from two distinct locations that may be physically impossible within a certain timeframe; anomalous service access, for example, unusual application access or usage pattern; and new machines, for example, a user logging into a machine or server not typically accessed.

Figure 23:
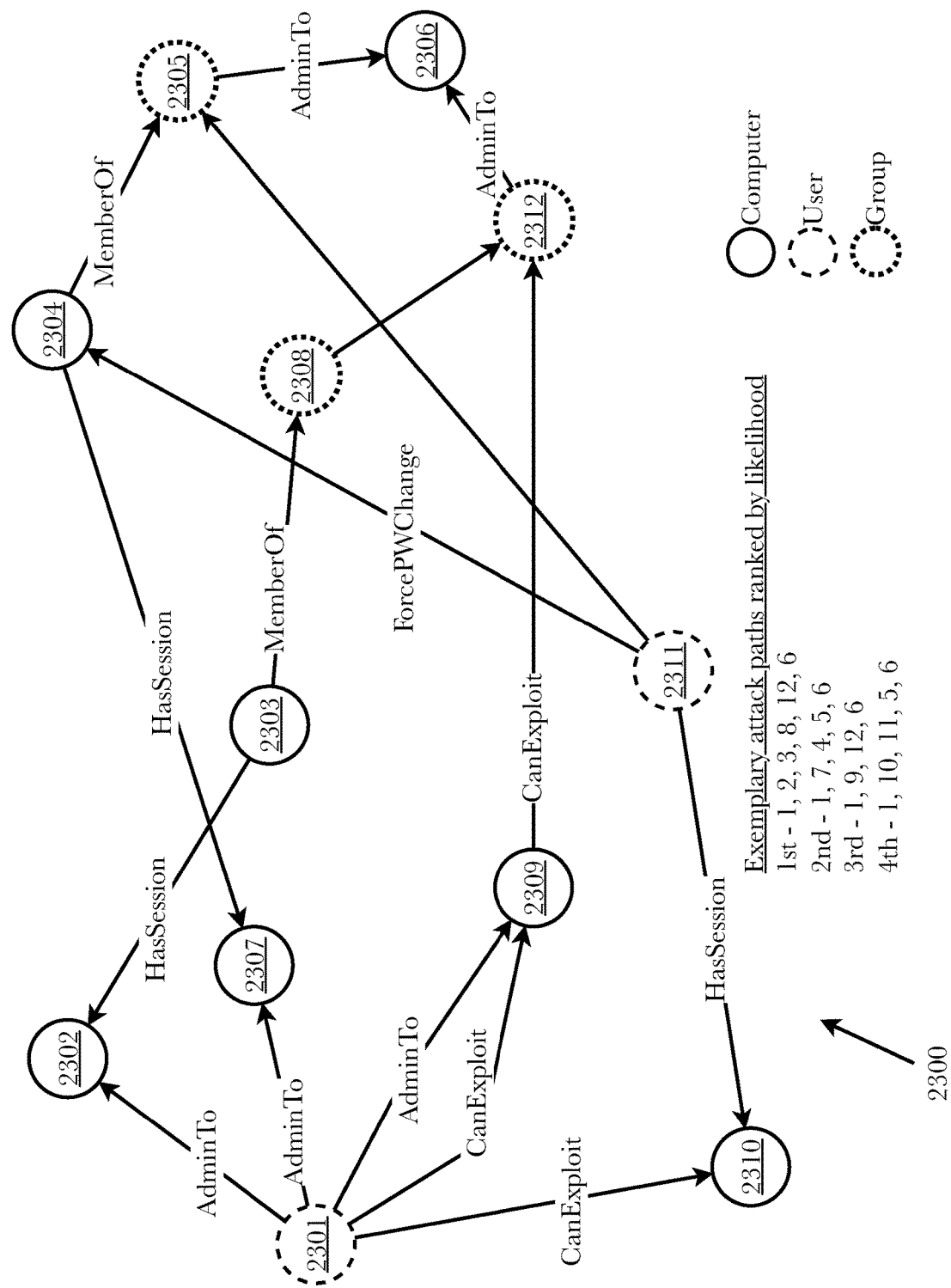
FIG. 23 is a directed graph diagram showing an exemplary cyber-physical graph and its possible use in creating cybersecurity profiles and ratings.

FIG. 23 is a directed graph diagram showing an exemplary cyber-physical graph 2300 and its possible use in creating cybersecurity profiles and ratings. A cyber-physical graph represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. This can be enriched with properties, entities, and relationships that model business processes as well as the criticality of an entity to a business dependency (a representative example being criticality to a particular revenue stream). A cyber-physical graph, in its most basic form, represents the network devices comprising an organization's network infrastructure as nodes (also called vertices) in the graph and the physical or logical connections between them as edges between the nodes. The cyber-physical graph may be expanded to include network information and processes such as data flow, security protocols and procedures, and software versions and patch information. Further, human users and their access privileges to devices and assets may be included. A cyber-security graph may be further expanded to include internal process information such as business processes, loss information, and legal requirements and documents; external information such as domain and IP information, data breach information; and generated information such as open port information from external network scans, and vulnerabilities and avenues of attack. In some embodiments, multiple graphs may be combined into a single cyber-physical graph to enable exploration, modeling, predictive modeling, and simulation of relationships, performance and impacts under a multitude of scenarios. For example, graphs of cash flows, graphs of business processes, graphs of the logical network and graphs of the physical network, facilities, etc., can all be combined for such purposes. Thus, a cyber-physical graph may be used to represent a complete picture of an organization's infrastructure and operations. In some embodiments, instead of combining multiple graphs into a single cyber-physical graph, the graphs may be analyzed separately and the results of the analyses may be combined.

In this example, which is necessarily simplified for clarity, the cyber-physical graph 2300 contains 12 nodes (vertices) comprising: seven computers and devices designated by solid circles 2302, 2303, 2304, 2306, 2307, 2309, 2310, two users designated by dashed-line circles 2301, 2311, and three functional groups designated by dotted-line circles 2305, 2308, and 2312. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2301 is an administrator to device 2302 to which device 2303 has connected. Device 2303 is a member of functional group 2308, which has a member of group 2312. Functional group 2312 is an administrator to the target 2306. In a second most likely attack path, user 2301 is an administrator to device 2307 to which device 2304 has connected. Device 2304 is a member of functional group 2305, which is an administrator to the target device 2306. In a third most likely attack path, a flaw in the security protocols allow the credentials of user 2301 to be used to gain access to device 2310. User 2311 who is working on device 2310 may be tricked into providing access to functional group 2305, which is an administrator to the target device 2306.

Figure 24:
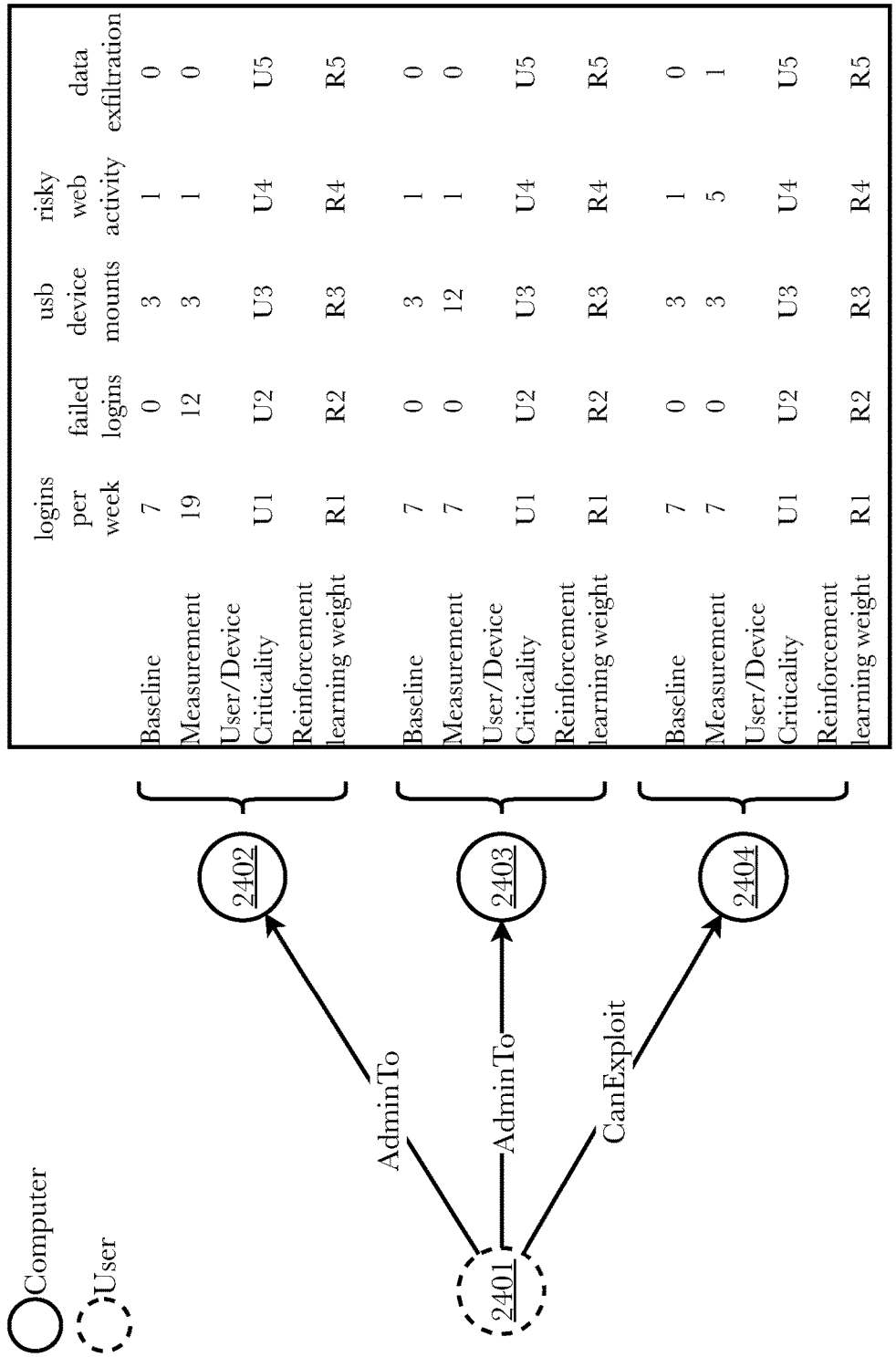
FIG. 24 is a diagram showing how UEBA information may be associated with network topology.

FIG. 24 is a diagram showing how UEBA information may be associated with network topology. As described elsewhere herein, user and entity behavior analysis may be used to improve cybersecurity. This diagram shows an example of how such UEBA information may be associated with, or incorporated into, a representation of the network, so as to combine UEBA information with information about network topology. For each user and device for which UEBA information is collected, such information may be represented in a graph comprising nodes and edges, in a manner similar to the cyber-physical graph previously described. In this example, a user 2401 is represented by a node in the graph. The user is associated with three different devices 2402-2404, each of which is also represented by a node in the graph. The user 2401 is associated with each device in some manner. For example, the user 2401 is an administrator of devices 2402 and 2403, which may be, for example, networked computers. The user 2401 is also associated with device 2404 for which there is some vulnerability (which may be known or unknown), such as vulnerability to phishing attacks wherein the user 2401 is persuaded to inadvertently install malware by opening an email attachment. The baseline behavior of the user's 2401 interaction with each device is established. In this simplified example, in a given week for each device 2402-2404, the user 2401 normally has seven logins, zero failed login attempts, mounts three USB devices, has one instance of risky web activity (e.g., visiting a website with a known risk of malware), and has zero instances of data exfiltration (e.g., moving or copying of data to an unauthorized location). The baseline data for each user/device interaction may be stored in, or associated with, the graph node for that device 2402-2404. Monitoring and measurement of those same user/device interactions can indicate instances of cybersecurity concern. For example, for device 2402, the measured number of logins (19) and failed logins (12) has increased dramatically over the baseline data for those interactions, suggesting either that the user is engaging in anomalous behavior or that the user's account has been compromised and is being used to attempt to gain network access. In the example for device 2403, the measured number of USB device mounts has increased dramatically over the baseline data for that interaction, suggesting that the user is attempting transfer more data to portable devices than usual, which could indicate a data exfiltration attempt. In the example for device 2404, the measured number of risky web activity incidents has increased dramatically over the baseline data, and a data exfiltration incident has occurred (for example, data uploaded to an unauthorized website), indicating a security breach.

In addition to the baseline and measurements, additional data, weights, and/or variables may be assigned, such as a user/device criticality rating. For example, if the user 2401 is a low-level employee with access only to non-confidential and/or publicly-disclosed information through the devices 2402-2404, anomalous user/device interaction behavior has a low risk of having a negative cybersecurity impact, and the user/device criticality may be very low, reducing the level of effort expended on investigating such anomalous behavior. Conversely, if the user 2401 is an executive-level employee with access to highly-sensitive information through the devices 2402-2404, anomalous user/device interaction behavior has a high risk of having a negative cybersecurity impact, and the user/device criticality may be very high, meaning that investigating even minor anomalous behavior is a high priority. Further, other weights and variables may be assigned, such as reinforcement learning weights, risk ratings indicating the likelihood that the node will be subject to a cyberattack, criticality ratings indicating the criticality to network (or organization) operation if the node is compromised by a cyberattack, and vulnerability ratings, indicating a difficulty of exploiting a vulnerability between nodes.

Figure 25:
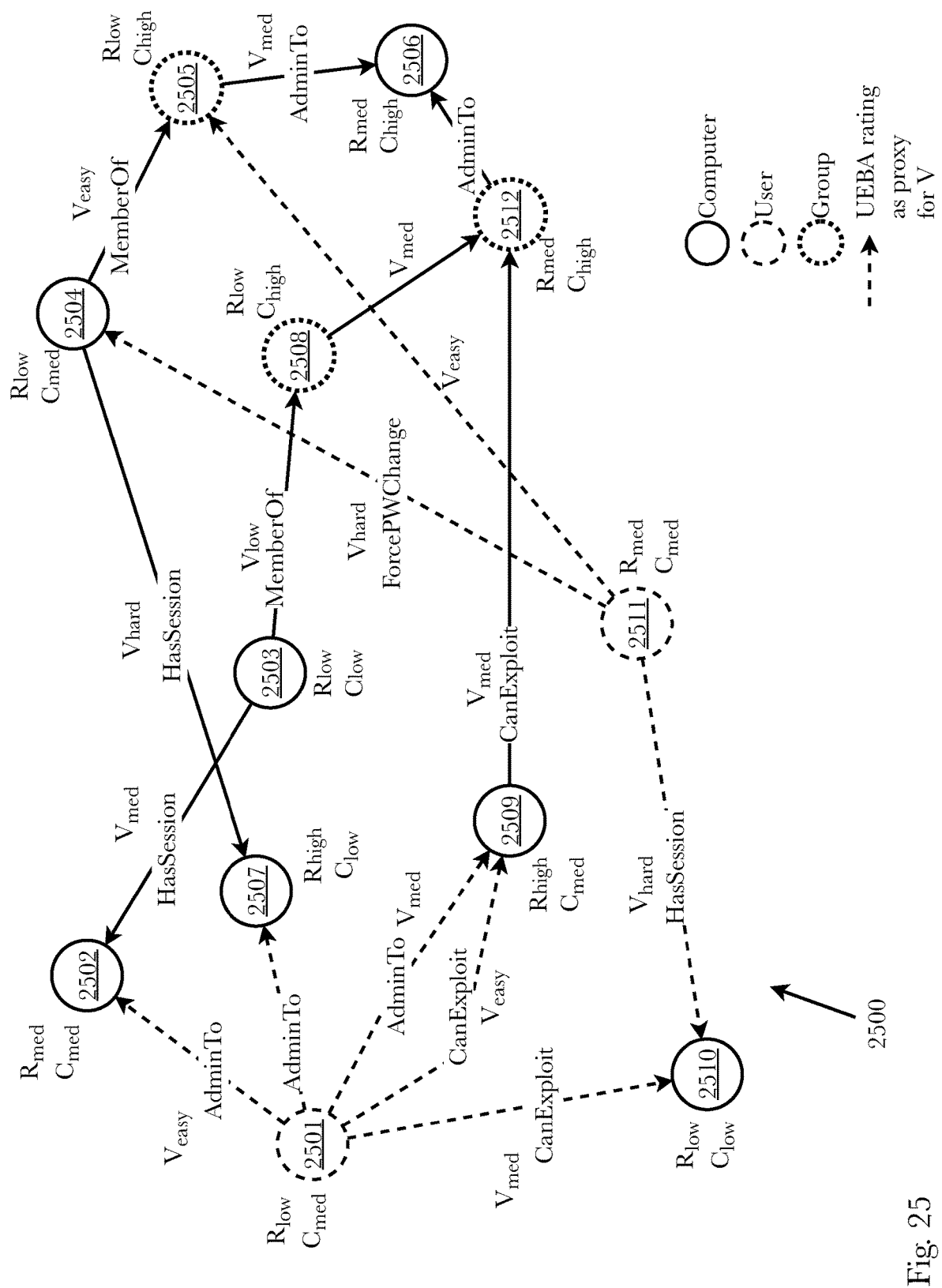
FIG. 25 is a directed graph diagram showing a use of a cyber-physical graph to model both UEBA and network topology information for cybersecurity analyses.

FIG. 25 is a directed graph diagram showing an use of a cyber-physical graph to model both UEBA and network topology information for cybersecurity analyses. In this example, which is necessarily simplified for clarity, a cyber-physical graph 2500 contains 12 nodes (vertices) comprising: seven computers and devices designated by solid circles 2502, 2503, 2504, 2506, 2507, 2509, 2510, two users designated by dashed-line circles 2501, 2511, and three functional groups designated by dotted-line circles 2505, 2508, and 2512. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2501 is an administrator to device 2502 to which device 2503 has connected. Device 2503 is a member of functional group 2508, which has a member of group 2512. Functional group 2512 is an administrator to the target 2506. In a second most likely attack path, user 2501 is an administrator to device 2507 to which device 2504 has connected. Device 2504 is a member of functional group 2505, which is an administrator to the target device 2506. In a third most likely attack path, a flaw in the security protocols allow the credentials of user 2501 to be used to gain access to device 2510. User 2511 who is working on device 2510 may be tricked into providing access to functional group 2505, which is an administrator to the target device 2506.

Thus, the graph contains information about network topology, specifically the entities comprising the network and the connections between the entities. However, further embedded in this graph is user and event behavior analysis (UEBA) information. In this manner, UEBA information and network topology information may be combined to enhance cybersecurity, with UEBA information providing anomalous behavior indicators, and the network topology establishing the likelihood of accessing other entities. Each node in the graph 2501-2512 is assigned a risk rating ($R_{low}$, $R_{med}$, $R_{high}$), indicating the likelihood that the node will be subject to a cyberattack, and a criticality rating ($C_{low}$, $C_{med}$, $C_{high}$), indicating the criticality to network (or organization) operation if the node is compromised by a cyberattack. Each edge in the graph is assigned a vulnerability rating ($V_{easy}$, $V_{med}$, $V_{hard}$), indicating a difficulty of exploiting a vulnerability between nodes. As shown in the dotted line edges, UEBA information and ratings may be used to establish vulnerability ratings. Unlike with computing devices, for which vulnerabilities are discretely identifiable and quantifiable (vulnerabilities of specific, unpatched applications to certain malware), it is often difficult to quantify likely human user behaviors in response to social engineering exploits (e.g., phishing attacks). Because of this difficulty, UEBA information and ratings can be used to establish vulnerability ratings (e.g., as proxy or substitute for a discretely known vulnerability). The UEBA/network topology combination may further include information about authentication levels, which may inform risk ratings, criticality ratings, and vulnerability ratings. For example, such ratings may change depending on what type of authentications are being used (e.g., New Technology LAN Manager (NTLM), Kerberos, etc.), whether multiple levels of authentication are being used (e.g., Kerberos plus independent golden ticket/silver ticket authentication checks), whether non-digital authentications are used (e.g., biometric validation, peer/supervisor validation, etc.), and other such authentication factors.

As an example of the usage of a combined UEBA information and network topology graph system, assume that a user's 2501 interactions with a device 2510 indicate anomalous UEBA behavior such as a multiplicity of login attempts on a given day. the risk rating of attacks against the user 2501 is low, the difficulty of exploiting a vulnerability of the user 2501/device 2510 combination is medium, and the criticality of information on device 2501 is low. Thus, the anomalous behavior is not likely to be associated with a cyberattack, and investigation of this particular anomalous behavior can be de-prioritized because of the UEBA/network topology analysis. Conversely, similar anomalous UEBA behavior at group 2512 would be prioritized because of the higher levels of risk and criticality both of group 2512 and device 2506 for which group 2512 is an administrator.

Detailed Description of Exemplary Aspects

Figure 9:
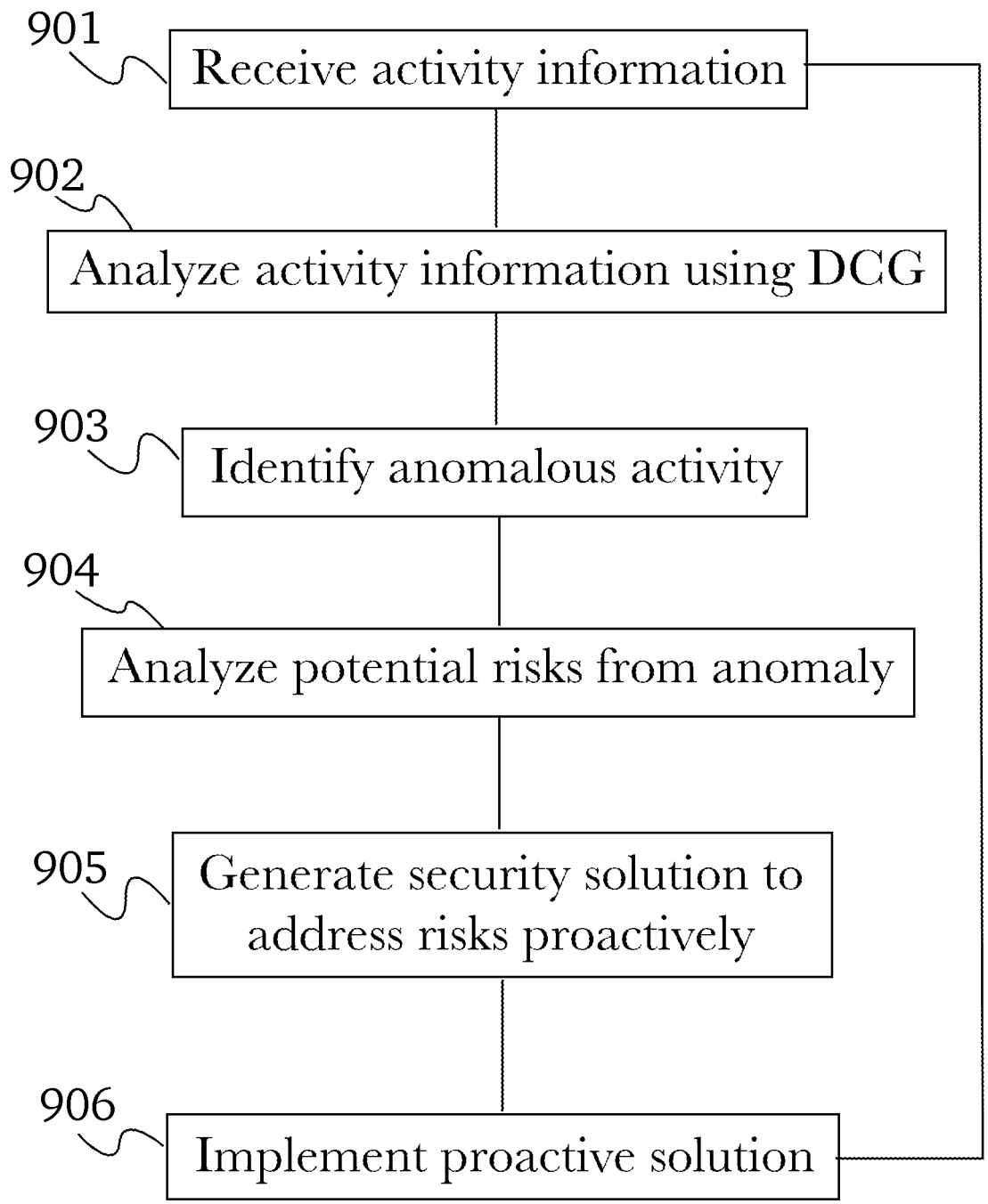
FIG. 9 is a flow diagram of an exemplary method for cybersecurity behavioral analytics, according to one aspect.

FIG. 9 is a flow diagram of an exemplary method 900 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 901, a web crawler 115 may passively collect activity information, which may then be processed 902 using a DCG 155 to analyze behavior patterns. Based on this initial analysis, anomalous behavior may be recognized 903 (for example, based on a threshold of variance from an established pattern or trend) such as high-risk users or malicious software operators such as bots. These anomalous behaviors may then be used 904 to analyze potential angles of attack and then produce 905 security suggestions based on this second-level analysis and predictions generated by an action outcome simulation module 125 to determine the likely effects of the change. The suggested behaviors may then be automatically implemented 906 as needed. Passive monitoring 901 then continues, collecting information after new security solutions are implemented 906, enabling machine learning to improve operation over time as the relationship between security changes and observed behaviors and threats are observed and analyzed.

This method 900 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 10:
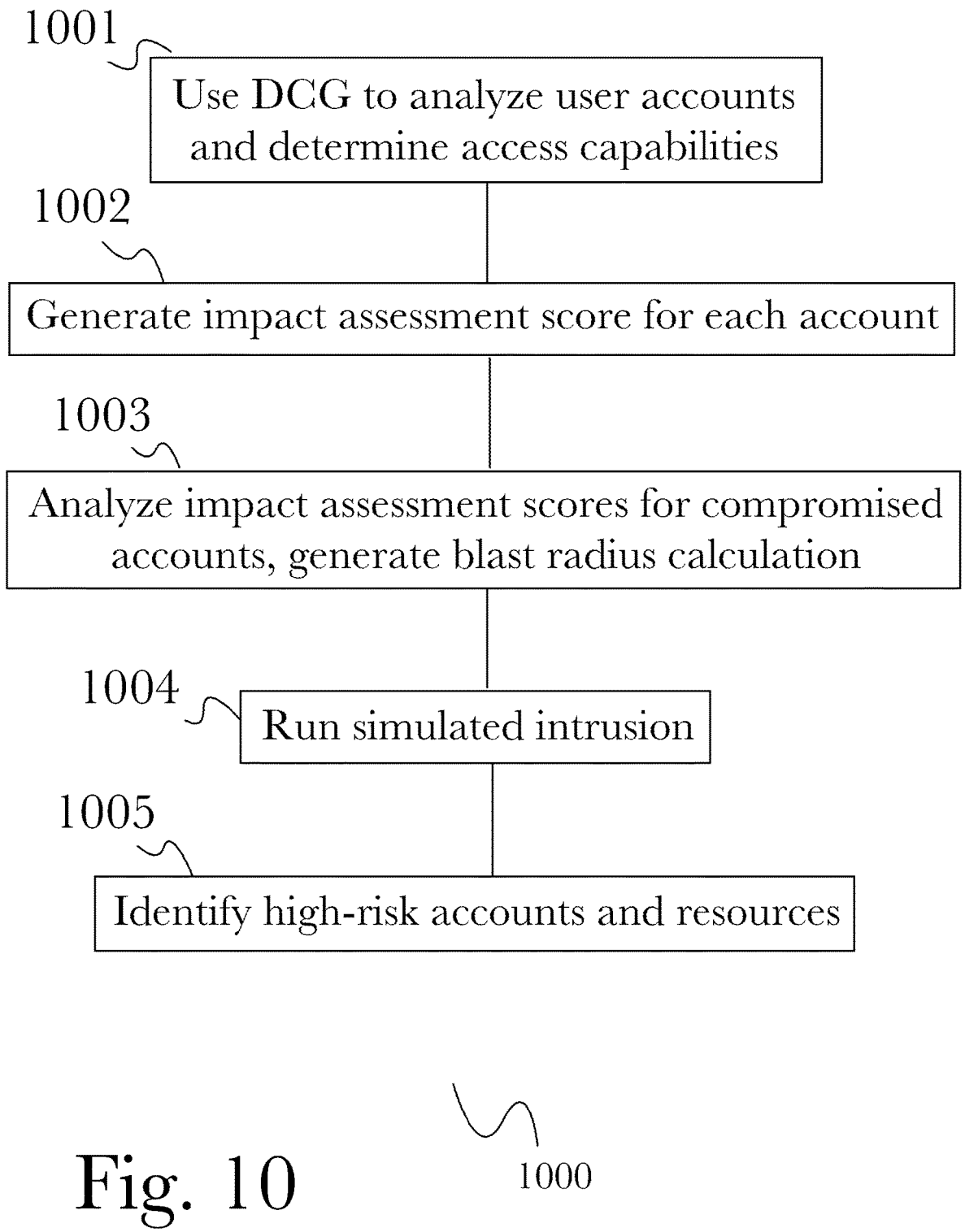
FIG. 10 is a flow diagram of an exemplary method for measuring the effects of cybersecurity attacks, according to one aspect.

FIG. 10 is a flow diagram of an exemplary method 1000 for measuring the effects of cybersecurity attacks, according to one aspect. According to the aspect, impact assessment of an attack may be measured using a DCG 155 to analyze a user account and identify its access capabilities 1001 (for example, what files, directories, devices or domains an account may have access to). This may then be used to generate 1002 an impact assessment score for the account, representing the potential risk should that account be compromised. In the event of an incident, the impact assessment score for any compromised accounts may be used to produce a "blast radius" calculation 1003, identifying exactly what resources are at risk as a result of the intrusion and where security personnel should focus their attention. To provide proactive security recommendations through a simulation module 125, simulated intrusions may be run 1004 to identify potential blast radius calculations for a variety of attacks and to determine 1005 high risk accounts or resources so that security may be improved in those key areas rather than focusing on reactive solutions.

Figure 11:
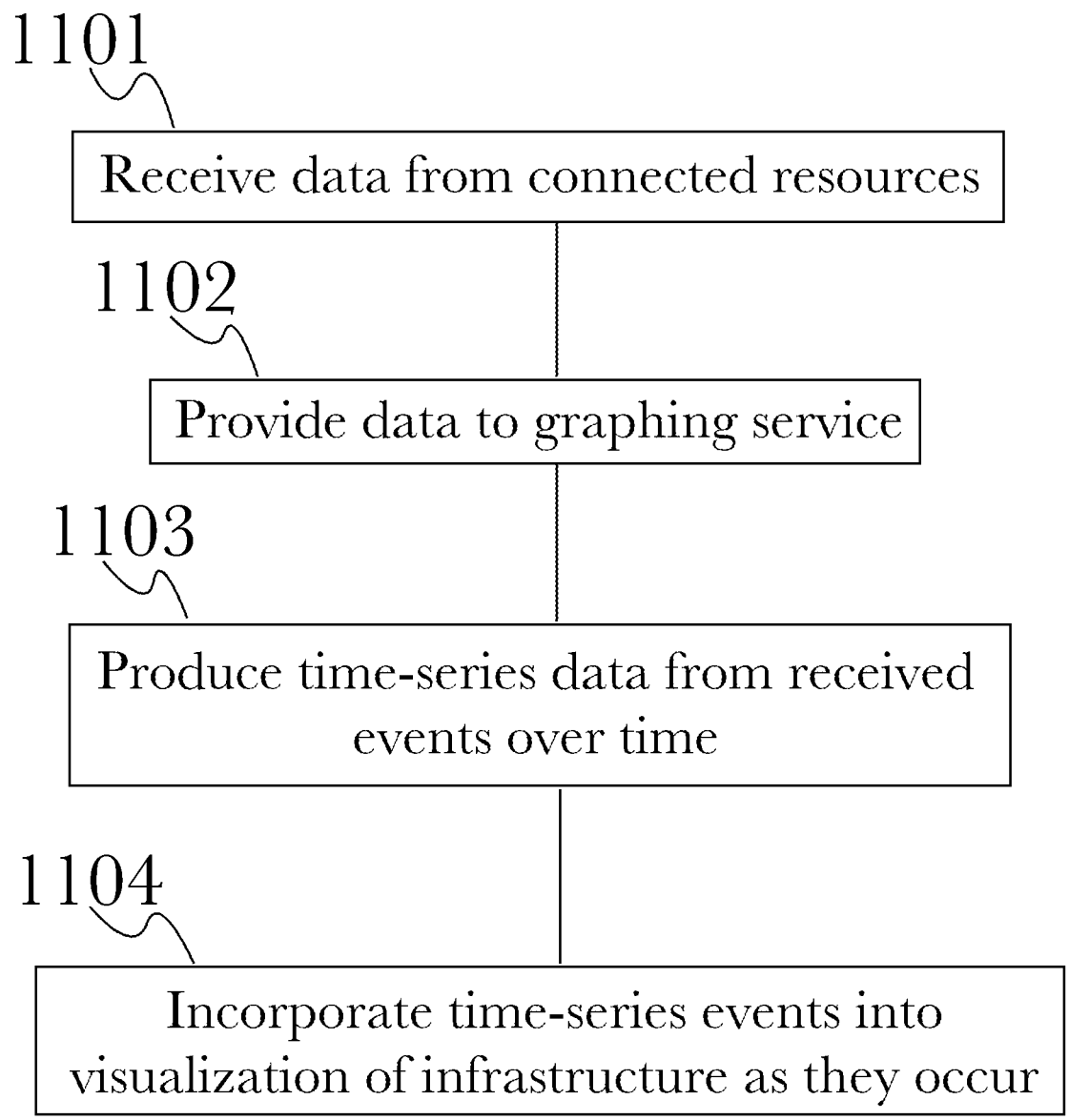
FIG. 11 is a flow diagram of an exemplary method for continuous cybersecurity monitoring and exploration, according to one aspect.

FIG. 11 is a flow diagram of an exemplary method 1100 for continuous cybersecurity monitoring and exploration, according to one aspect. According to the aspect, a state observation service 140 may receive data from a variety of connected systems 1101 such as (for example, including but not limited to) servers, domains, databases, or user directories. This information may be received continuously, passively collecting events and monitoring activity over time while feeding 1102 collected information into a graphing service 145 for use in producing time-series graphs 1103 of states and changes over time. This collated time-series data may then be used to produce a visualization 1104 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 12:
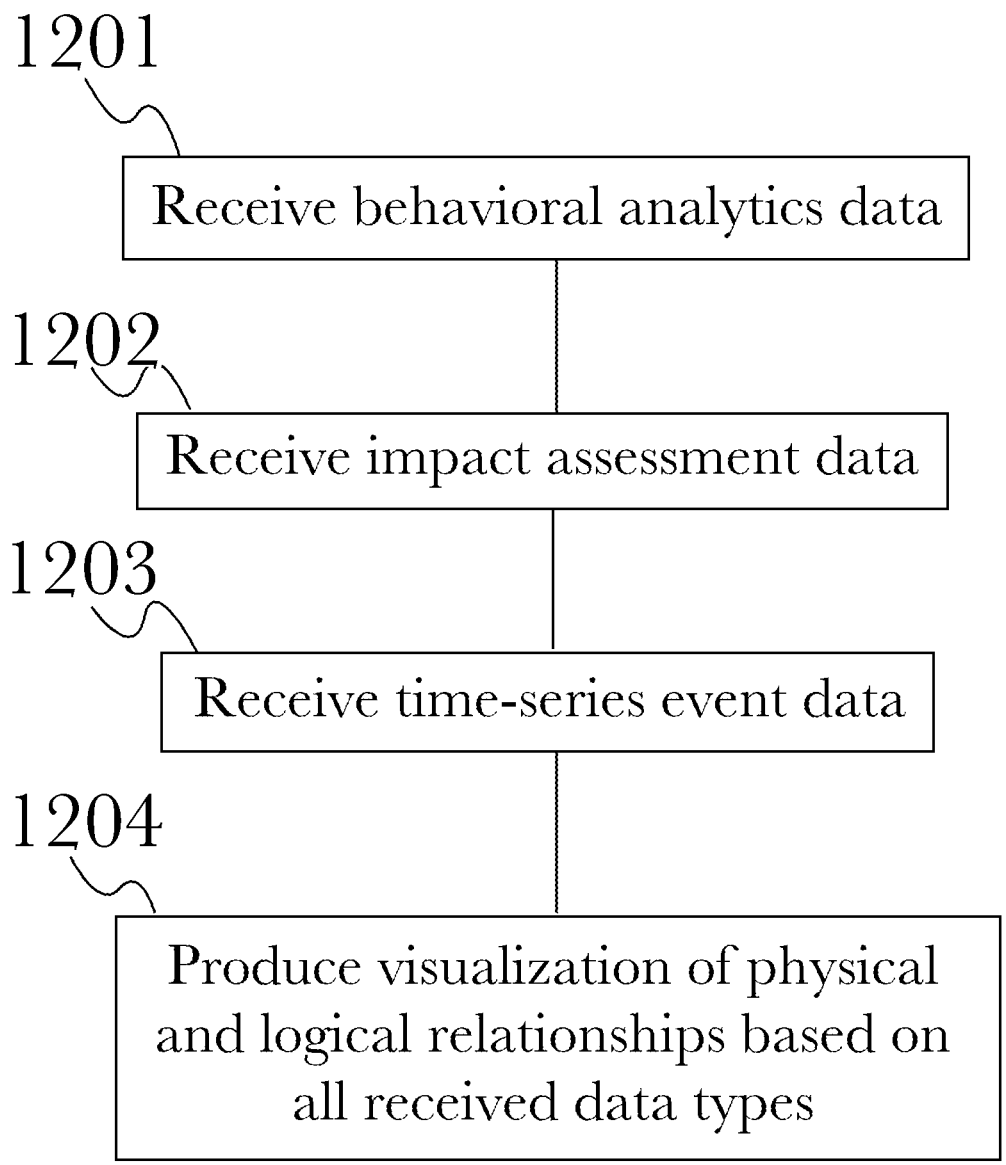
FIG. 12 is a flow diagram of an exemplary method for mapping a cyber-physical system graph (CPG), according to one aspect.

FIG. 12 is a flow diagram of an exemplary method 1200 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel and users. In an initial step 1201, behavior analytics information (as described previously, referring to FIG. 9) may be received at a graphing service 145 for inclusion in a CPG. In a next step 1202, impact assessment scores (as described previously, referring to FIG. 10) may be received and incorporated in the CPG information, adding risk assessment context to the behavior information. In a next step 1203, time-series information (as described previously, referring to FIG. 11) may be received and incorporated, updating CPG information as changes occur and events are logged. This information may then be used to produce 1204 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 13:
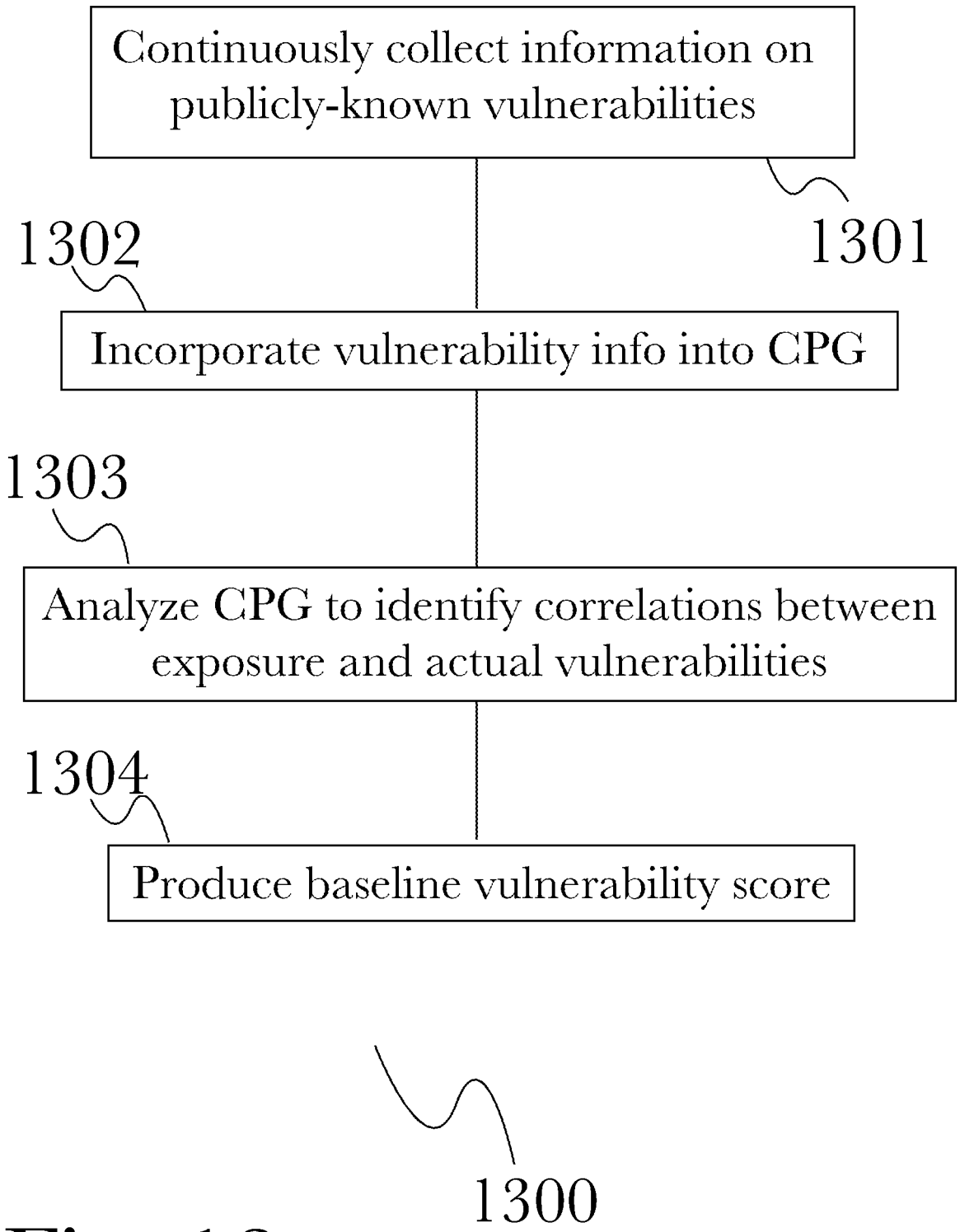
FIG. 13 is a flow diagram of an exemplary method for continuous network resilience scoring, according to one aspect.

FIG. 13 is a flow diagram of an exemplary method 1300 for continuous network resilience scoring, according to one aspect. According to the aspect, a baseline score can be used to measure an overall level of risk for a network infrastructure, and may be compiled by first collecting 1301 information on publicly-disclosed vulnerabilities, such as (for example) using the Internet or common vulnerabilities and exploits (CVE) process. This information may then 1302 be incorporated into a CPG as described previously in FIG. 12, and the combined data of the CPG and the known vulnerabilities may then be analyzed 1303 to identify the relationships between known vulnerabilities and risks exposed by components of the infrastructure. This produces a combined CPG 1304 that incorporates both the internal risk level of network resources, user accounts, and devices as well as the actual risk level based on the analysis of known vulnerabilities and security risks.

Figure 14:
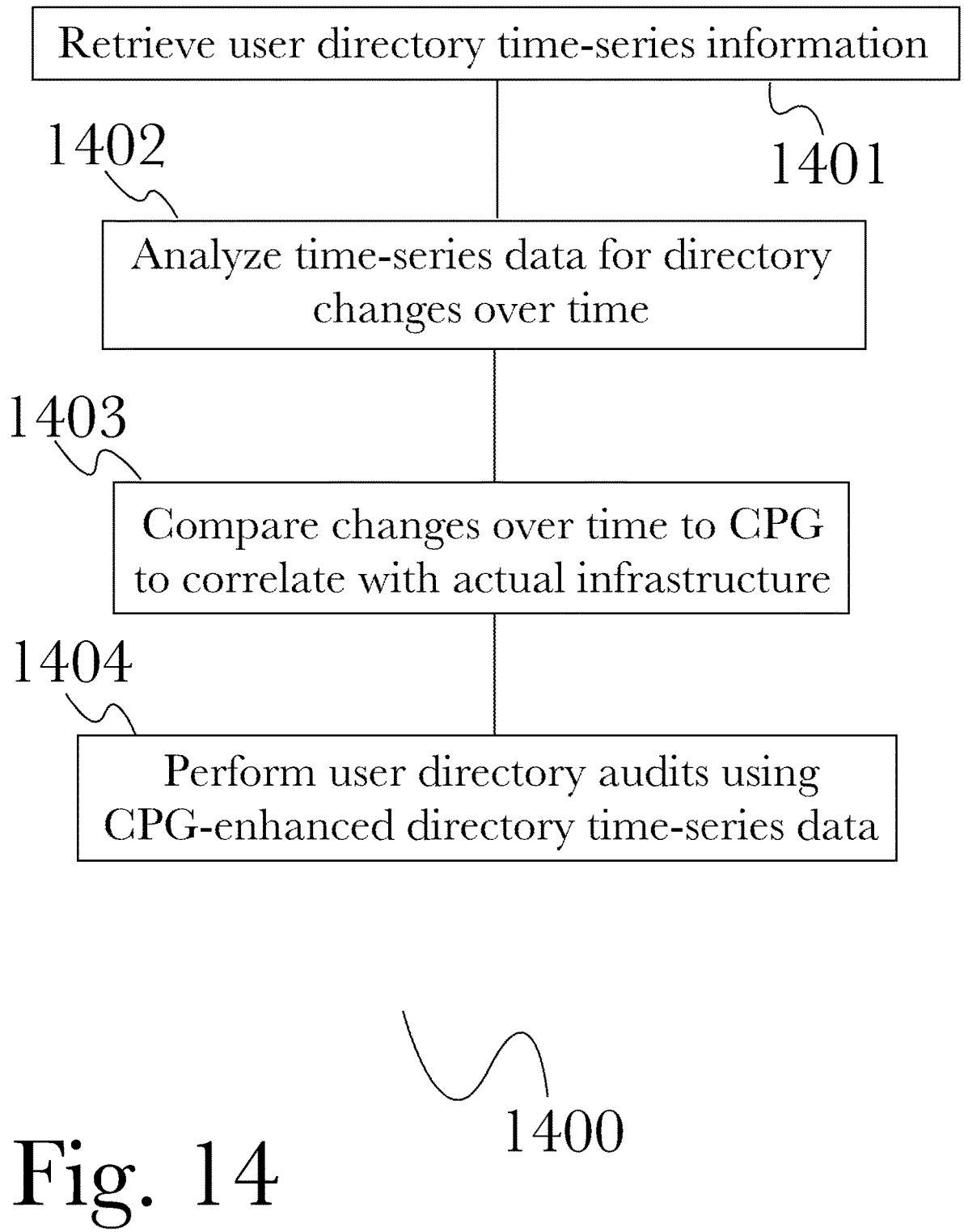
FIG. 14 is a flow diagram of an exemplary method for cybersecurity privilege oversight, according to one aspect.

FIG. 14 is a flow diagram of an exemplary method 1400 for cybersecurity privilege oversight, according to one aspect. According to the aspect, time-series data (as described above, referring to FIG. 11) may be collected 1401 for user accounts, credentials, directories, and other user-based privilege and access information. This data may then 1402 be analyzed to identify changes over time that may affect security, such as modifying user access privileges or adding new users. The results of analysis may be checked 1403 against a CPG (as described previously in FIG. 12), to compare and correlate user directory changes with the actual infrastructure state. This comparison may be used to perform accurate and context-enhanced user directory audits 1404 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 15:
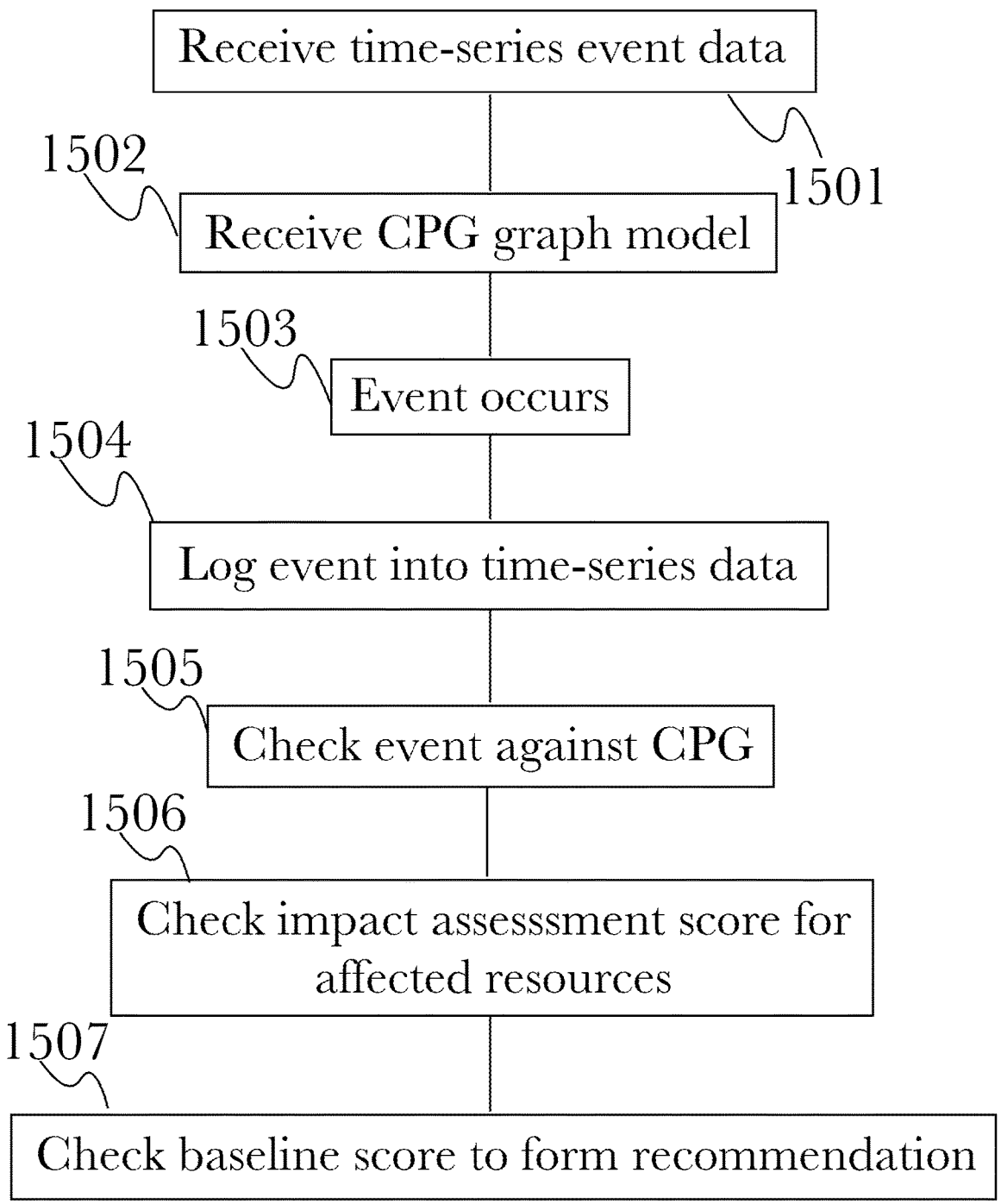
FIG. 15 is a flow diagram of an exemplary method for cybersecurity risk management, according to one aspect.

FIG. 15 is a flow diagram of an exemplary method 1500 for cybersecurity risk management, according to one aspect. According to the aspect, multiple methods described previously may be combined to provide live assessment of attacks as they occur, by first receiving 1501 time-series data for an infrastructure (as described previously, in FIG. 11) to provide live monitoring of network events. This data is then enhanced 1502 with a CPG (as described above in FIG. 12) to correlate events with actual infrastructure elements, such as servers or accounts. When an event (for example, an attempted attack against a vulnerable system or resource) occurs 1503, the event is logged in the time-series data 1504 and compared against the CPG 1505 to determine the impact. This is enhanced with the inclusion of impact assessment information 1506 for any affected resources, and the attack is then checked against a baseline score 1507 to determine the full extent of the impact of the attack and any necessary modifications to the infrastructure or policies.

Figure 16:
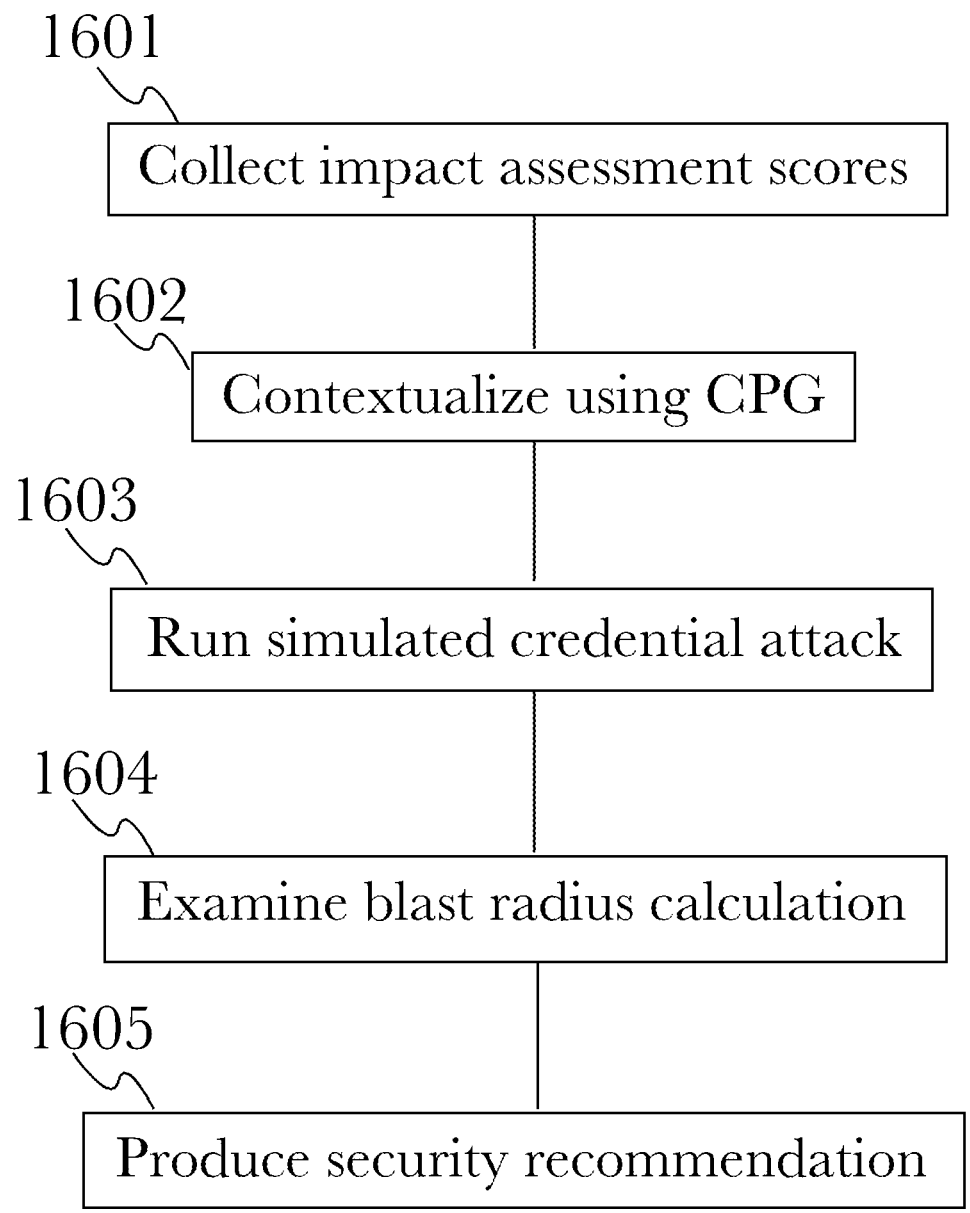
FIG. 16 is a flow diagram of an exemplary method for mitigating compromised credential threats, according to one aspect.

FIG. 16 is a flow diagram of an exemplary method 1600 for mitigating compromised credential threats, according to one aspect. According to the aspect, impact assessment scores (as described previously, referring to FIG. 10) may be collected 1601 for user accounts in a directory, so that the potential impact of any given credential attack is known in advance of an actual attack event. This information may be combined with a CPG 1602 as described previously in FIG. 12, to contextualize impact assessment scores within the infrastructure (for example, so that it may be predicted what systems or resources might be at risk for any given credential attack). A simulated attack may then be performed 1603 to use machine learning to improve security without waiting for actual attacks to trigger a reactive response. A blast radius assessment (as described above in FIG. 10) may be used in response 1604 to determine the effects of the simulated attack and identify points of weakness and produce a recommendation report 1605 for improving and hardening the infrastructure against future attacks.

Figure 17:
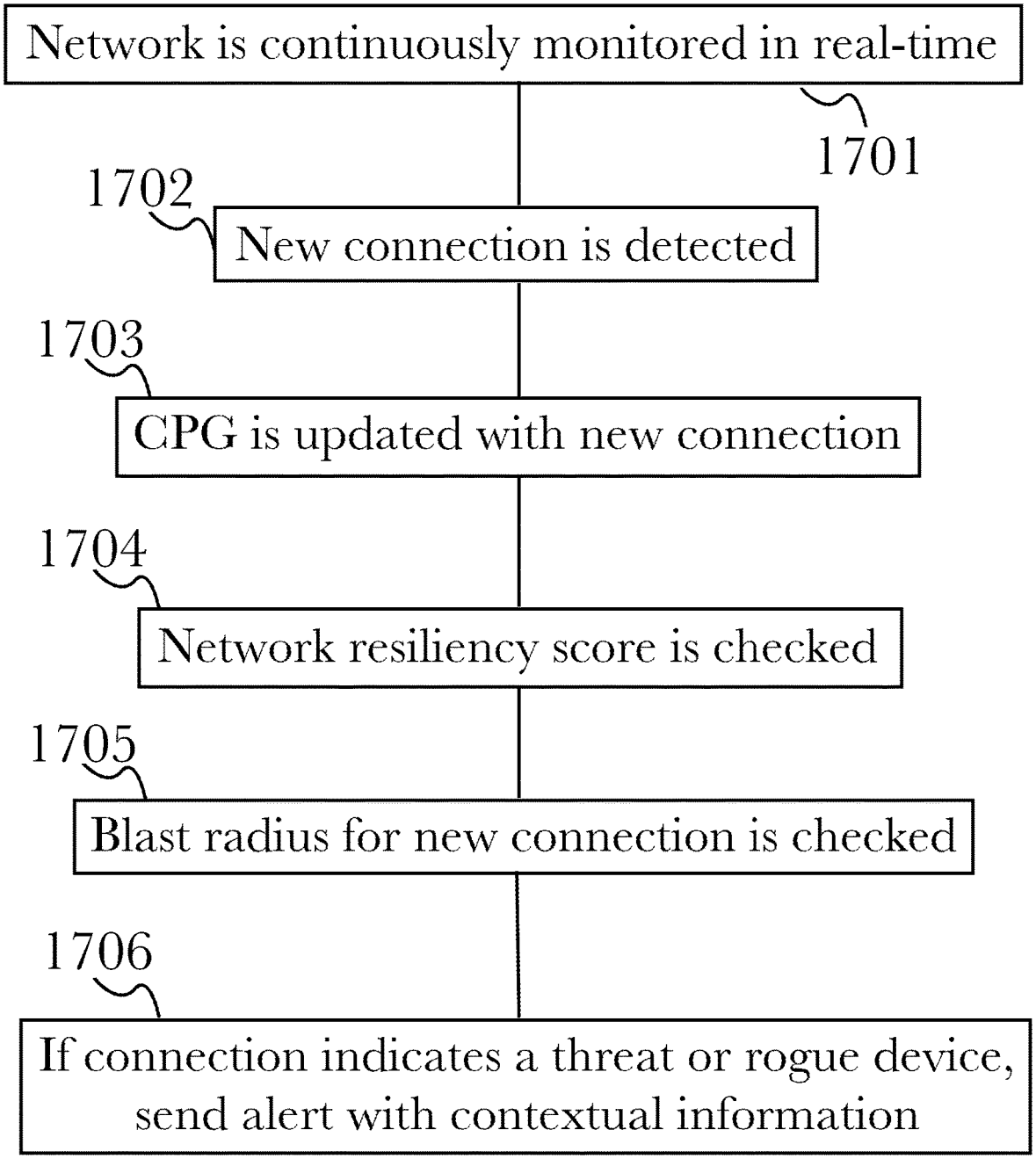
FIG. 17 is a flow diagram of an exemplary method for dynamic network and rogue device discovery, according to one aspect.

FIG. 17 is a flow diagram of an exemplary method 1700 for dynamic network and rogue device discovery, according to one aspect. According to the aspect, an advanced cyber decision platform may continuously monitor a network in real-time 1701, detecting any changes as they occur. When a new connection is detected 1702, a CPG may be updated 1703 with the new connection information, which may then be compared against the network's resiliency score 1704 to examine for potential risk. The blast radius metric for any other devices involved in the connection may also be checked 1705, to examine the context of the connection for risk potential (for example, an unknown connection to an internal data server with sensitive information may be considered a much higher risk than an unknown connection to an externally-facing web server). If the connection is a risk, an alert may be sent to an administrator 1706 with the contextual information for the connection to provide a concise notification of relevant details for quick handling.

Figure 18:
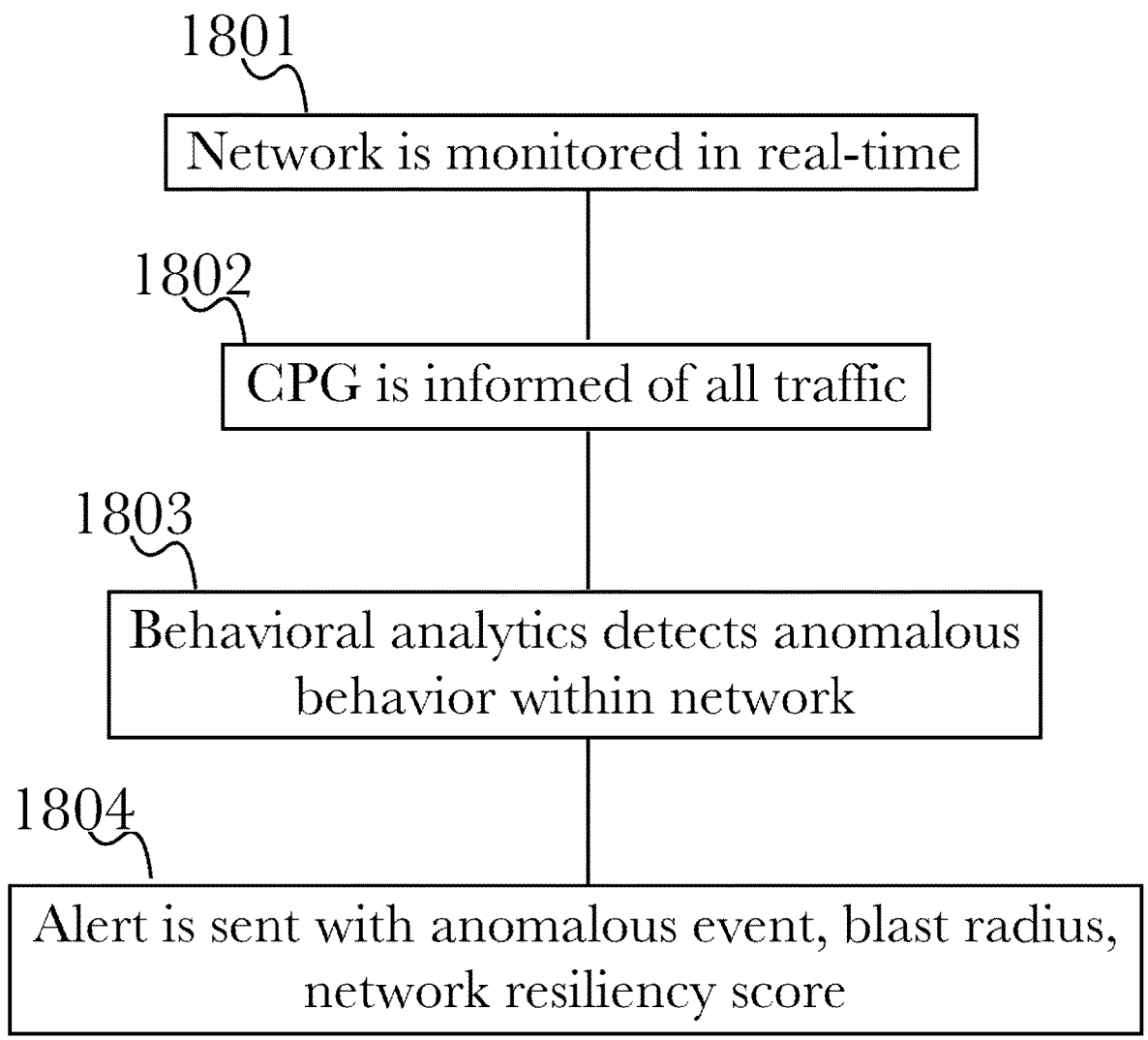
FIG. 18 is a flow diagram of an exemplary method for Kerberos "golden ticket" attack detection, according to one aspect.

FIG. 18 is a flow diagram of an exemplary method 1800 for Kerberos "golden ticket" attack detection, according to one aspect. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets. According to the aspect, an advanced cyber decision platform may continuously monitor a network 1801, informing a CPG in real-time of all traffic associated with people, places, devices, or services 1802. Machine learning algorithms detect behavioral anomalies as they occur in real-time 1803, notifying administrators with an assessment of the anomalous event 1804 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 19:
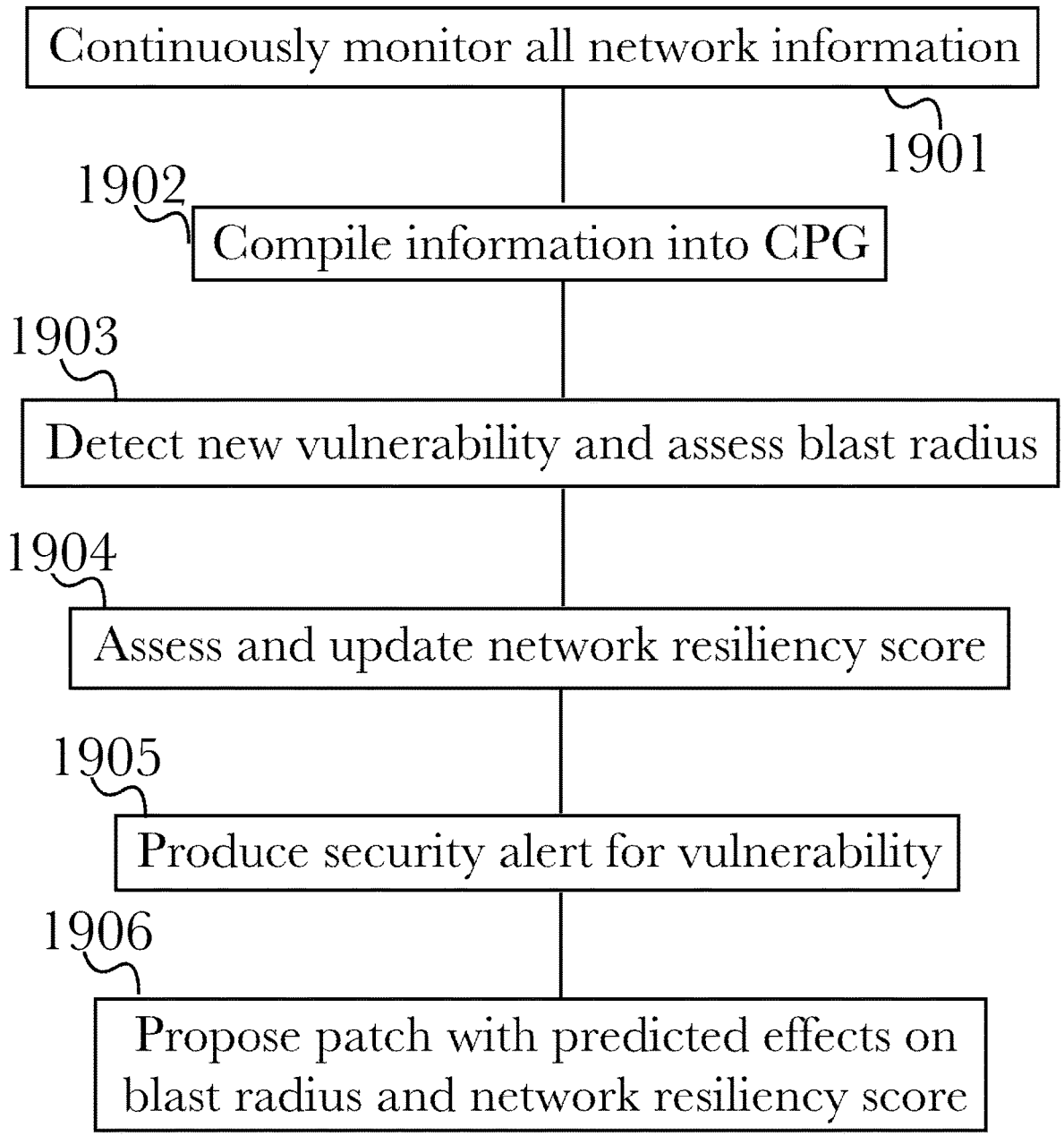
FIG. 19 is a flow diagram of an exemplary method for risk-based vulnerability and patch management, according to one aspect.

FIG. 19 is a flow diagram of an exemplary method 1900 for risk-based vulnerability and patch management, according to one aspect. According to the aspect, an advanced cyber decision platform may monitor all information about a network 1901, including (but not limited to) device telemetry data, log files, connections and network events, deployed software versions, or contextual user activity information. This information is incorporated into a CPG 1902 to maintain an up-to-date model of the network in real-time. When a new vulnerability is discovered, a blast radius score may be assessed 1903 and the network's resiliency score may be updated 1904 as needed. A security alert may then be produced 1905 to notify an administrator of the vulnerability and its impact, and a proposed patch may be presented 1906 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Figure 20:
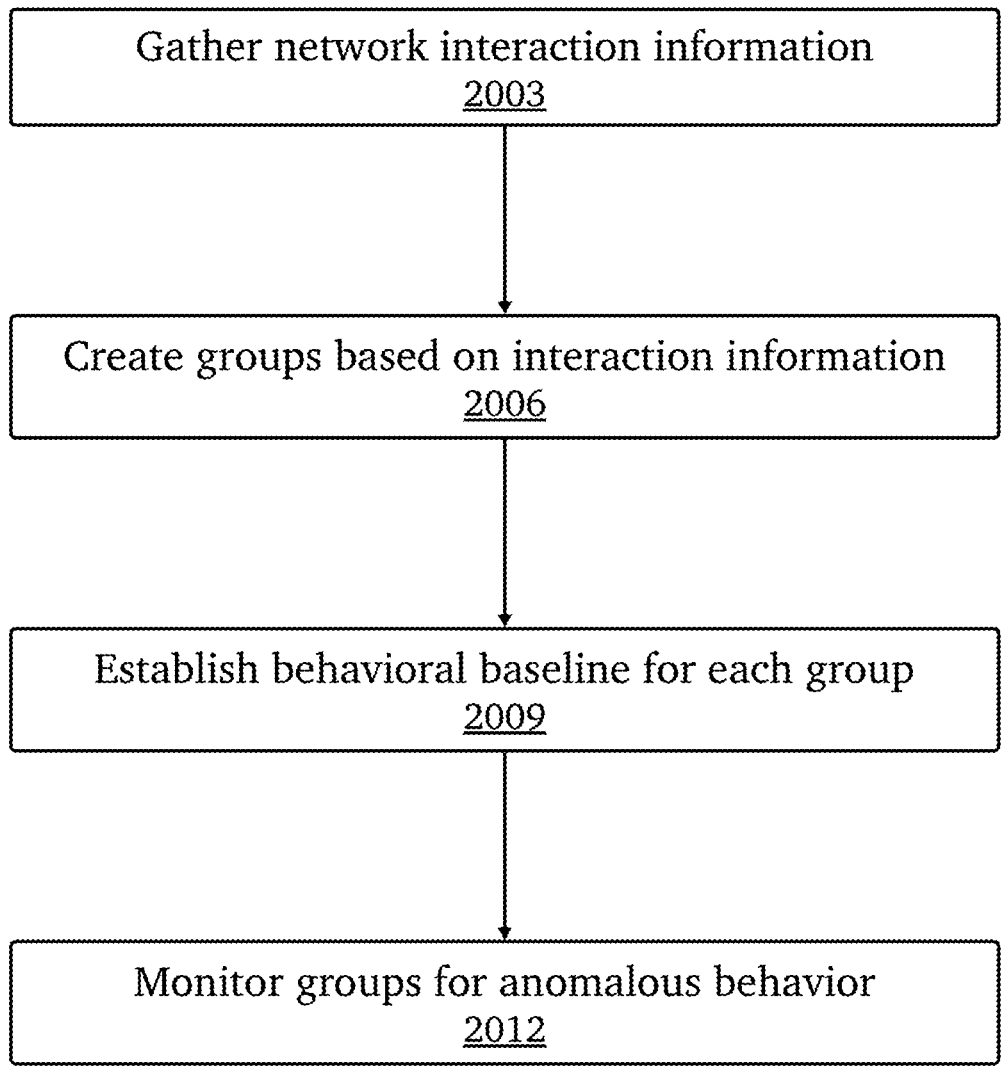
FIG. 20 is a flow diagram of an exemplary method for establishing groups of users according to one aspect.

FIG. 20 is a flow diagram of an exemplary method 2000 for establishing groups of users according to one aspect. At an initial step 2003, data pertaining to network interaction between users and devices are gathered by a grouping engine. At step 2006, the grouping engine may then process the gathered information by converting it to a graph format and using DCG module to establish groupings for users. A system administrator may provide additional input, and fine-tune the groupings if required. At step 2009, a behavioral baseline is established for each group that may be based on the interaction information, network logs, connected devices, and the like. At step 2012, groups are continuous monitored for anomalous behavior.

Figure 21:
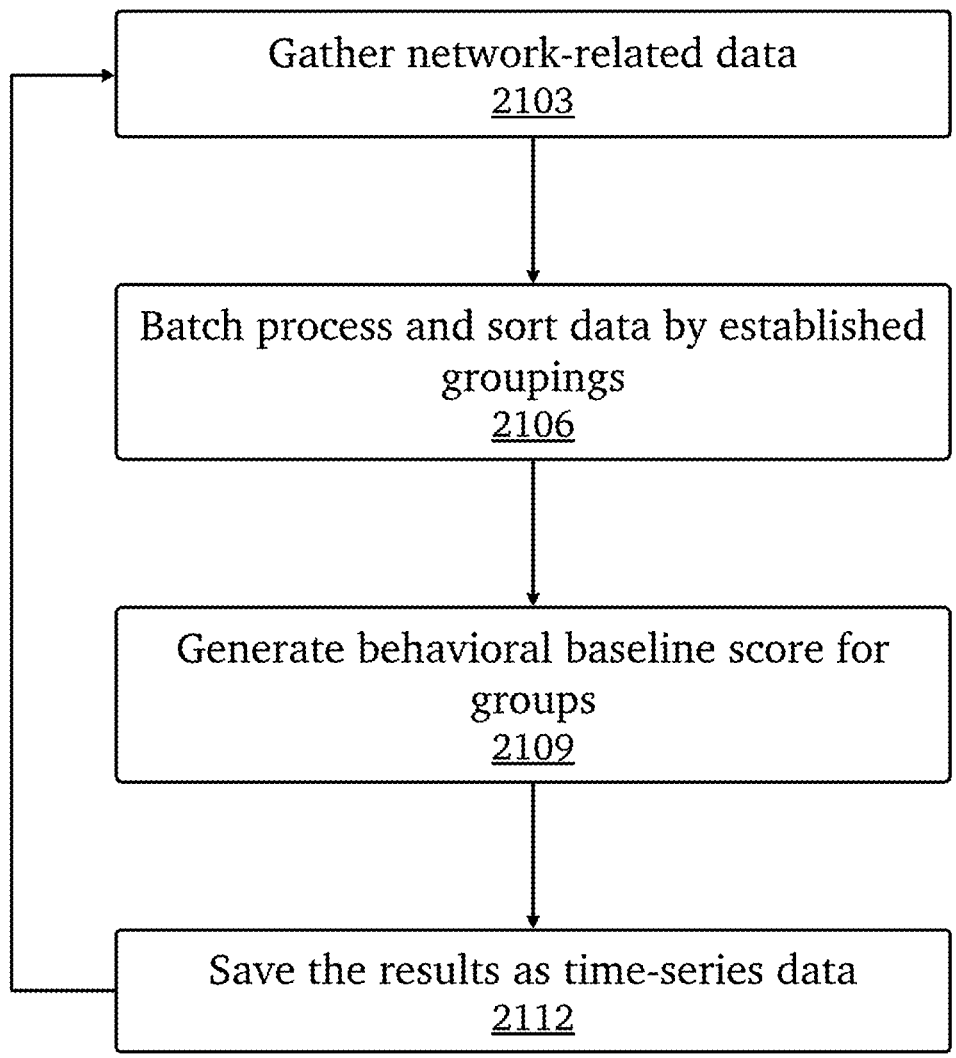
FIG. 21 is a flow diagram of an exemplary method for monitoring groups for anomalous behavior, according to one aspect.

FIG. 21 is a flow diagram of an exemplary method 2100 for monitoring groups for anomalous behavior, according to one aspect. At an initial step 2103, a system, as described above in FIG. 8, gathers network-related data. This data may comprise usage logs, Kerberos sessions data, computers and other devices connected to the network, active users, software installed, and the like. At step 2106, a behavioral analysis engine may process the data. Parallel computing may be used to speed up the processing of the data. The data may then be sorted by, and associated to, previously established groupings. At step 2109, a behavioral baseline score is generated for each group based on the results of the data processing. At step 2112, the data is stored into a time-series graph database. The process repeats periodically to create snapshots of various moments in time, and stored into the database. This may allow the system to retrain the baseline to take into considering non-anomalous baseline variances that may occur over time, as well as forecast changes in group dynamics using predictive analysis functions of ACDP system 100.

FIG. 22 is a flow diagram for an exemplary method 2200 for handing a detection of anomalous behavior, according to one aspect. At an initial step 2203, the system detects anomalous user behavior from a group. This may be based on comparison to established baselines, or a high priority incident caught during routine monitoring, for example a device accessing a blacklisted domain. At step 2206, the system investigates the group in which the anomalous behavior originated. This may include a more thorough analysis of usage and access logs. If applicable, users or devices with higher access privileges may be investigated before those with lower access privileges. At step 2209, the source or sources of the anomalous behavior is identified, and some corrective measures may be taken. For example, the offending device or user account may be automatically locked out of the network until a solution has been implemented. At step 2212, group members and system administrators may be notified. The system may utilize the various techniques discussed above to recommend a corrective action, or the system may take action automatically.

Figure 26:
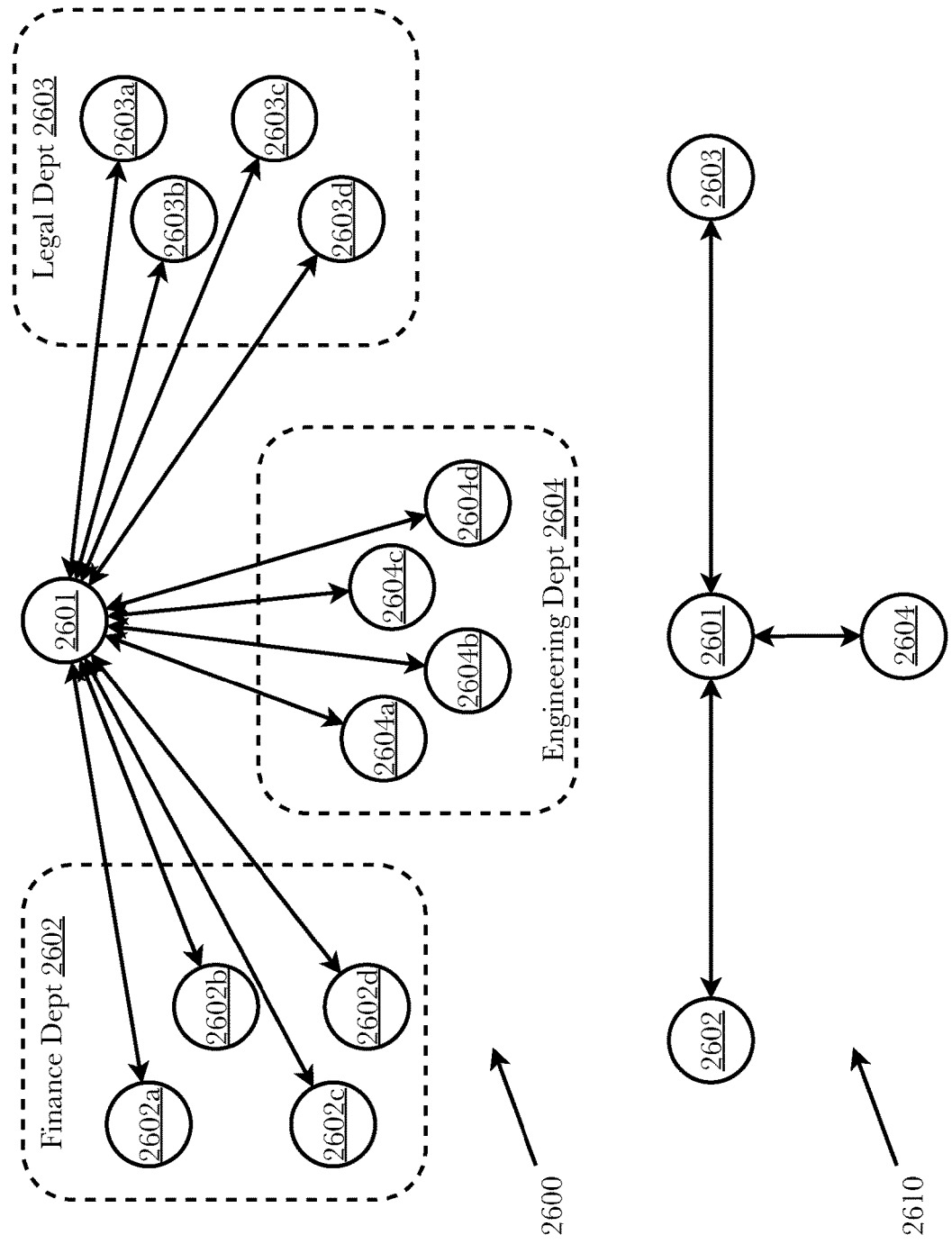
FIG. 26 is a diagram showing how network segmentation may be used to reduce the number of entities analyzed to make cybersecurity analyses more tractable.

FIG. 26 is a diagram showing how network segmentation may be used to reduce the number of entities analyzed to make cybersecurity analyses more tractable. Networks can involve many thousands of entities, and the exponential number of interconnections among those entities can make cybersecurity analyses of large networks intractable, even with powerful computing resources. Thus, for example, combined UEBA/network topology analyses may exceed available computing resources, particularly where such analyses are attempted on a periodic or real-time basis. A solution for such complexity is segmentation of a network, wherein each device in a given network segment interacts with the network in a consistent, predictable manner. In such a case, all of the devices within a given segment can be reduced, for cybersecurity analysis purposes, to a single node of the network, greatly simplifying the network topology and reducing the computing resources necessary for cybersecurity analyses. Many different network segmentation technologies exist, such as virtual local area network (vLAN), in which a group of ports form a logical LAN segment and traffic from devices assigned to those ports remains within the vLAN, virtual routing and forwarding (VRF), in which traffic from devices assigned to the segment is routed only to other similarly assigned devices, and network access control (NAC), wherein endpoint security controls are established restricting access to a segment to authorized devices.

As an example of simplification of cybersecurity analyses through segmentation, a central network node 2601 may be connected to numerous devices 2602*a-d*, 2603*a-d*, and 2604*a-d* that make up different functional groups within a company, the finance department 2602, the legal department 2603, and the engineering department 2604. As shown in 2600, the central network node 2601 is represented by direct connections to each of these devices 2602*a-d*, 2603*a-d*, and 2604*a-d*. However, as shown in 2610, if the devices 2602*a-d*, 2603*a-d*, and 2604*a-d* are each assigned to their respective departments 2602-2604 using segmentation, the network can be simplified to a four-node network with 2601 as the central network node, and all of the computers in a given department represented by a single node 2602-2604. Reducing the network to segments in which all of the devices are connected to the network in a consistent, predictable manner greatly reduces the number of nodes that must be analyzed, as each device within a segment can only access the network in the same manner as all other such devices. Cybersecurity issues that affect a segment can thus be constrained to that segment.

Figure 28:
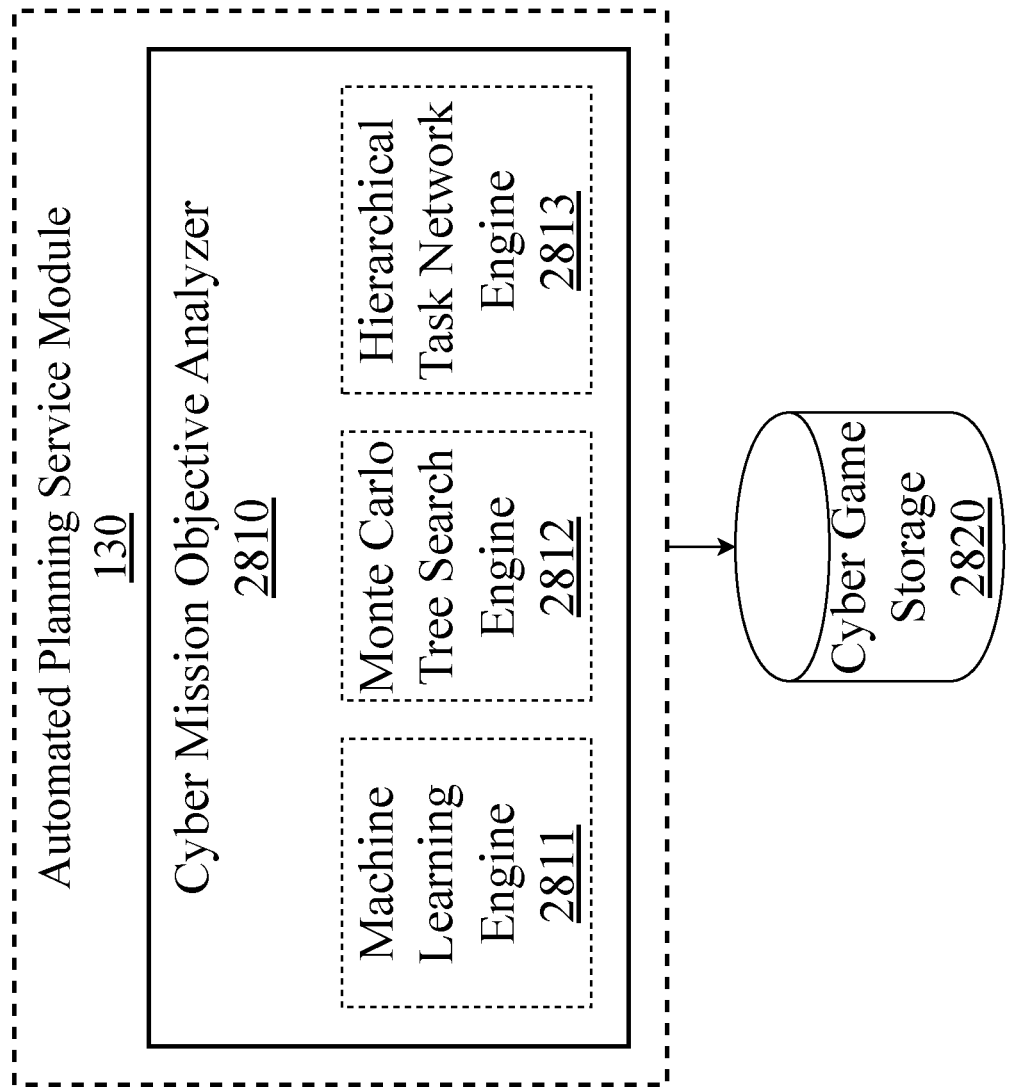
FIG. 28 is a system diagram illustrating an automated planning service module with additional components that may be used for exploitation path analysis and task plan optimization, according to an embodiment.

FIG. 28 is a system diagram illustrating an automated planning service module with additional components that may be used for exploitation path analysis and task plan optimization, according to an embodiment.

An automated planning service module 130 is a component in an advanced cyber decision platform that is responsible for many statistical analyses and machine learning capabilities, using information theory concepts, as disclosed previously. According to a preferred embodiment, the automated planning service module further contains in its architecture, a cyber mission objective analyzer 2810 which is a logical or physical grouping of three specific data analysis engines for the purposes of automated task planning, and path traversal for cybersecurity decision trees: a Machine Learning ("ML") engine 2811, a Monte Carlo Tree Search ("MCTS") engine 2812, and a Hierarchical Task Network ("HTN") engine 2813. A machine learning engine 2811 is responsible for generalized machine learning tasks including the operating of neural networks of various compositions, and potentially other algorithms such as simulated annealing, genetic algorithms or other metaheuristics, linear regression algorithms, reinforcement learning, and more. An MCTS engine 2812 is responsible for evaluating Monte Carlo tree searches, which are a specific method for creating, evaluating, and searching decision trees of actions and outcomes used in game theory, prominently or especially in research and systems used for solving complex games such as "Go" or "Chess". An HTN engine 2813 is responsible for creating and evaluating or helping evaluate automated task plans, formed using hierarchical structures and methods, typically using a formal language structured to define or describe actions, goals, and relationships between actions such as dependency or resource-sharing between actions (also often referred to as "tasks").

A Cyber Game Storage 2820 is a datastore of some kind, which may store combinations, permutations, templates, or instances of HTN plans and simulated network topologies and setups, that may help simulate, analyze, emulate, or test in limited real-world systems, the results of different plans of network attacks and plans of network defense or threat mitigation.

Figure 29:
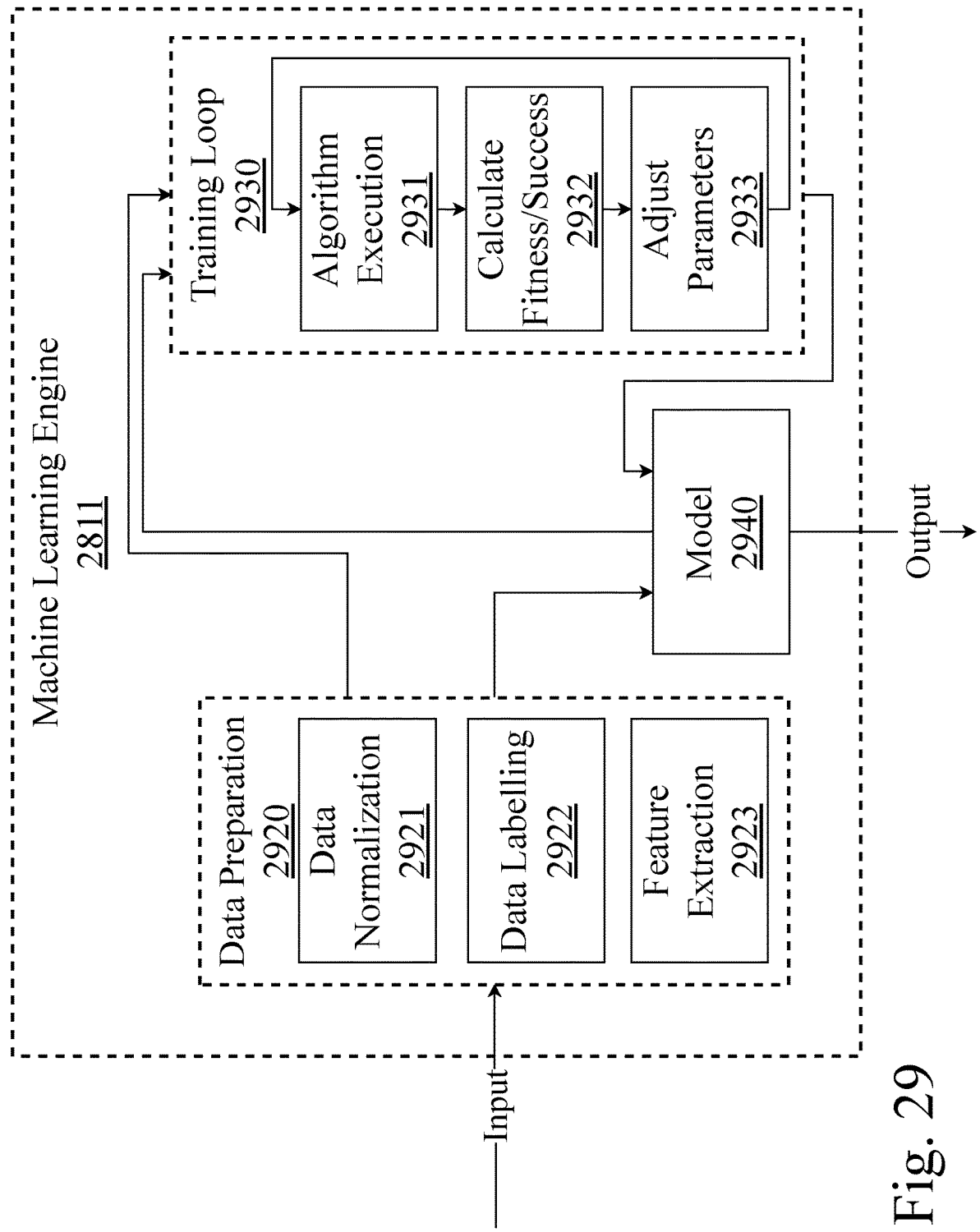
FIG. 29 is a system diagram illustrating an exemplary architecture of a machine learning engine.

FIG. 29 is a system diagram illustrating an exemplary architecture of a machine learning engine. A machine learning engine 2910 may be a software component, standalone software library, system on a chip, Application-Specific Integrated Circuit ("ASIC"), or some other form of digital computing device or system capable of interacting with and receiving data from other digital or software systems. It may be connected over a network, or connected within a system or computer, and may be utilized by software processes or communicate with them as a separate application or process instance. The basic components within a machine learning engine, broadly, are a data preparation 2920 loop or algorithm, which may contain some combination of steps, commonly including data normalization 2921, data labelling 2922, and feature extraction 2923, depending on the exact implementation or configuration of a machine learning engine 2910. A key feature of a machine learning engine 2910, is the existence of some form of a training loop 2930 in their software or chip design, a series of steps taken to take input data and learn how to process it and produce better output, at least in theory. A machine learning engine 2910 may be configured or implemented poorly merely as a matter of execution, and may have trouble learning efficiently or at all, or have difficulty learning usefully from certain knowledge areas or domains, but all machine learning systems contain a training loop of some kind, and they frequently contain the subcomponents or steps of having algorithm execution perform over the set of input data 2931, calculating the fitness or success states or success rate of the algorithm with a current model 2940, and adjusting the parameters of the model to attempt to output better or more useful data for a given input data.

A model 2940 is a software or mathematical representation of data that impacts how an algorithm operates. An algorithm may be any set of concrete steps taken to attempt to process data or arrive at some solution to a problem, such as a basic search algorithm which tries to find a specified value in apparently unsorted numeric data. A basic attempt at such a search algorithm might be to simply jump around randomly in the dataset and look for the value being searched for. If machine learning were applied to such an algorithm, there might be a model of parameters for the algorithm to operate with, such as how far from the current index being examined in the input dataset, to be capable of jumping. For instance, in a set of 1,000 numbers in no readily apparent ordering or sorting scheme, the algorithm to randomly pick numbers until it finds the desired number may have a parameter that specifies that if you are currently at index x in the dataset being searched, you may only jump to a value between x−50 and x+50. This algorithm may then be executed 2931 over a training dataset, and have its fitness calculated 2932, in this example, as the number of computing cycles required to find the number in question. The lower the number, the higher the fitness score.

Using one of many possible parameter adjustment 2933 techniques, including linear regression, genetic variation or evolutionary programming, simulated annealing or other metaheuristic methods, gradient descent, or other mathematical methods for changing parameters in a function to try and approach desired values for specified inputs. Machine learning training method, that is, the way they adjust parameters 2933, may be deterministic or stochastic, as in evolutionary or genetic programming, or metaheuristics in general. Examples of genetic programming include the concept of genetic variation, whereby several different models of an algorithm are run over the same input data, compared for fitness, and a selection function determines which models to use for "breeding" the next "generation" of the model population, at which point a crossover function is used to recombine the "genes" (the word used in genetic programming to refer to function or model parameters) into different arrangements for each new member of the next generation, lastly applying a mutation function to alter (either randomly or statistically) some selection of genes from some selection of the newly bred models, before the process is repeated with the hope of finding some combinations of parameters or "genes" that are better than others and produce successively better generations of models.

Several machine learning methodologies may be combined, as with NeuroEvolution of Augmenting Topologies ("NEAT"), whereby a genetic algorithm is used to breed and recombined various arrangements of neurons and hidden layers and the parameters of neurons, in a neural network, reducing the use of human judgement in the design or topology of a neural network (which otherwise often requires a fair amount of trial and error and human judgement). These situations may be thought of either as multiple different training loops 2930 occurring with multiple models 2940, or may be thought of as multiple machine learning engines 2910 entirely, operating together.

Figure 30:
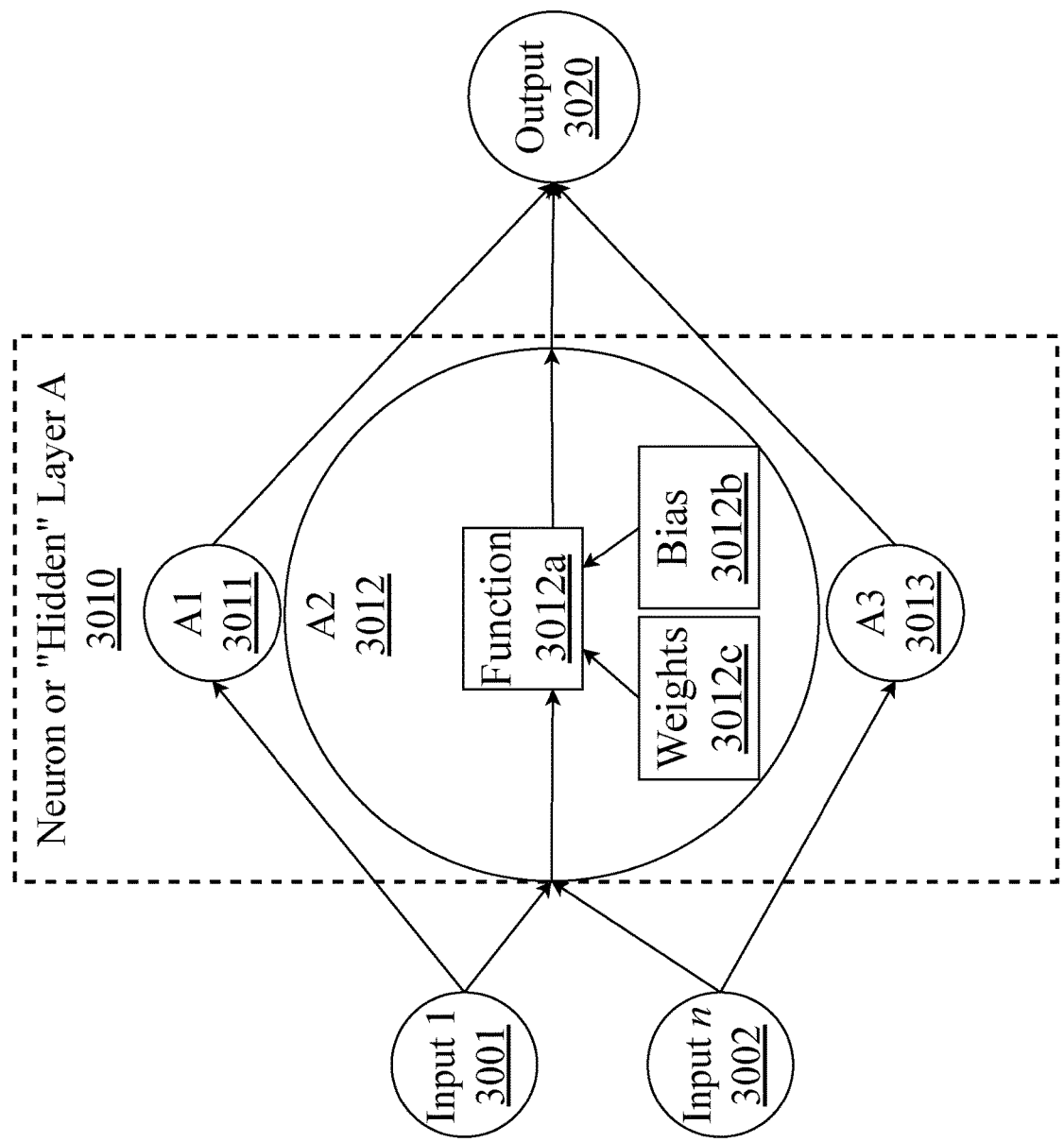
FIG. 30 is a diagram illustrating an exemplary architecture of a neural network.

FIG. 30 is a diagram illustrating an exemplary architecture of a neural network. A neural network is a software system that may be used to attempt to learn or improve an algorithm at a task or set of tasks, using mathematical models and approximations of biological neurons with artificial neurons. The kinds of tasks that may be used in combination with a neural network are potentially unlimited so long as the problem is deterministic, but common applications include classification problems, labeling problems, compression or algorithm parameter tuning problems, image or audio recognition, and natural language processing. Neural networks may be used as part of a machine learning engine, as the method by which training is done and a model is generated. A neural network contains at least one input, here labeled as input 1 3001, but may have multiple inputs, labeled input n 3002, that feed into a neuron layer or hidden layer 3010 which contains at least one artificial neuron, here shown with A1 3011, A2 3012, and A3 3013. Inside of each neuron are three components, an activation function 3012*a*, a bias 3012*b* value, and a weight for each input that feeds into the neuron 3012*c*. An activation function 3012*a* is the function that determines the output of the neuron, and frequently follows a sigmoidal distribution or pattern, but may be any mathematical function, including piecewise functions, identity, binary step, and many others. The activation function 3012*a* is influenced not only by the inputs into a neuron 3001, 3002, but the weight assigned to each input 3012*c*, which multiplies an input value by itself, and a bias 3012*b*, which is a flat value added to the input of the activation function 3012*a*. For instance, with a single input value of 17, a weight of 0.3, and a bias of 0.5, a neuron would run its activation function with an input of 5.6 (17*0.3+0.5). The actual output of the activation function 3012*a*, for each neuron, then may proceed to be output 3020 in some format, usually numeric, before being interpreted by the system utilizing the neural network. There may be multiple output values, representing confidence values in different predictions or classifications, or other multi-valued results.

Various forms and variations of neural networks exist which may be more or less applicable to certain knowledge domains or certain problem sets, including image recognition, data compression, or weather prediction. Some examples of different types of neural networks include recurrent neural networks, convolutional neural networks, deep learning networks, and feed forward neural networks, the last of which is regarded by many as the "standard" or most basic usable form of an artificial neural network.

Figure 31:
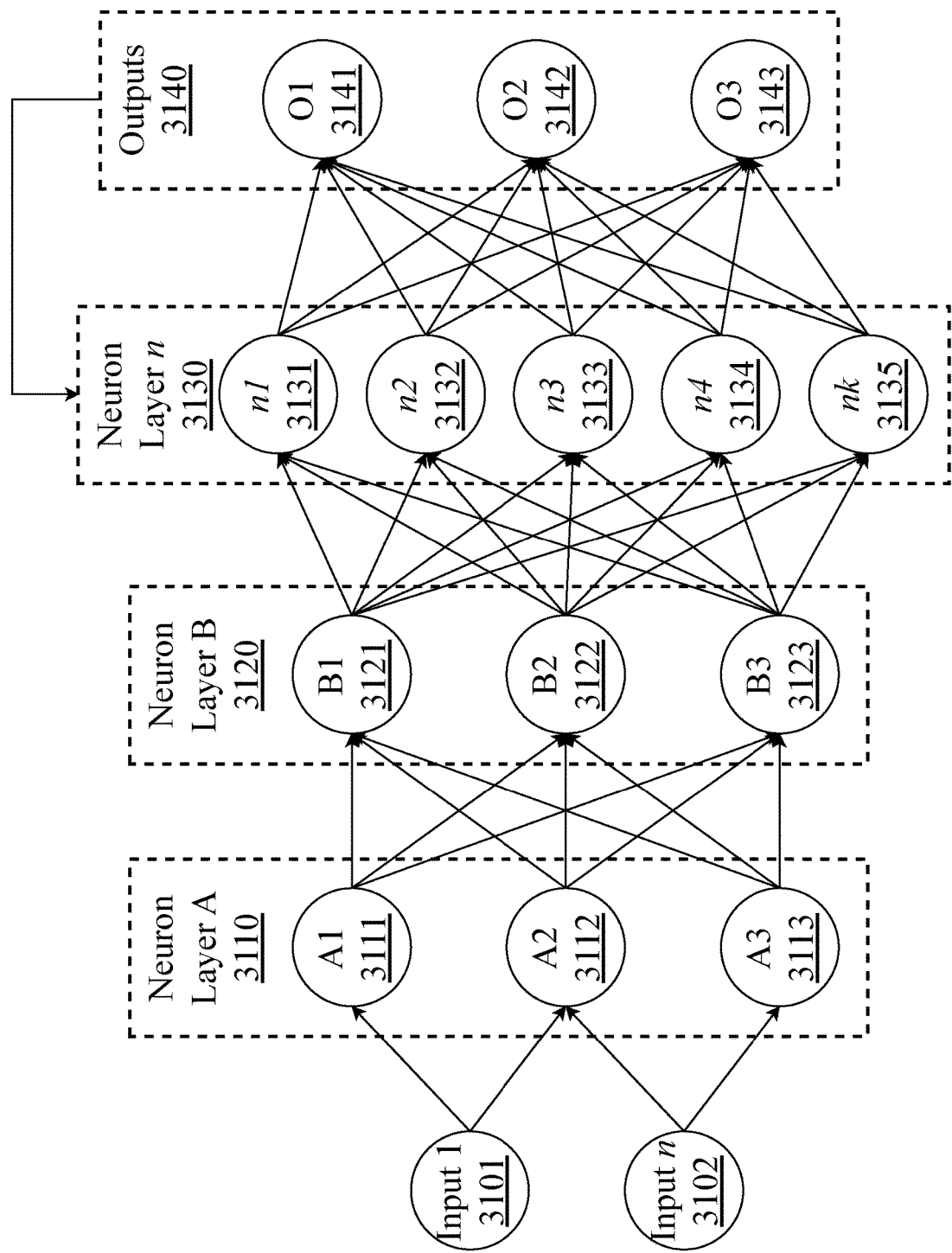
FIG. 31 is a diagram illustrating an exemplary architecture of a deep learning recurrent neural network.

FIG. 31 is a diagram illustrating an exemplary architecture of a deep learning recurrent neural network. An example of a neural network of two different forms, both recurrent and deep, it possesses at least one input 3101 but can potentially (or even usually) have multiple inputs n 3102, and multiple neuron or "hidden" layers, represented as neuron layer A 3110, B 3120, and n 3130, each containing their own neurons A1 3111, A2 3112, A3 3113 in neuron layer A 3110; neurons B1 3121, B2 3122, and B3 3123 in neuron layer B 3120; and neurons n1 3131, n2 3132, n3 3133, n4 3134, and n5 3135, in neuron layer n 3130, mapping to multiple outputs 3140 O1 3141, O2 3142, and O3 3143.

Like all neural networks, there is at least one layer of neurons containing at least one artificial neuron, at least one input, and at least one output, but what makes the network recurrent is that the outputs 3140 map partially or fully in some fashion to another layer or multiple layers 3110, 3120, 3130 of the neural network, allowing the output to be further processed and produce even different outputs both in training and in non-training use. This cycle, allowing output from some nodes to affect subsequent input to the same nodes, is the defining feature of a recurrent neural network ("RNN"), allowing an RNN to exhibit temporal dynamic behavior, that is, allowing the state of later portions of the network to influence previous layers of the network and subsequent outputs, potentially indefinitely as long as the network is operated due to the cyclical nature of the connection(s).

What makes the network "deep" or a deep learning neural network, is the fact that there are multiple layers of artificial neurons 3110, 3120, 3130, which can be engineered differently or uniquely from each other, or all engineered or configured in the same fashion, to fit a variety of tasks and knowledge domains. Deep learning is a frequently used phrase that literally refers to the use of multiple layers of artificial neurons, but more generally refers to a learning system that may be capable of learning a domain or task "deeply" or on multiple levels or in multiple stages. For example, an image recognition system employing deep learning may have its neural networks arranged and utilized in such a way that it is capable of learning to detect edges, and further, detect edges that seem to be faces or hands, separately or distinctly from other kinds of edges. It is not necessary that a neural network have only one label for the variant or type of neural network it is. For instance, almost any type of neural network can be "deep" by having multiple hidden layers, and a convolutional neural network may also have recurrence at some of its layers. Multiple neural networks may also be used in conjunction with, or beside, each other, to achieve highly tailored and sometimes complex results, such as for self-driving vehicles and complex machine vision tasks.

Figure 32:
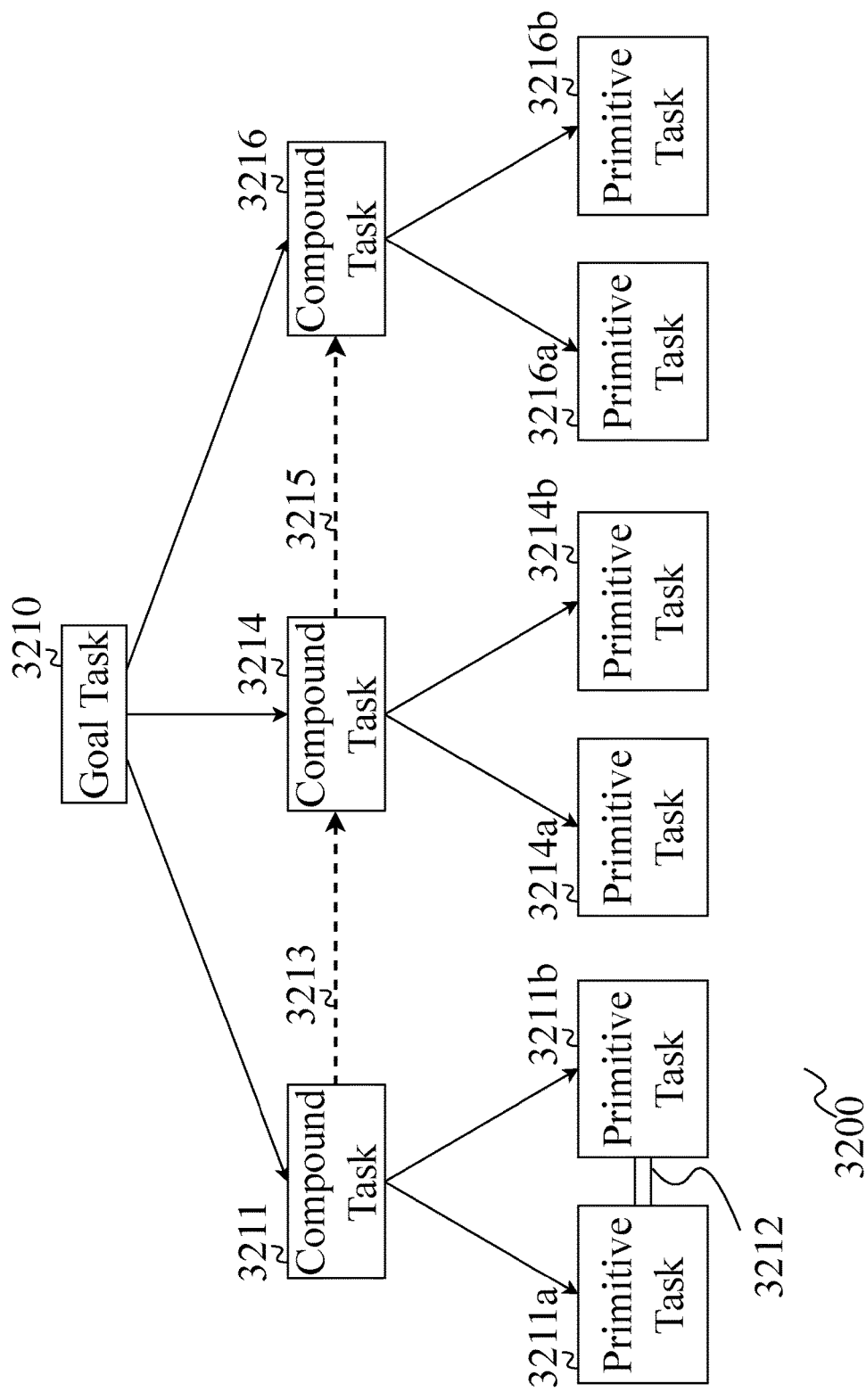
FIG. 32 is a system diagram illustrating an exemplary implementation of a hierarchical task network.

FIG. 32 is a system diagram illustrating an exemplary implementation of a hierarchical task network. According to an embodiment, a Hierarchical Task Network ("HTN") 3200 is an algorithmic and data-driven approach to automated planning and the creation of automated plans, in which dependency between actions can be formally structured, allowing for complex automated plans with sequential, dependent, and compound tasks or actions can be constructed and executed by computing devices. The use of an HTN is to have a system or subsystem that is capable of producing actionable plans understood by other computing systems or subsystems, that may be executed by them, similar in concept to a software program that is written by software. For example, an HTN may be constructed representing the task of building a house, in which some tasks may be to construct walls or a roof, which may depend on other tasks being finished such as constructing a floor and load-bearing columns or walls, all of which may be considered compound tasks and comprised of primitive tasks such as "saw wood" or "mix cement", or "nail boards together". Tasks may depend on each other, and may share resources, allowing for further subsystems to optimize the tasks if optimizations are not planned directly by the HTN. For instance, sharing computing resources for two simultaneous calculations or processes run by a computing system, may be left to be managed by the computing system in question. Solutions to an HTN problem are typically executable sequences of primitive tasks, that are obtained or defined by decomposing or breaking down compound tasks into simpler tasks, with ordering or precedence constraints and resource-sharing defined between primitive tasks.

In a single HTN, the overall task or goal of the HTN, that is, the desired end-state of the plan, is the goal task 3210. This, in the example of constructing a house, would be the task "build a house." In practice, the task is formalized in computer-readable language, which may be similar to a JavaScript Object Notation ("JSON") string, an XML, string, or some other format of data able to be parsed by a computer system. This goal task 3210 is then split into multiple tasks that may be compound tasks 3211, 3214, 3216 with specific relationships or dependencies on each other 3213, 3215.

A compound task 3211, 3214, 3216 is a task made up of other tasks, which may themselves be compound or primitive. Examples of compound tasks in the "build a house" example may include "build a floor", "build a staircase", "build a wall", "build a ceiling", "build a doorframe", and others. The relationships that may arise between tasks that are shown, are precedence or contingency 3213, 3215 from one task to another. For instance, the task of "build a floor" may have precedence to take place before the task "build a wall", which may have precedence over the task "build a roof". These compound tasks, and the precedence relationships between them, may result in complex processing orders to accomplish highly complex, yet methodical and deterministic, planned behaviors from systems that operate the HTN.

A primitive task 3211a, 3211b, 3214a, 3214b, 3216a, 3216b, is a task that is not broken into smaller tasks, but is itself the end of that branch of the tree, or in other tree graph terminology, a primitive task is a terminal or end node of the tree. In the "build a home" example, these primitive tasks could be as simple as "lift bucket" or "lower bucket", or slightly higher level such as "pour cement", depending on the implementation and configuration of the system and HTN engine being used. Tasks may have shared resources 3212, such as a shared bucket between two tasks "raise bucket" and "lower bucket", or shared computer memory for a calculation that must take place on the same computing system. Combined with task precedence ordering, this allows HTNs to define relatively complex automated plans for accomplishing goal tasks, in a highly deterministic and algorithmic fashion.

When the above definition and implementation of an HTN is utilized for the problem of "build a house", it may therefore decompose the goal task of "build a house" to a large and highly ordered set of steps that bear little resemblance to the goal task to a human observer, such as "lift bucket", "move bucket right 5 inches", "tilt bucket 45 degrees", and many more primitive tasks that are accomplished in a specified order with specified resources between tasks. In this way, a complex task or tasks are decomposed into a regimented and finite set of primitive tasks that can be accomplished by the executing system.

Figure 33:
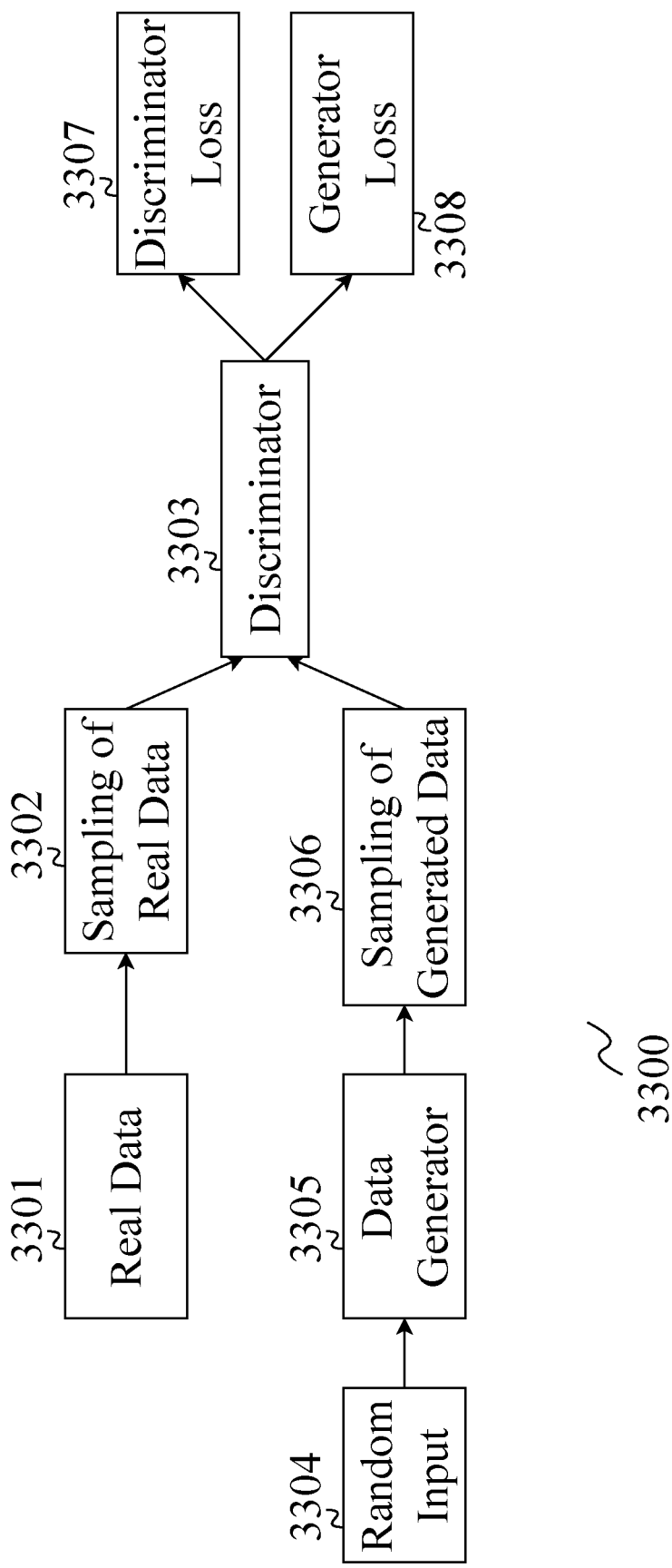
FIG. 33 is a system diagram illustrating an exemplary implementation of a generative adversarial network.

FIG. 33 is a system diagram illustrating an exemplary implementation of a generative adversarial network. In a Generative Adversarial Network ("GAN") 3300, two different neural networks are trained on opposing datasets and for opposing purposes; one is trained to try and produce data that closely matches real data (but is never actually real), such as images of money that closely resemble real images of money, which is the "generator", while a "discriminator" network learns from real input and must determine if the output provided by the generator is real or fake. When the discriminator correctly determines that the output from the generator is fake, a generator loss function is applied, which is fed into the generator network as a negative reinforcement, to try and get the network to generate different output. When the discriminator fails to deduce that generator-supplied input is fake and not real data, a discriminator loss function is applied and the discriminator must learn from the data that it failed to catch, and attempt to hone its ability to discriminate. In other words, the discriminator actually trains the generator, by penalizing it for producing poorly formed data.

In the diagram shown, real data 3301 is supplied and sampled 3302 for training a discriminator 330 neural network. The discriminator is also trained by samples of output 3306 from the generator 3305, which is supplied with random or "noise" input 3304, due to the fact that neural networks require an input to operate. The data generator 3305 at first produces meaningless output, and the discriminator is trained to recognize and classify the real data as "real" and the fake or generated data as "fake", with incorrect classifications being penalized by the discriminator loss function 3307 and backpropagated to update weights in the discriminator network.

When the generator 3305 of a GAN 3300 is trained, however, it is first fed random noise input 3304, before generating output (which may be relatively meaningless or easily identifiable as fake, at first) 3306, which is fed into the discriminator 3303. The discriminator then makes the determination if the generator's data is real or fake, and if the data is fake, the discriminator then applies the generator loss function 3308 and backpropagates it through both of the neural networks to obtain gradients, however only updating the weights of the generator neural network.

A GAN is trained in an iterative and linear process of training first the discriminator, then the generator, and then repeating the process until both are suitably trained. For example, after a discriminator is trained to recognize initially random or mediocre output from an untrained generator, the generator must then learn to produce something that isn't random or horrendously bad output when it comes to its turn for training. After it has learned to produce marginally "better" data and might be able to fool the discriminator, the discriminator now needs to learn to recognize this "better" data as fake compared to real data, in new training epochs.

FIG. 34 is a system diagram illustrating an exemplary implementation and architecture of a Monte Carlo Tree Search algorithm. A Monte Carlo Tree Search ("MCTS") algorithm 3400 is both a system and method of representing certain simulation and probability problems, as a graph tree 3450 of choices and outcomes, typically with a focus on win/loss ratios between two sides of a zero-sum situation such as a boardgame. The two sides may also be represented in some cases as "my side" and "any other side", that is, there may be multiple factions or more than 2 possible winners, but many MCTS implementations are concerned with determining choices that maximize "my" winning, and maximizing "all others" losing, essentially grouping any other faction or entity other than the desired one as an altogether "other" faction in the zero-sum game. Each node may represent a given choice at a specific state of the game or simulation, where the value shown is the number of known wins or losses branching from that choice, from the perspective of the choosing side. For example, in an MCTS of a chess game, each layer of the tree may represent an alternating side of the chess board, the white and black sides, with each node representing one discrete move for that player at that state in the game. Therefore, there may be many dozens, hundreds, or in some cases thousands of nodes branching from a single node, if there are many possible choices to make at any given state in a simulation or game.

The MCTS algorithm follows a specific set of steps to reach a conclusion, known by some in the art as stages. First, a selection stage 3410 starts from a root node, and selects child nodes successively until a lead node is reached. A root may be thought of as the current simulation or game state, and a leaf is any node that has a potential child from which no simulation has been initiated, that is, no subsequent moves have been attempted or calculated or simulated yet. This choice may be biased or weighted in certain ways, such as picking leaf nodes of game states that already have favorable win/loss ratios, so as to prioritize the exploration of high-value game states and decisions.

A following stage, known as the expansion stage 3420, expands the leaf node selected in the previous stage 3410, into further move choices, unless the leaf node decisively ends the game or simulation with a victor for the zero-sum simulation being played out, or ends in a tie. In other words, if the selected leaf node doesn't represent an action that immediately ends the game, then take the action (or at least simulate it) and expand nodes that represent subsequent moves that can be made from that node, when that node is taken as the new game state (i.e. it is hypothetically chosen as the course of action by the search algorithm).

After selection and expansion of nodes, the simulation stage 3430 completes a random simulation from the expanded node. In other words, once a leaf node has been selected and expanded (in the case of the leaf node not representing an action that itself ends the simulation) into possible choices from there, a randomly selected decision tree commencing from that node's expanded choices may be undertaken, until the simulation or game ends decisively.

Lastly, in the backpropagation stage 3440, the results of this playout or simulation are backpropagated through the tree, updating the win/loss ratio for the tree and the players represented in the simulation or game, and the algorithm may repeat, continually searching and expanding new gameplay paths or simulation choices, with optional weights towards specific node selection, and in some specialized cases, even the simulation stage 3430 may be weighted or programmed to be biased in favor of certain choices for a playout, to attempt to explore "better" choices that may be more likely to end in a favorable result.

An example MCTS 3450 is shown, with the layers representing, at the top, a "player 1" with 7 wins out of 17 playouts of the game or simulation having been recorded; the next layer of the tree graph represents 3 possible choices for player 1's moves or decisions, each of which results in a different win/loss ratio for the player. A given node's win/loss ratio, or in some sense the node's value, is seen here as being the addition of all its direct children's values or ratios. It is important to note that an MCTS may represent two or more different values, for when multiple players in a game or simulation get to make decisions and the system is designed to consider the state of all players at each decision. In such a circumstance, the value of a node for a given player is the sum of the direct children nodes for that player, which may be more than one layer further down in the graph, which represent the win/loss ratio for possible decisions that player may make, not necessarily the win/loss ratio of the very next decisions in the game (which may be made by a different player entirely).

Figure 35:
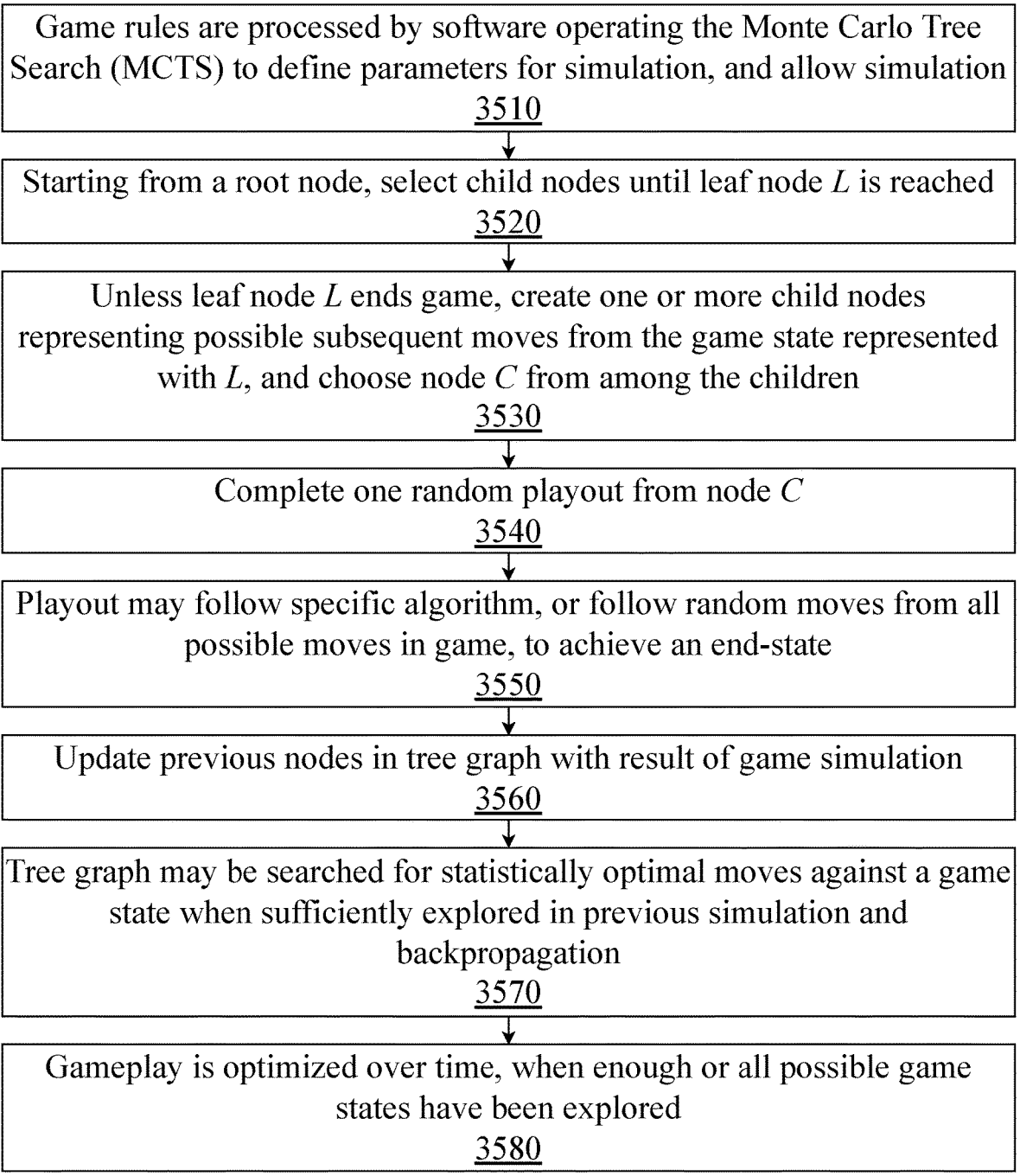
FIG. 35 is a method diagram illustrating the execution of a Monte Carlo Tree Search algorithm.

FIG. 35 is a method diagram illustrating the execution of a Monte Carlo Tree Search algorithm. First, game or simulation rules are processed by the software system that operates the MCTS, to define parameters for a simulation, and allow simulation 3510. Broadly speaking, this can be as high-level or generic as creating an entire software system or library for the simulations envisioned, or it can be as domain-specific as a configuration file for a system already capable of handling MCTS algorithms so long as a configuration for the game or simulation is specified. Software can further be made to extend existing analysis or simulation software or gameplay software systems, to simply iteratively run the analysis, simulation, or gameplay software, recording the responses to specific actions taken by an MCTS algorithm.

When the MCTS algorithm is operating properly, it may begin with the selection stage, starting from a root node and selecting child nodes until leaf node L is reached 3520. A root may be thought of as the current simulation or game state, and a leaf is any node that has a potential child from which no simulation has been initiated, that is, no subsequent moves have been attempted or calculated or simulated yet. This choice may be biased or weighted in certain ways, such as picking leaf nodes of game states that already have favorable win/loss ratios, so as to prioritize the exploration of high-value game states and decisions.

The next stage is the expansion stage of the MCTS. Unless leaf node L ends game, create one or more child nodes representing possible subsequent moves from the game state represented with L, and choose node C from among the children 3530. In other words, if the selected leaf node doesn't represent an action that immediately ends the game, then take the action (or at least simulate it) and expand nodes that represent subsequent moves that can be made from that node, when that node is taken as the new game state (i.e. it is hypothetically chosen as the course of action by the search algorithm).

The simulation stage is when the selected course of action, or node, is actually played out in the simulation or game. In this stage, the system must complete one playout, which is often randomly chosen, from the available moves ahead of node C 3540. In other words, once a leaf node has been selected and expanded (in the case of the leaf node not representing an action that itself ends the simulation) into possible choices from there, a randomly selected decision tree commencing from that node's expanded choices may be undertaken, until the simulation or game ends decisively. The playout choice, and selection of the nodes involved, may follow a specialized or weighted algorithm or machine learning model, rather than only allow for random choices, to achieve an end-state for a node or for the overall MCTS 3550.

Through backpropagation, the MCTS then updates previous nodes in tree graph with result of game simulation 3560. In the backpropagation stage, the results of this playout or simulation are backpropagated through the tree, updating the win/loss ratio for the tree and the players represented in the simulation or game, and the algorithm may repeat, continually searching and expanding new gameplay paths or simulation choices, with optional weights towards specific node selection, and in some specialized cases, even the simulation stage 3540 may be weighted or programmed to be biased in favor of certain choices for a playout, to attempt to explore "better" choices that may be more likely to end in a favorable result.

After backpropagation of values through higher nodes in the tree, the tree graph may be searched for statistically optimal moves against a game state when sufficiently explored in previous simulation and backpropagation 3570, to allow for more directed searching of gameplay or simulated actions, to try and locate more optimal paths in shorter periods of time than a random or undirected search might reveal.

After an MCTS algorithm has been run and the tree graph has been populated sufficiently or entirely, gameplay or simulation action choices may be optimized over time 3580, enabling a system operating the MCTS to achieve extremely high performance in the simulated environment or game being analyzed.

Figure 36:
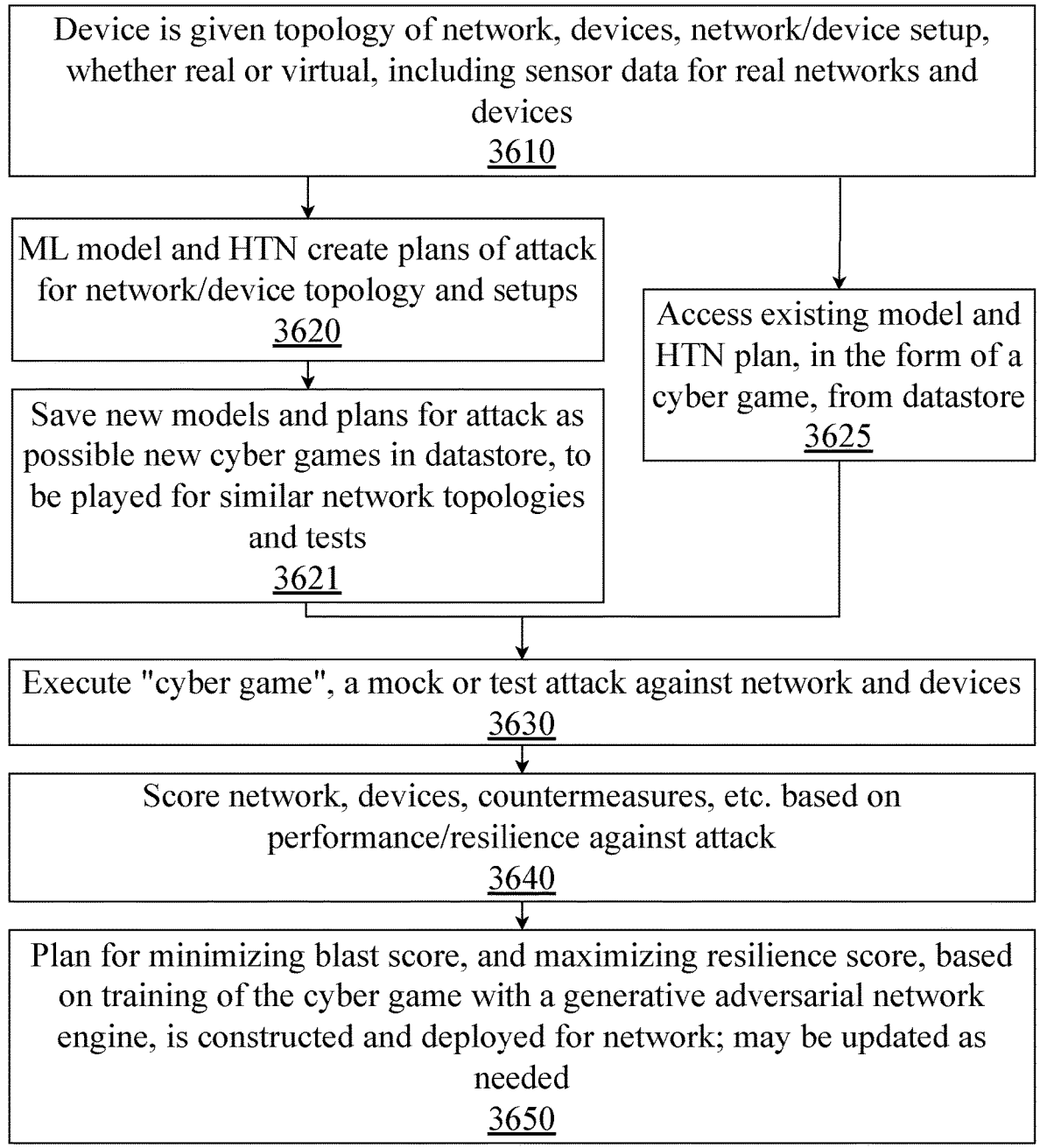
FIG. 36 is a diagram illustrating a method for using an automated planning service module for exploitation path analysis and task plan optimization, according to an embodiment.

FIG. 36 is a diagram illustrating a method for using an automated planning service module for exploitation path analysis and task plan optimization, according to an embodiment. First, the system must be given a topology of networks, devices, and setup or configuration information of these devices and networks to be tested or analyzed whether real or virtual, including possible real-time or regularly polled sensor data for the networks and devices 3610. This may be accomplished with a multi-dimensional time-series datastore, or with directly streamed information about a live network of systems, or some other method for uploading data which the system may be configured to receive.

Using a Machine Learning ("ML") engine, any existing or provided ML model for the given network (that is, if the network has already been analyzed and had simulations run against its configuration) and HTN engine may create "plans of attack" for the network/device topology and setup 3620. In other words, the system must be analyzed, typically with the use of a MCTS and using machine learning techniques, to determine what is possible against a given network based on the received data about the network and connected devices, and determine the success rate or likelihood of given paths of attack and given simulated countermeasures or responses from the network or devices against these actions that an attacker or cyber security event might take.

Once these simulations have been run and the HTN engine has created a plan for how to attack the system in a methodical and executable fashion, the system saves any new models and plan files or data from the ML engine, MCTS engine, and HTN engine, as possible new cyber games in a cyber game datastore, to be played or utilized for similar network topologies and tests 3621.

However, if such models and/or plans already exist for a substantially or entirely similar network topology to the one provided to the system, then rather than analyze and explore the network and develop new models for how it may be attacked, the system may access existing models and plans, in the form of a cyber security game to be played against the network, from a cyber game datastore 3625.

A cyber game in this context may constitute a set of steps that can be taken against networks or devices that are known to those skilled in the art of cyber security, such as DDoS attacks, Man-In-The-Middle (MITM) attacks, phishing attacks and password breaching vulnerabilities, or any manner of other possible security or cyber system integrity concern that may be simulated, including even inclement weather events that take sections of a networked system offline.

When a cyber game is prepared for a network configuration, either specifically for the network or from being previously saved and then read back in from a cyber game datastore, the system may execute the cyber game, a mock or test attack against network and devices 3630. The cyber game may in some instances include real attacks and penetration tests of networks depending on the desired testing, i.e. simulated testing versus actual ethical hacking attempts to test the security and resilience of a networked system.

When a cyber game is played against a network, the network is scored based on both the performance of the network post-game (its resilience against the attacks), and based on the exposure or blast radius the network experienced to the various attacks performed against it 3640.

Once a cyber game has been concluded and a networked system has been scored based on the exposure it has to cyber attacks, and its resiliency score has been calculated, the ML engine and HTN engine may use the MCTS engine to analyze what grouping of actions and configuration changes might be made possible in the network to minimize the network's blast score, and maximize the resilience score, by training a generative adversarial network where the discriminator may be the countermeasures in the network being tested, and the generator is built out of the cyber game to test the network. After sufficient training the GAN sufficiently, the discriminator representing the countermeasures used by the tested network may be examined to see what actions it is now taking to minimize its blast score and maximize its resilience score against the cyber game represented by the generator 3650.

It should be noted that given this method and system for exploitation path analysis and task plan optimization, many different variables can theoretically be controlled for or analyzed, including the permeability of a network with regards to the vulnerability or ease of lateral movement between entry points and targets of interest by attackers, altering the look-ahead depth for task plans and automated planning systems such as the HTN engine, having a dynamic relationship between automated plan generation and user specification or restriction of which actions may be taken for their network or limitations of the network itself, and how deep to analyze, simulate, emulate, or test a network, in terms of the size of an HTN plan, or the depth of an Monte Carlo tree search, or in terms of how much computing time or real-time to devote to a given simulation or cyber game. Provided here is only a possible configuration of these elements or methods or steps, and these steps or slight alterations or configuration choices for them should not be considered limiting or exclusive in the overall assembly or operation of the system.

FIG. 37 is a diagram illustrating a method for calculating blast radius scores and resilience scores for a network, according to an embodiment. To calculate the blast score, at the end of a cyber game's execution on a network, the system counts the number of penetrated or compromised interconnected networks, devices, endpoints, services, or datasets that are or would be compromised by the cyber game 3710, and this determines the blast radius or blast score.

For the resilience score, the system attempts to determine the likely, demonstrated, or possible (depending on available data) ability of a system of network to continue operating, functioning, or recovering from a cyber security incident 3720, which may be done with attempting to simulate a recovery plan created by an HTN engine, having pre-defined markers or values for how damaged a networked system may be if certain components fail, or some other method that may be defined differently depending on the implementation.

For both the blast radius score and the resilience score, a mathematical transformation, alteration, or normalization may be applied to the raw numeric scores, such as weighting the scores more heavily or lightly for certain components failing 3730 or certain types of network or device failure as being especially damaging or alarming. Regardless of the scores, the results of the cyber game being tested against the networked system are recorded and saved in a datastore 3740.

Depending on the different network and system topologies that may be analyzed with or uploaded to the analysis system, and depending on the different cyber games and their relationships between the previously tested network setups and their scores post-cyber-game, future decisions on which cyber games may be best to run on a given network or system may be made 3750, optimizing the choice for what cyber games would best test certain vulnerabilities or incidents on different networks.

After scores have been calculated and saved, the scores for a given tested network may be provided to that network's system administrators (or other customers, clients, or users of the analysis system) to allow them to understand their network or system vulnerabilities and resiliency 3760.

FIG. 38 is a diagram illustrating a method for calculating possible insurance or financial risks and impacts for a network based on exploitation path simulations, according to an embodiment.

For a given network topology and configuration that is detected by, or uploaded to, a network and cyber security analysis system, the financial impact of given services or devices going offline or having a specific incident or compromise occur for a given timeframe, and the financial value of different devices in network, may be used by the system 3810. When considered by the system, the GAN may be trained to optimize the plans built by the HTN in the system, to optimize not just the blast scores and resiliency scores, but to minimize financial impact 3820, to produce economically effective plans rather than merely technically effective ones.

Resilience scoring may also be weighted towards higher financial impact services, i.e. more financially impactful losses translate to lower resilience scoring 3830, in another method for training the GAN to optimize for financial loss rather than merely network resilience without respect to financial impact. Generated plans of action to address and minimize future cyber game or real-world incidents may then be produced and deployed with the goal of minimizing not just network vulnerabilities, but financial impact 3840.

Figure 39:
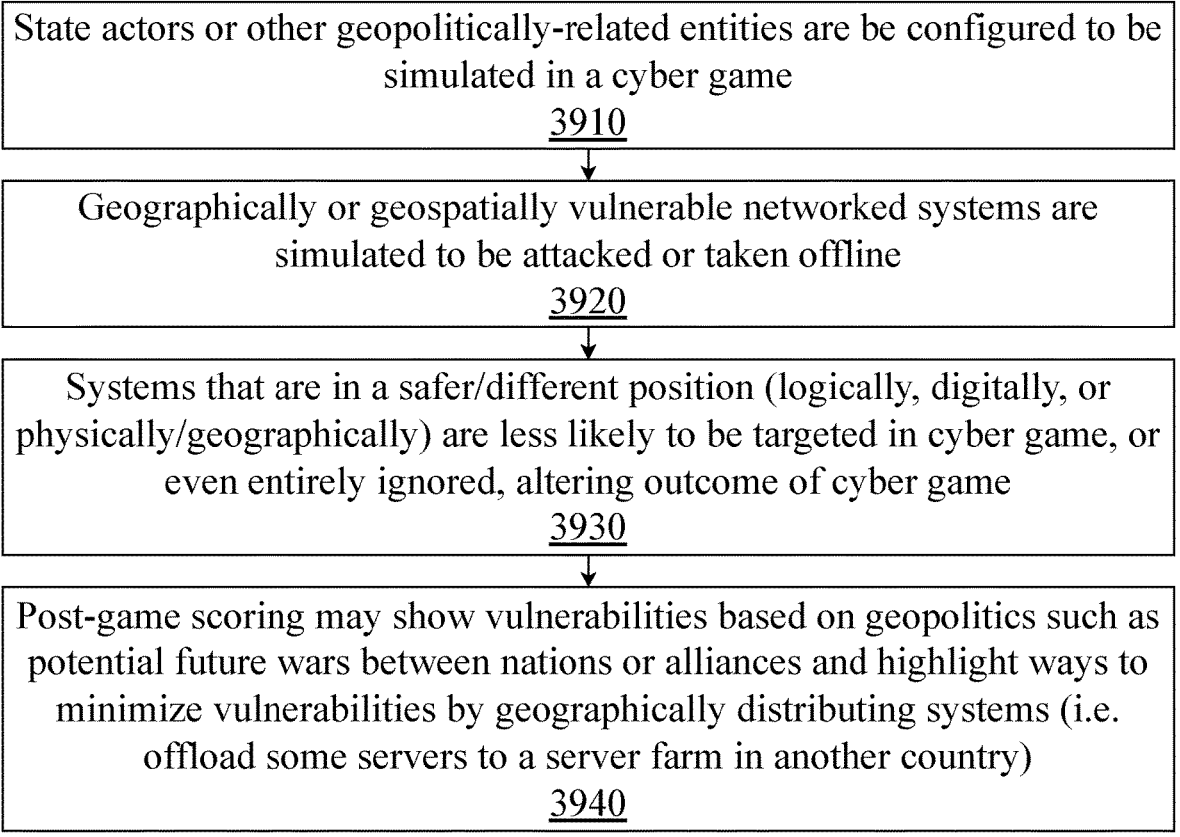
FIG. 39 is a diagram illustrating a method for analyzing a network's exploitation paths and cyber security based on current or possible future geopolitical tensions, according to an embodiment.

FIG. 39 is a diagram illustrating a method for analyzing a network's exploitation paths and cyber security based on current or possible future geopolitical tensions, according to an embodiment.

State actors or other geopolitically-related entities may be configured to be simulated in a cyber game 3910, through configuration of the HTN to include actions for cyber games that may simulate things such as tenor attacks, military attacks or interventions, or other geopolitical events such as services being cut off from one region to another. When this is done, based on the topology and setup of a tested or simulated network, geographically or geospatially vulnerable networked systems are simulated to be attacked or taken offline 3920, such as if all systems are located physically in Ukraine or some other area of the world that may be a hotspot, and their internet connections are in jeopardy or they rely on services from a country that may be simulated to become hostile.

As part of these geopolitical or geospatial considerations, systems that are in a position (logically, digitally, or physically/geographically) that is less likely to be targeted in cyber game, are entirely ignored 3930, meaning that post-game scoring may show vulnerabilities based on geopolitics such as potential future wars between nations or alliances and highlight ways to minimize vulnerabilities by geographically distributing systems (i.e. offload some servers to a server farm in another country) 3940, while simultaneously rewarding (by having higher resilience scores and/or lower blast radius scores) networks that are geopolitically secure. The GAN that attempts to recommend courses of action to maximize resiliency of the network in response to attacks may then take into account changing the network's vulnerability to geopolitical events, such as offloading services to distributed services or networks that are more secure, or to services provided by a company in another country that may not be connected to a simulated possible event such as a war.

FIG. 40 is a diagram illustrating a method for analyzing a network's vulnerability to natural disaster or weather impacts, and third party service disruption, according to an embodiment.

The geographic distribution of networked systems being simulated and tested is uploaded to analysis system 4010, similar to when the system may be configured for geopolitical concerns, however the system may also use geographic information about the distribution of physical systems to determine the impact of natural weather disturbances such as hurricanes or earthquakes, which may be roughly simulated. Geographically connected ore co-located devices and services may be simulated to suddenly be offline in such a cyber game 4020, without worrying about specifically simulating the weather events themselves in great detail—it is simply enough to simulate "server taken down by inclement weather" in this scenario.

In addition to weather or natural disaster events, third-party API's, cloud services, or other supply-chain-like disruptions for networked services and devices may be simulated in similar manner, such as CDNs or DDoS protection services and cloud computing going offline based on the provider or location of services 4030. In this situation not only the geographic distribution of physical services or devices is considered but the source entity for these services may be considered as well, for instance using a single cloud computing platform for 100% of computing in a service may be considered a chokepoint if some catastrophic failure of the platform occurs, as unlikely as that may seem to be at the time. The resilience scoring may then implicitly reflect geographic and weather-related vulnerabilities, and third-party vulnerabilities (such as using one provider for too many services, or using one physical location for too many services and hosting too many devices there), for a tested network 4040.

Figure 41:
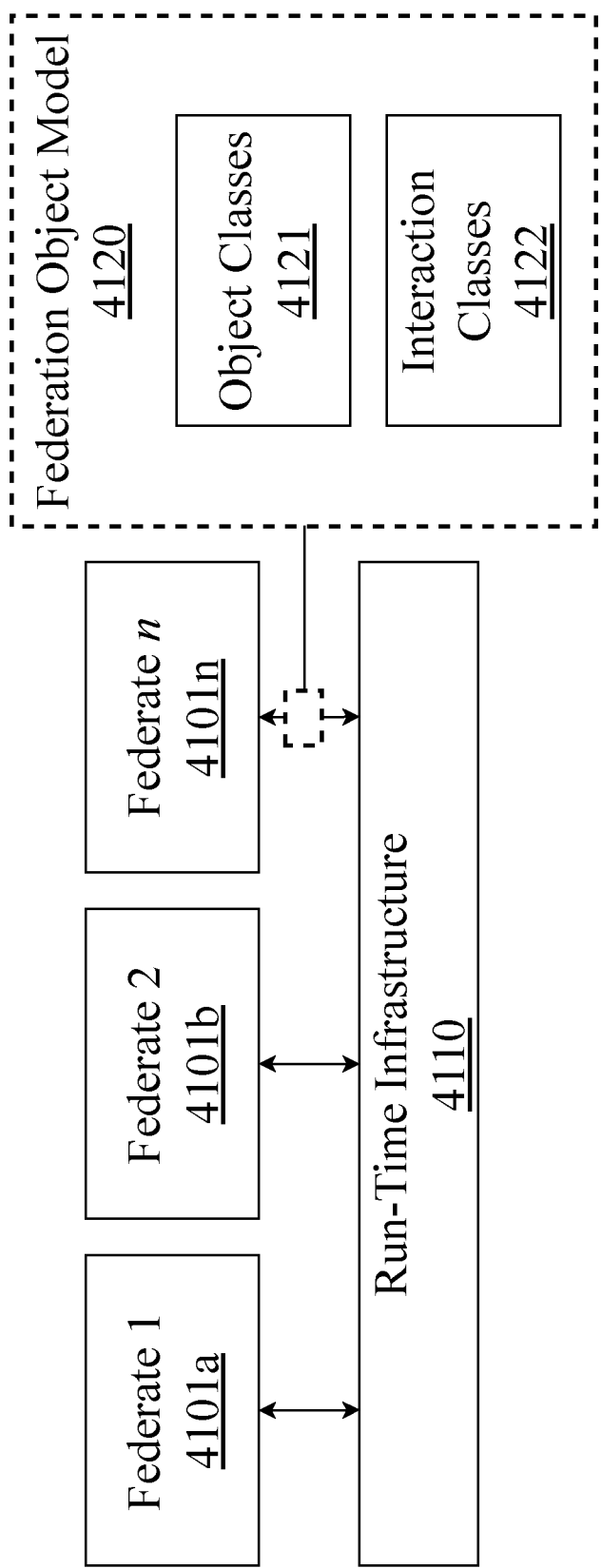
FIG. 41 is an exemplary diagram for High Level Architecture federated simulations.

FIG. 41 is an exemplary diagram for High Level Architecture federated simulations.

High Level Architecture ("HLA") is a methodology and standardized system for distributing simulations of large scale systems, into smaller simulations operated by numerous devices or sub-systems, called "Federates" 4101a, 4101b, 4101n, which communicate using a Federation Object Model ("FOM") 4120, with a Run-Time Infrastructure ("RTI"), to accomplish a collective or larger scale simulation than any one federate is capable of running. An RTI is classified as middleware, and manages both the communications between federates (sometimes collectively called the "federation"), and the actual operations of the overarching simulation. For instance, you may have a city being simulated in an RTI, but the simulation of an individual citizen in the city is managed by a federation of individual citizen simulations, each citizen being represented by one federate 4101a, 4101b, 4101n, who each communicates with the RTI 4110 using the standardized tools provided by the FOM 4120.

The FOM 4120 is a specification of data object classes 4121, and interaction classes 4122, to use the Object Oriented Programming ("OOP") terminology, that define behaviors that may be used by federates, to communicate with the RTI 4110. These are not standardized between different HLA implementations, and are instead constructed specifically for a given HLA project or simulation, but must be shared and understood and standardized between each and every member of a federation, and the RTI, in a given simulated environment, as the FOM is the definition of how the federation and RTI communicate with each other.

The RTI 4110 is a software and potentially hardware service, acting as middleware inbetween different federates in the federation 4101a, 4101b, 4101n, that operates services and possibly an overall simulation environment which federates communicate with via the FOM 4120. These communications may take the form of an API or other interface between software runtimes, and federates and the RTI may run on some combination of different or similar devices, depending on available physical resources and implementation choices.

Figure 42:
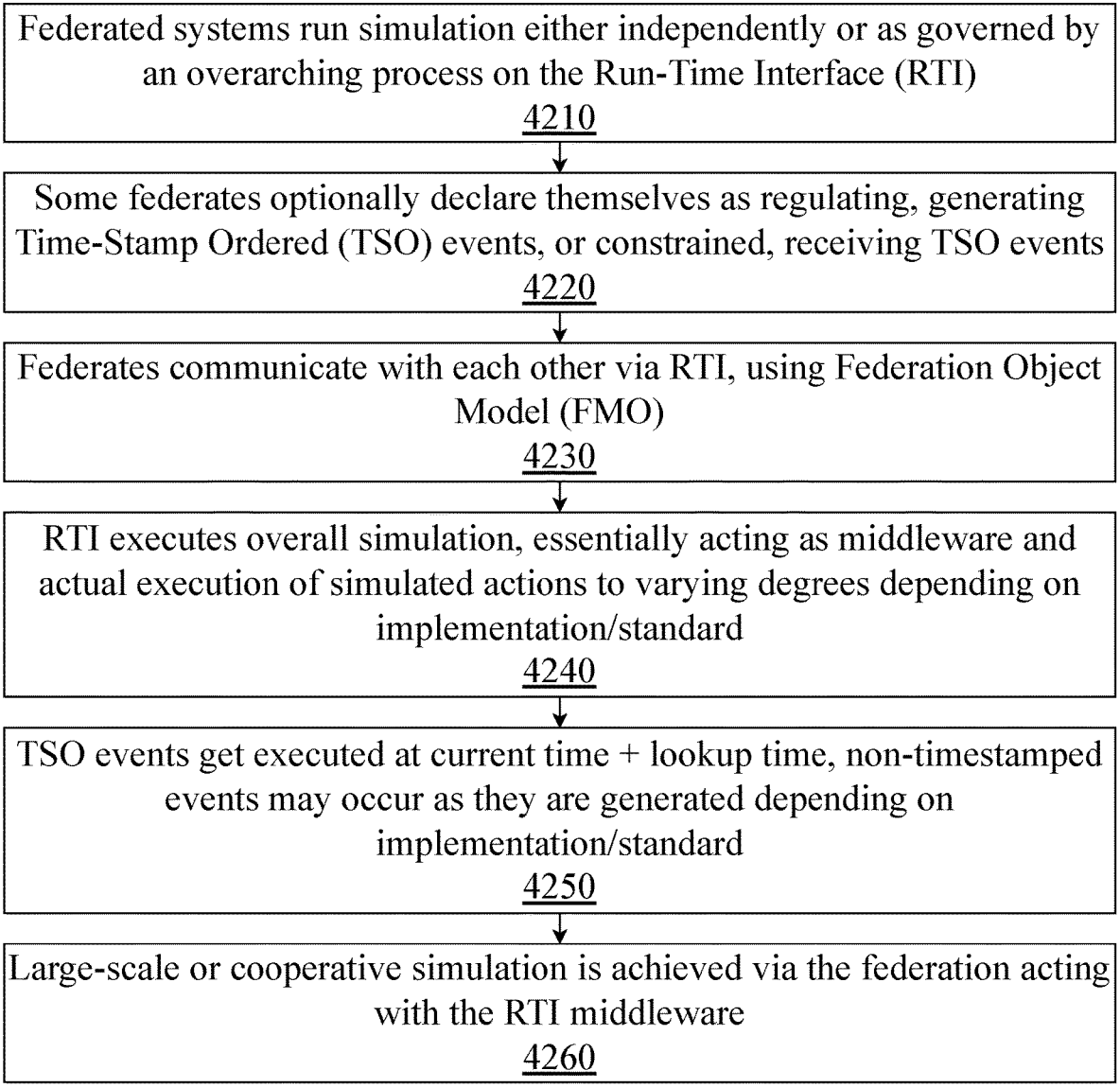
FIG. 42 is an exemplary method diagram for the operation of High Level Architecture federated simulations.

FIG. 42 is an exemplary method diagram for the operation of High Level Architecture federated simulations.

Federated systems run a simulation either independently or as governed by an overarching process on the Run-Time Interface (RTI) 4210. For instance, the RTI may take the form of merely an intermediary and communication middleware between federates, or it may also run its own large scale simulation that federates essentially run sub-simulations within, such as the RTI running a city simulation with federates running individual parts of a city or individual citizen simulations within the city. In all cases, the RTI acts at minimum as a communication intermediary or middleware between federates, in some capacity, whether it provides real-time communications or requires federates to poll the RTI for updates or new data on their own (such as a RESTful API might require).

Some plurality of federates may declare themselves with the RTI as "regulating" federates, which allows them to generate Time-Stamp Ordered ("TSO") events in the simulation, or may declare themselves as "constrained", in which case they are capable of only receiving but not generating TSO events 4220. This permits a more complex timeline capability for simulations, in which some or all of the federates may have strict timestamps for events they trigger or simulate in the overall simulation.

Federates may communicate with each other via the RTI, using the Federation Object Model (FMO) 4230. This is a key feature of HLA, in which the RTI acts as the communications middleware for the members of the federation, wherein the FMO is the standard of communication used between them.

An RTI may execute an "overall" or "overarching" or large scale simulation, acting not only as the middleware for the federation but also handling actual execution of their simulated actions to varying degrees depending on the implementation or standard in a given system 4240. For example a federated simulation maybe numerous neural networks with different hyperparameters or structures that are all attempting to optimize the same problem, and do not need the RTI to run any simulation or complex calculations of its own, as each federate is a mostly self-contained operation, only needing inputs or possibly communications with each other to compare results. However there may also be implementations where the RTI may be a large scale simulation such as a complex mechanical system like an entire automobile, and federates may be individual components within the automobile which communicate with each other and the RTI, to simulate single components, while the RTI handles assembling the data and simulations into an overall simulation of a complete automobile.

In the event that TSO events get executed, they may be executed at a time dictated by a variable tlookup after the current timestamp in the simulation, to allow federates and the RTI to keep track of the chronology of events to happen, while non-timestamped events may occur as they are generated, depending on the implementation of the HLA 4250. The use of a tlookup variable is not universally applied or known in HLA implementations, and other methods including dynamically assigned tlookup times (or rather, dynamically set or per-instance timestamps for events, instead of timestamps dictated by an internal variable) may be used depending on the implementation or parameters of the simulation. In these ways, with the communications from and between federates, large-scale simulations are possible via the federation acting with the RTI middleware 4260.

Figure 43:
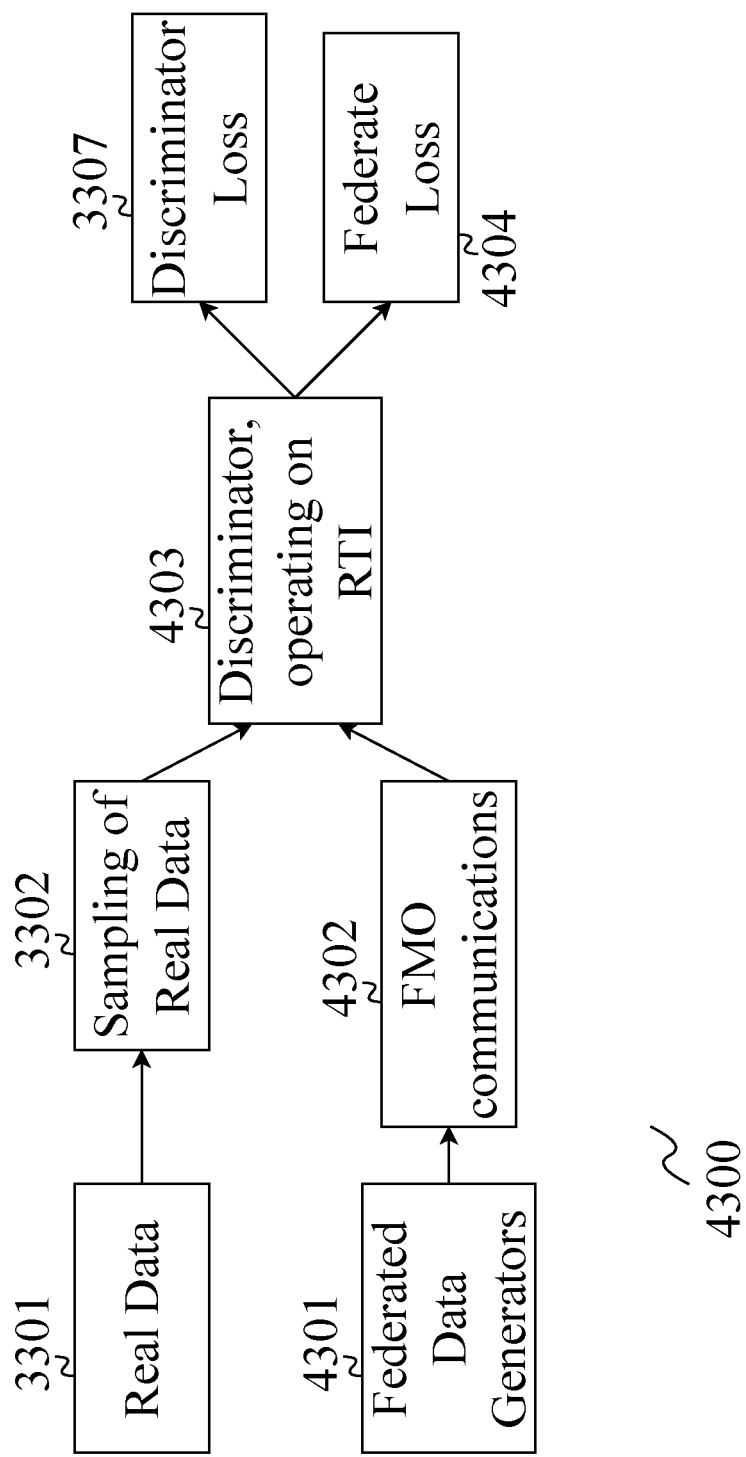
FIG. 43 is a diagram illustrating a system for utilizing federated learning in a generative adversarial network, according to an embodiment.

FIG. 43 is a diagram illustrating a system for utilizing federated learning in a generative adversarial network, according to an embodiment.

In a Generative Adversarial Network ("GAN") 4300, two different neural networks are trained on opposing datasets and for opposing purposes; one is trained to try and produce data that closely matches real data (but is never actually real), such as images of money that closely resemble real images of money, which is the "generator", while a "discriminator" network learns from real input and must determine if the output provided by the generator is real or fake. When the discriminator correctly determines that the output from the generator is fake, a generator loss function is applied, which is fed into the generator network as a negative reinforcement, to try and get the network to generate different output. When the discriminator fails to deduce that generator-supplied input is fake and not real data, a discriminator loss function is applied and the discriminator must learn from the data that it failed to catch, and attempt to hone its ability to discriminate. In other words, the discriminator actually trains the generator, by penalizing it for producing poorly formed data. In this case however, what is shown is a federated adversarial training network 4300, in which there may be multiple generators, each represented by a federate in a federated simulation 4301, using a FMO for communications 4302 with an RTI that operates a singular discriminator 4303 neural network, and applying losses to the federate in question 4304 so as to develop a discriminator capable of handling a networked attack of multiple actors trying to fool or compromise its ability to discern the correct classification for a given generator input. The federated GAN 4300 may operate on a Generative Adversarial Network engine disclosed previously, simply configured in a different manner according to the embodiment provided.

In the diagram shown, real data 3301 is supplied and sampled 3302 for training a discriminator 4303 neural network. The discriminator is also trained by samples of output from the federated generators 4301, through the FMO 4302. The federated data generators 4301 at first produces meaningless output, and the discriminator is trained to recognize and classify the real data as "real" and the fake or generated data as "fake", with incorrect classifications being penalized by the discriminator loss function 3307 and backpropagated to update weights in the discriminator network.

When the generators 4301 of a federated GAN 4300 is trained, however, it is first typically fed random noise input, before generating output (which may be relatively meaningless or easily identifiable as fake, at first) and communicating it through the FMO 4302, which is fed into the discriminator 4303. The discriminator then makes the determination if the generator's data is real or fake, and if the data is fake, the discriminator then applies the generator loss function 4303 to the individual federate that produced the data and backpropagates it through both the federate and the discriminator neural networks to obtain gradients, however only updating the weights of the federate generator neural network.

A GAN is trained in an iterative and linear process of training first the discriminator, then the generator, and then repeating the process until both are suitably trained. For example, after a discriminator is trained to recognize initially random or mediocre output from an untrained generator, the generator must then learn to produce something that isn't random or horrendously bad output when it comes to its turn for training. After it has learned to produce marginally "better" data and might be able to fool the discriminator, the discriminator now needs to learn to recognize this "better" data as fake compared to real data, in new training epochs. The use of a federated GAN as shown here 4300 may be many, including to simulate numerous different possible scenarios or data outputs and trying to catch them all at once with a much more effectively trained discriminator 4303, or to simulate certain types of network traffic by using the discriminator to train and simulate a countermeasures or network defense plan against cyber-attacks, while the federated generators 4301 may represent numerous network attacks and a high volume of network traffic that each follows a different pattern of behavior or optimizes for different forms of attack. By federating the GAN for such a cybersecurity and automated planning purpose, it is possible to use HTNs and the federated GAN to isolate different kinds of simulated network traffic, represented by individual federates in an HLA where the simulation taking place on the RTI is the discriminator neural network, or even to isolate different devices in simulated network behaviors, to attempt to reach real-world decisions or implications about behaviors of these components, attack types, or network behaviors.

Figure 44:
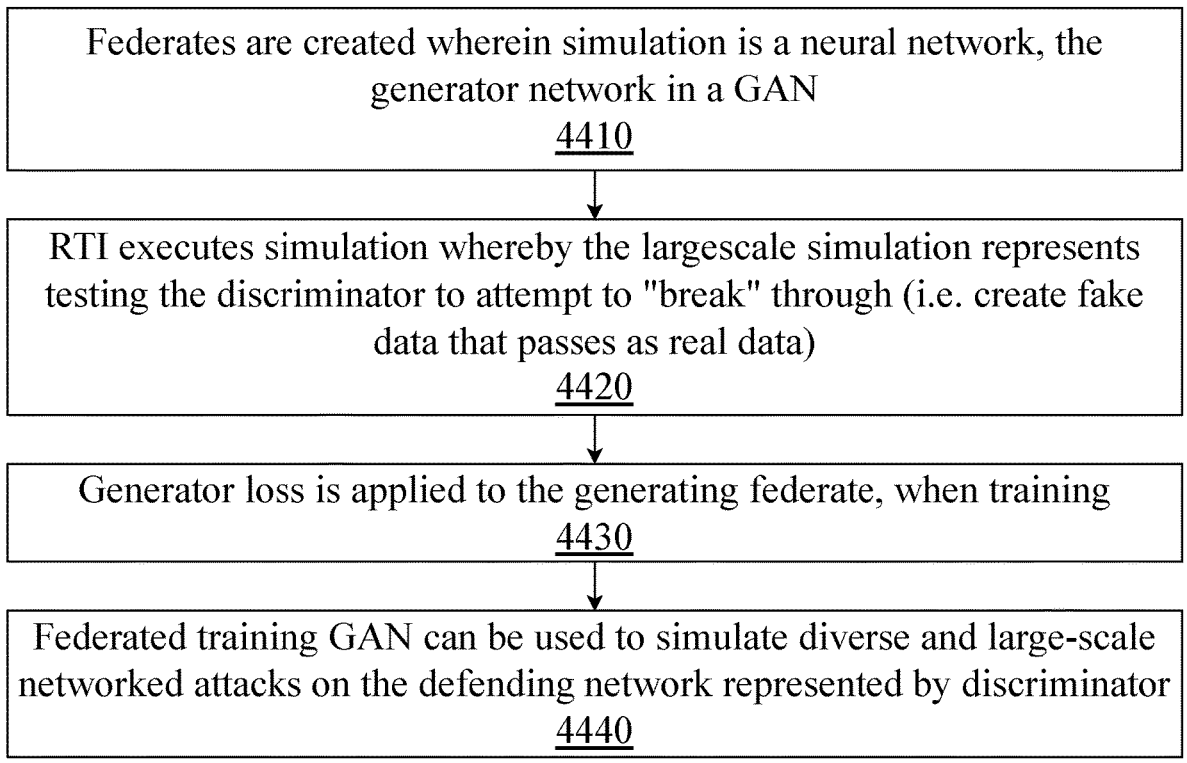
FIG. 44 is a method illustrating a method for utilizing federated learning in a generative adversarial network, according to an embodiment.

FIG. 44 is a method illustrating a method for utilizing federated learning in a generative adversarial network, according to an embodiment.

Federates are first created, or instantiated, wherein the simulation executed by the federate is a neural network trained to produce a given format of data or output (such as images, or automated task plans), equivalent to the generator neural network in a traditional GAN 4410. In a traditional GAN this would be one neural network, however in a federated network there may be many generators, capable of producing high volumes of different output data, crucial for the task of simulating a volume of network traffic and directing it at a discriminator network which simulates a computer network meant to defend against a cyber security incident.

The RTI of a HLA executes a simulation whereby the largescale simulation represents testing a discriminator neural network, to attempt to "break" through (i.e. create fake data that passes as real data) 4420, similar to normal GANs where the discriminator is meant to be trained to resist generator attempts to fool or "break" it, but in this case the discriminator must "defend" against a federated attack with potentially a large number of "attackers" represented by the generator networks.

When a generator fails to "fool" or generate data that the discriminator cannot tell apart from real data, the generator loss function is applied to the generating federate during generator training 4430. In the context of cybersecurity and network attack response planning, generated data may be a series of steps to take or network data to simulate in a HLA simulation, or other task processing methodology such an HTN, which the discriminator may be able to cope with or not, or it may be more traditional fake data generated that is intended to try and fool the discriminator into thinking it's legitimate network traffic, thus allowing the simulation of a large-scale network attack to attempt to penetrate a simulated computer network's defenses or processing capabilities 4440, and training the discriminator to form better plans or responses to the attacks to become more resistant to more and more types of generated fake network data.

Exemplary Computing Environment

Figure 27:
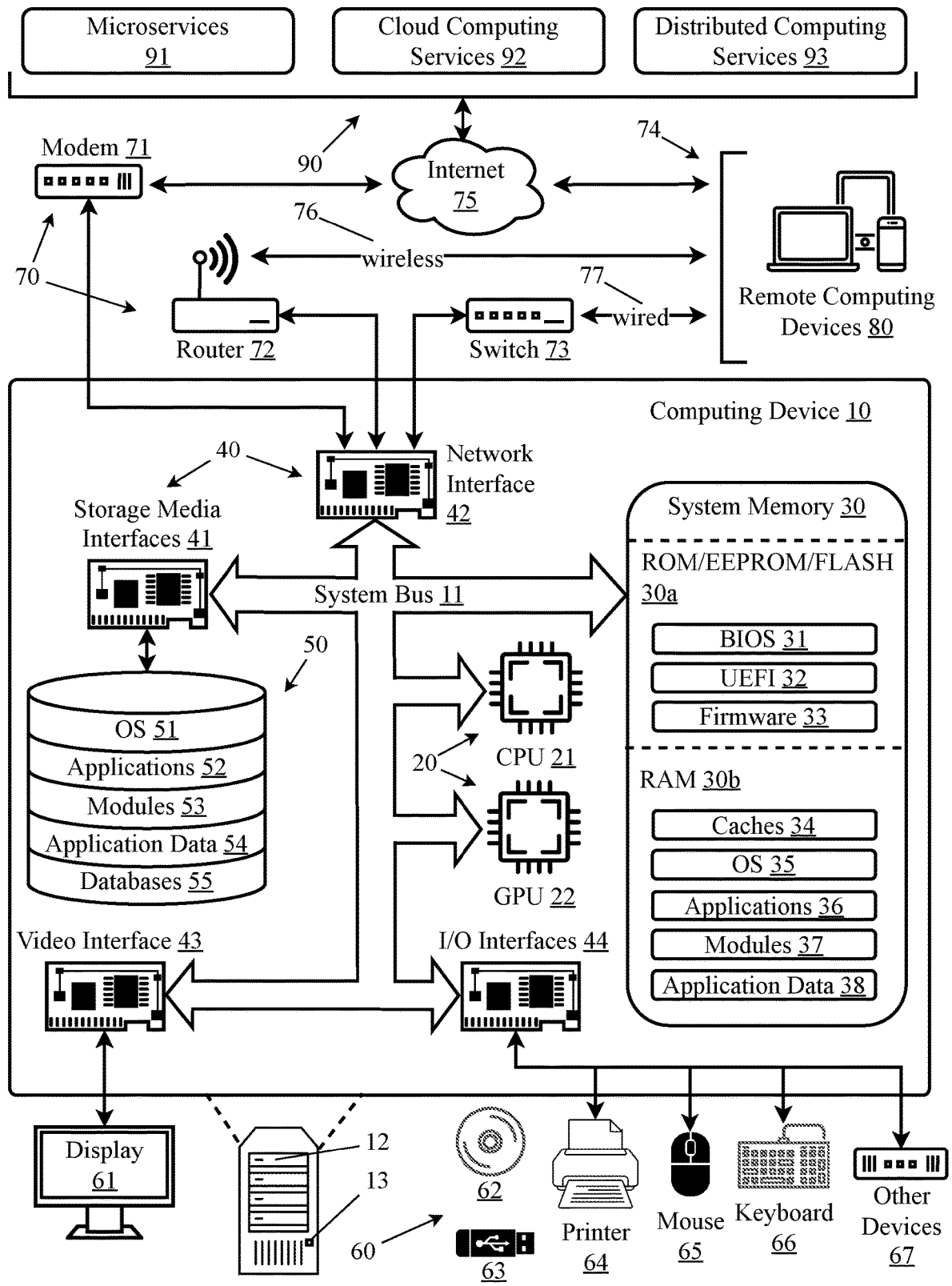
FIG. 27 illustrates an exemplary computing environment on which an embodiment described herein may be implemented, in full or in part.

FIG. 27 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory 30a such as read only memory (ROM), electronically-erasable programmable memory (EEPROM), or rewritable solid state memory (commonly known as "flash memory"). Non-volatile memory 30a is not erased when power to the memory is removed. Non-volatile memory 30a is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b such as random access memory (RAM) is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

Further iterations or alterations, or non-novel expansions to the disclosed invention may be possible, including interaction with the system through not only a variety of computing devices such as tablets, smartphones, laptops or desktops, or Virtual Reality ("VR") or Augmented Reality ("AR") devices, but also through natural language processing technologies such as chatbots, interactive voice response systems, and similar. As well, user interface expansions may be possible allowing users to, for instance, compare side-by-side plans generated by an HTN, or compare scores or results of different cybergames played against a given network setup.

What is claimed is:

1. A system for cyber exploitation path analysis and response using federated networks, comprising:
   a computing device comprising a memory and a processor;
   a directed graph stored in the memory of the computing device, the directed graph comprising a representation of a computer network wherein:
     nodes of the directed graph represent entities comprising the computer network; and
     edges of the directed graph represent relationships between the entities of the computer network;
   a machine learning engine comprising a plurality of programming instructions stored in the memory of, and operating on the processor of, the computing device, wherein the machine learning engine comprises multiple distributed generator instances operating as separate federated processes with independent neural network parameters and communicating through high level architecture (HLA) protocols, wherein the plurality of programming instructions, when operating on the processor, cause the computing device to:
     receive information about a topology and setup of a network of entities, from the directed graph;
     simulate fake computer network traffic through coordinated operation of the multiple distributed generator instances using runtime infrastructure (RTI) for inter-federated communication;
     use machine learning techniques including neural networks to attempt to classify computer network traffic either as legitimate or as simulated fake computer network traffic; and
   a hierarchical task network engine comprising a plurality of programming instructions stored in the memory of, and operating on the processor of, the computing device, wherein the plurality of programming instructions, when operating on the processor, cause the computing device to:
     receive information about the topology and setup of the network of entities, from the directed graph;
     receive information about simulated fake computer network traffic from a machine learning engine comprising the multiple distributed generator instances with independent neural network parameters; and
     create an automated task plan for minimizing network exposure and maximizing network resilience against simulated fake network traffic generated by the coordinated multiple distributed generator instances operating through the HLA protocols and the RTI infrastructure.

2. The system of claim 1, further comprising a generative adversarial network engine, wherein the generative adversarial network engine is used to optimize the automated task plan created by a hierarchical task network engine.

3. The system of claim 2, wherein the generative adversarial network engine:
   has multiple generators distributed across multiple software instances, called federates; and
   wherein each federate may have different neural network structures or hyperparameters.

4. A method for cyber exploitation path analysis and response using federated networks, comprising the steps of:

storing a directed graph in the memory of a computing device, the directed graph comprising a representation of a computer network wherein:
nodes of the directed graph represent entities comprising the computer network; and
edges of the directed graph represent relationships between the entities of the computer network;
receiving information about a topology and setup of a network of entities, from the directed graph, using a machine learning engine comprising multiple distributed generator instances operating as separate federated processes with independent neural network parameters and communicating through high level architecture (HLA) protocols;
simulating fake computer network traffic, using a machine learning engine through coordinated operation of the multiple distributed generator instances using runtime infrastructure (RTI) for inter-federated communication;
using machine learning techniques including neural networks to attempt to classify computer network traffic either as legitimate or as simulated fake computer network traffic, using a machine learning engine;
receiving information about the topology and setup of the network of entities, from the directed graph, using a hierarchical task network engine;
receiving information about simulated fake computer network traffic from a machine learning engine comprising the multiple distributed generator instances with independent neural network parameters, using a hierarchical task network engine; and
creating an automated task plan for minimizing network exposure and maximizing network resilience against simulated fake network traffic generated by the coordinated multiple distributed generator instances operating through the HLA protocols and the RTI infrastructure, using a hierarchical task network engine.

5. The method of claim 4, further comprising the step of optimizing the automated task plan created by a hierarchical task network engine, using a generative adversarial network engine.

6. The method of claim 5, wherein the generative adversarial network engine:
has multiple generators distributed across multiple software instances, called federates; and
wherein each federate may have different neural network structures or hyperparameters.

7. The system of claim 1, wherein each of the multiple distributed generators operates as a separate federate process with independent neural network parameters.

8. The system of claim 1, wherein the multiple distributed generators communicate through high level architecture (HLA) protocols.

9. The system of claim 2, wherein the generative adversarial network engine coordinates the multiple generators through a runtime infrastructure (RTI) to simulate coordinated multi-vector network attacks.

10. A method for cyber exploitation path analysis and response using federated networks, comprising:
receiving network topology information from a directed graph representation;
deploying multiple distributed generator federates for simulating fake network traffic;
coordinating the multiple generator federates to generate diverse attack scenarios;
classifying network traffic using machine learning; and
generating automated task plans for network defense.

* * * * *